(12) United States Patent
Lu et al.

(10) Patent No.: US 11,953,796 B2
(45) Date of Patent: Apr. 9, 2024

(54) TUNABLE POLARIZATION HOLOGRAPHIC LENSES

(71) Applicant: Meta Platforms Technologies, LLC, Menlo Park, CA (US)

(72) Inventors: Lu Lu, Kirkland, WA (US); Xiayu Feng, Kirkland, WA (US); Hsien-Hui Cheng, Woodinville, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 4 days.

(21) Appl. No.: 17/745,854

(22) Filed: May 16, 2022

(65) Prior Publication Data

US 2023/0027269 A1  Jan. 26, 2023

Related U.S. Application Data

(60) Provisional application No. 63/224,328, filed on Jul. 21, 2021.

(51) Int. Cl.
| | |
|---|---|
| *G02F 1/137* | (2006.01) |
| *G02B 27/01* | (2006.01) |
| *G02F 1/1333* | (2006.01) |
| *G02F 1/1337* | (2006.01) |
| *G02F 1/1343* | (2006.01) |

(52) U.S. Cl.
CPC ......... *G02F 1/137* (2013.01); *G02B 27/0172* (2013.01); *G02F 1/133345* (2013.01); *G02F 1/133738* (2021.01); *G02F 1/134309* (2013.01); *G02B 2027/0174* (2013.01); *G02B 2027/0178* (2013.01); *G02F 2203/07* (2013.01)

(58) Field of Classification Search
CPC .............. G02F 1/137; G02F 1/133345; G02F 1/133738; G02F 1/134309; G02F 2203/07; G02F 1/1347; G02F 2203/18; G02B 27/0172; G02B 2027/0174; G02B 2027/0178; G02B 2027/0185; G02B 5/32; G02B 3/14
See application file for complete search history.

(56) References Cited

U.S. PATENT DOCUMENTS

| | | | |
|---|---|---|---|
| 10,379,419 B1 | 8/2019 | Lu et al. | |
| 10,678,116 B1 * | 6/2020 | Lam | ........................ G06F 3/017 |
| 11,009,765 B1 | 5/2021 | Lu et al. | |
| 2019/0285890 A1 | 9/2019 | Lam et al. | |

(Continued)

OTHER PUBLICATIONS

Comrun Y., et al., "Continuous High-Efficiency Beam Deflector for AR/VR Devices," SID Symposium Digest of Technical Papers, Jun. 28, 2021, vol. 52, No. 1, pp. 402-405.

(Continued)

*Primary Examiner* — Mariam Qureshi
(74) *Attorney, Agent, or Firm* — MILLBURN IP PLLC

(57) ABSTRACT

A device is provided. The device includes a first Pancharatnam-Berry phase ("PBP") lens, and a second PBP lens stacked with the first PBP lens. Each of the first PBP lens and the second PBP lens includes a liquid crystal ("LC") layer. Each side of the LC layer is provided with a continuous electrode and a plurality of patterned electrodes. The patterned electrodes in the first PBP lens are arranged non-parallel to the patterned electrodes in the second PBP lens.

20 Claims, 27 Drawing Sheets

(56) References Cited

U.S. PATENT DOCUMENTS

2020/0033693 A1\* 1/2020 Lu .................... G02B 27/0172
2020/0257119 A1 8/2020 Lu et al.
2021/0011353 A1 1/2021 Yousefzadeh et al.

OTHER PUBLICATIONS

International Search Report and Written Opinion for International Application No. PCT/US2022/037599, dated Nov. 22, 2022, 11 pages.
Zhan T., et al., "Pancharatnam-Berry Optical Elements for Head-Up and Near-Eye Displays [Invited]," Journal of the Optical Society of America B, May 2019, vol. 36 (5), pp. D52-D65.
Yousefzadeh C., et al., "Design of a Large Aperture, Tunable Pancharatnam Phase Beam Steering Device," Optics Express, Jan. 20, 2020, vol. 28 (2), pp. 991-1001.

\* cited by examiner

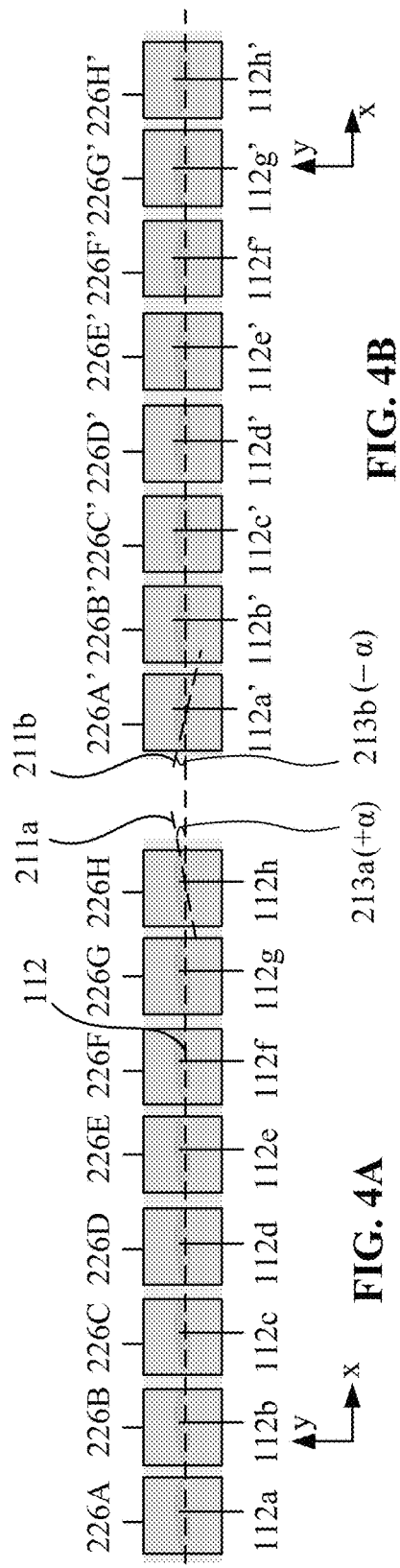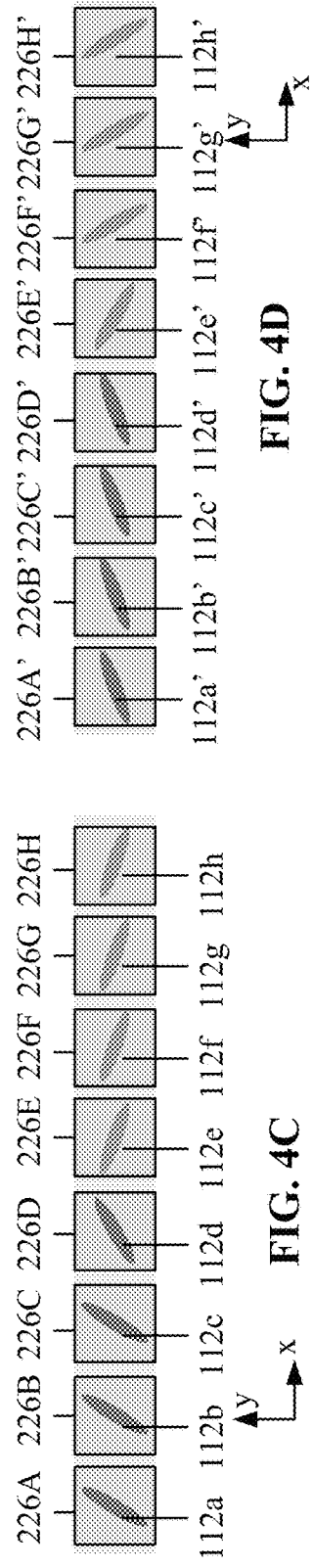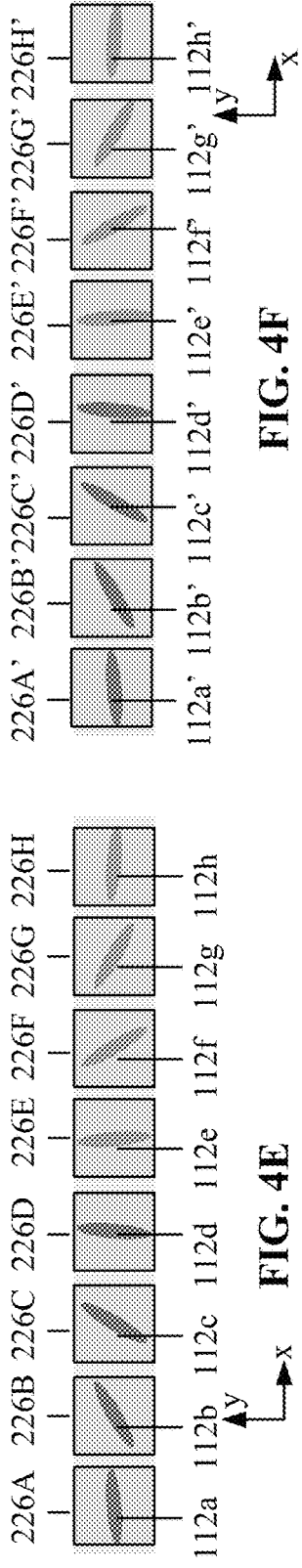
FIG. 4A FIG. 4B FIG. 4C FIG. 4D FIG. 4E FIG. 4F

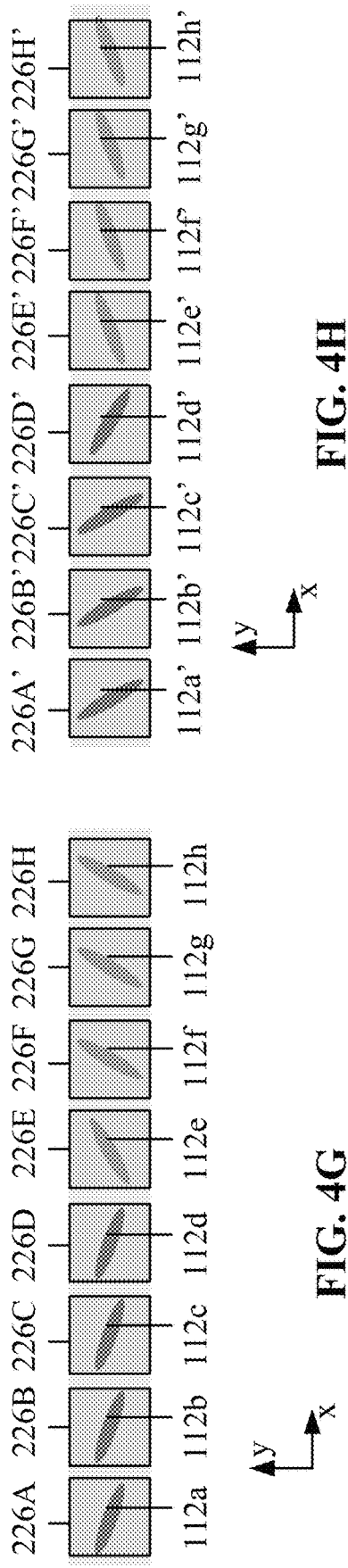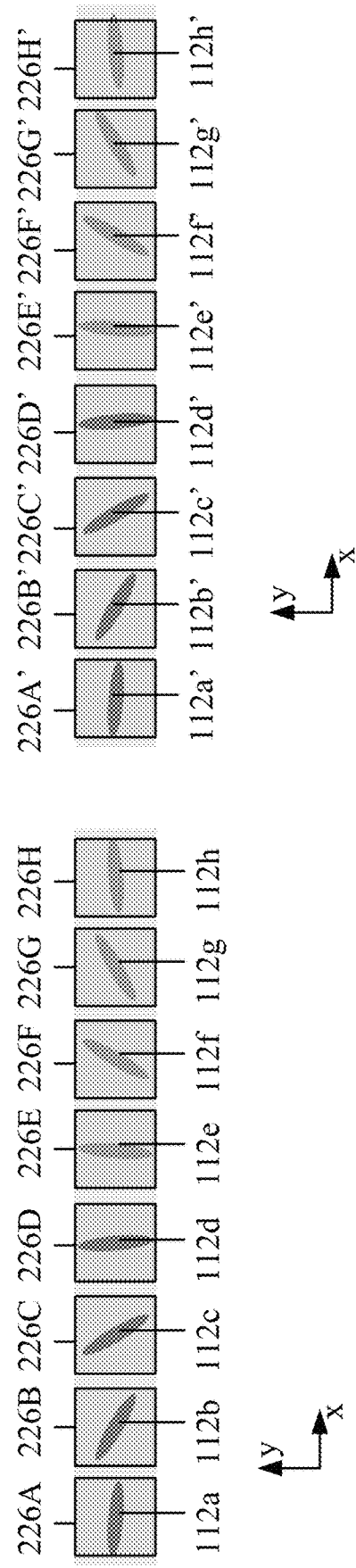

TUNABLE POLARIZATION HOLOGRAPHIC LENSES

CROSS REFERENCE TO RELATED APPLICATION

This application claims the benefit of priority to U.S. Provisional Application No. 63/224,328, filed on Jul. 21, 2021. The content of the above-mentioned application is incorporated herein by reference in its entirety.

TECHNICAL FIELD

The present disclosure generally relates to optical devices and, more specifically, to tunable polarization holographic lenses.

BACKGROUND

Liquid crystal polarization holograms ("LCPHs") refer to the intersection of liquid crystal devices and polarization holograms. Liquid crystal displays ("LCDs"), having grown to a trillion dollar industry over the past decades, are the most successful example of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs have features such as small thickness (~1 um), light weight, compactness, large aperture, high efficiency, simple fabrication, etc. Thus, LCPHs have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a first Pancharatnam-Berry phase ("PBP") lens, and a second PBP lens stacked with the first PBP lens. Each of the first PBP lens and the second PBP lens includes a liquid crystal ("LC") layer. Each side of the LC layer is provided with a continuous electrode and a plurality of patterned electrodes. The patterned electrodes in the first PBP lens are arranged non-parallel to the patterned electrodes in the second PBP lens.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIGS. 4A-4J schematically illustrate diagrams of orientations of liquid crystal ("LC") molecules included in a segment of the lens shown in FIGS. 2A-2E, according to various embodiments of the present disclosure;

DETAILED DESCRIPTION

Figure 1A:
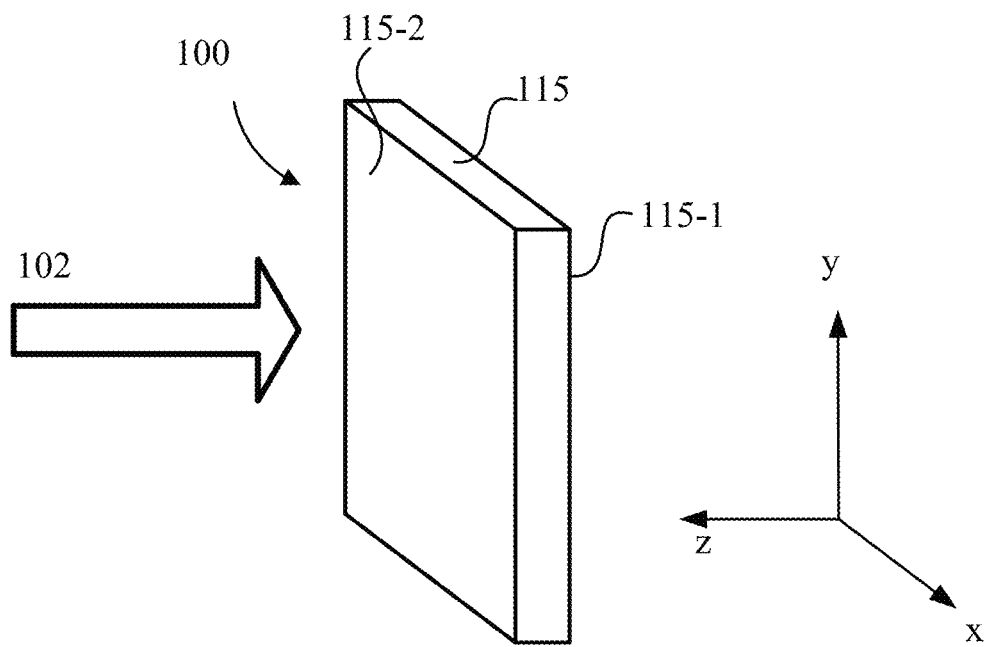
FIG. 1A schematically illustrates a three-dimensional ("3D") view of a Pancharatnam-Berry phase ("PBP") lens, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The term "film plane" refers to a plane in the film, layer, coating, or plate that is perpendicular to the thickness direction or a normal of a surface of the film, layer, coating, or plate. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane. In some embodiments, an "out-of-plane" direction or orientation may form an acute or right angle with respect to the film plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 98%, 90%, 85%, 80%, etc., which may be determined based on specific application needs.

Among liquid crystal polarization hologram ("LCPH") elements, liquid crystal ("LC") based Pancharatnam-Berry phase ("PBP") elements and polarization volume hologram ("PVH") elements have been extensively studied. A PBP element may modulate a circularly polarized light based on a phase profile provided through a geometric phase. A PBP element may split a linearly polarized light or an unpolarized light into two circularly polarized lights with opposite handednesses and symmetric deflecting directions. A PVH element may modulate a circularly polarized light based on Bragg diffraction. Orientations of LC molecules in the PBP element and the PVH element may exhibit rotations in three-dimensions, and may have similar in-plane orientational patterns. PBP element and the PVH element have features such as flatness, compactness, high efficiency, high aperture ratio, absence of on-axis aberrations, flexible design, simple fabrication, and low cost, etc. Thus, PBP element and the PVH element can be implemented in various applications such as portable or wearable optical devices or systems.

LCPH lenses with tunable optical power and tunable optical center are highly desirable for various applications. The present disclosure provides a tunable LCPH lens with a tunable optical power and a tunable optical center. For illustrative purposes, tunable PBP lenses are used as examples of tunable LCPH lenses to explain the design principles and driving methods. The design principles and driving methods disclosed herein may be applicable to other tunable polarization hologram lenses fabricated based on LCs or birefringent photo-refractive holographic materials other than LCs, such as tunable lenses based on PBP without twist, twisted PBP, transmissive PVH, or reflective PVH, etc. The tunable polarization hologram lenses may be transmissive or reflective. The tunable polarization hologram lenses described herein may be fabricated based on various methods, such as holographic interference, laser direct writing, ink-jet printing, and various other forms of lithography. Thus, a "hologram" described herein is not limited to creation by holographic interference, or "holography."

PBP is a geometric phase ("GP") related to changes in the polarization state experienced by a light while the light propagates in an optically anisotropic material. Such a geometric phase may be proportional to a solid angle defined by the polarization state along the light propagation path on the Poincaré sphere. In an optically anisotropic material, a transverse gradient of PBP may be induced by local rotations of the optic axis. When the thickness of an optically anisotropic plate corresponds to a half-wave plate phase difference between the ordinary and the extraordinary lights, the PBP between two points across a light beam profile may be equal to twice the relative rotation of the optic axis at the two points. Thus, the wavefront of the light may be polarization-dependent and may be configured by an in-plane spatial rotation of the optic axis. PBP lenses may be formed by a thin layer of one or more birefringent materials with intrinsic or induced (e.g., photo-induced) optical anisotropy (referred to as an optically anisotropic layer or a birefringent medium layer). A desirable lens phase profile may be directly encoded into local orientations of the optic axis of the birefringent medium layer.

FIG. 1A illustrates a schematic three-dimensional ("3D") view of a PBP lens 100 with a light 102 incident onto the PBP lens 100 along a −z-axis, according to an embodiment of the present disclosure. As shown in FIG. 1A, although the PBP lens 100 is shown as a rectangular plate shape for illustrative purposes, the PBP lens 100 may have any suitable shape, such as a circular shape. In some embodiments, one or both surfaces along the light propagating path of the light 102 may have curved shapes. In some embodiments, the PBP lens 100 may be fabricated based on a birefringent medium, e.g., liquid crystal ("LC") materials, which may have an intrinsic orientational order of optically anisotropic molecules that may be locally controlled during the fabrication process. In some embodiments, the PBP lens 100 may include an optically anisotropic layer 115. In some embodiments, the optically anisotropic layer 115 may include a birefringent medium (e.g., an LC material) in a form of a layer, and may also be referred to as a birefringent medium layer (e.g., an LC layer) 115 in the following descriptions. The birefringent medium layer 115 may have a first surface 115-1 on a light input side and a second surface 115-2 on a light output side. The first surface 115-1 and the second surface 115-2 may be surfaces along the light propagating path of the incident light 102. In some embodiments, the thickness of the birefringent medium layer 115 may be configured as $d=\lambda_0/(2*\Delta n)$, where $\lambda_0$ is a design wavelength, $\Delta n$ is the birefringence of the LC material of the birefringent medium layer 115, and $\Delta n=n_e-n_o$, where $n_e$ and $n_o$ are the extraordinary and ordinary refractive indices of the birefringent medium (e.g., the LC material), respectively.

The birefringent medium layer 115 may include optically anisotropic molecules (e.g., LC molecules) configured with a three-dimensional ("3D") orientational pattern to provide a polarization selective optical response. In some embodiments, an optic axis of the birefringent medium layer 115 may be configured with an in-plane rotation in at least two opposite in-plane directions from a lens pattern center to opposite lens peripheries. The optic axis of the birefringent medium layer 115 may rotate in a same rotation direction (e.g., a clockwise direction or a counter-clockwise direction) along the at least two opposite in-plane directions from the lens pattern center. The rotation of the optic axis of the birefringent medium layer 115 in a predetermined rotation direction (e.g., a clockwise direction or a counter-clockwise direction) may exhibit a handedness, e.g., right handedness or left handedness. An azimuthal angle changing rate of the optic axis may be configured to increase from the lens pattern center to the opposite lens peripheries in at least a portion of the lens including the lens pattern center.

In some embodiments, in a volume of the birefringent medium layer 115, along the thickness direction (e.g., the z-axis direction) of the birefringent medium layer 115, the azimuth angles of the optic axis of the birefringent medium layer 115 may remain in the same angle value from the first surface 115-1 to the second surface 115-2 of the birefringent medium layer 115. In some embodiments, in a volume of the birefringent medium layer 115, the optic axis of the birefringent medium layer 115 may be configured with a spatially varying orientation in an out-of-plane direction. For example, the optic axis of the birefringent medium layer 115 may twist in a helical fashion in the out-of-plane direction.

FIGS. 1B-1D and FIG. 1F schematically illustrate x-y sectional views of a portion of the PBP lens 100 shown in FIG. 1A, showing in-plane orientations of optically anisotropic molecules 112 in the PBP lens 100, according to various embodiments of the present disclosure. For discussion purposes, rod-like LC molecules 112 are used as examples of the optically anisotropic molecules 112 of the birefringent medium layer 115. The rod-like LC molecule 112 may have a longitudinal axis (or an axis in the length direction) and a lateral axis (or an axis in the width direction). The longitudinal axis of the LC molecule 112 may be referred to as a director of the LC molecule 112 or an LC director. An orientation of the LC director may determine a local optic axis orientation or an orientation of the optic axis at a local point of the birefringent medium layer 115. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 112 shown in FIGS. 1B-1D and FIG. 1F are presumed to be in the surface of the birefringent medium layer 115 or in a plane parallel with the surface with substantially small tilt angles with respect to the surface.

Figure 1B:
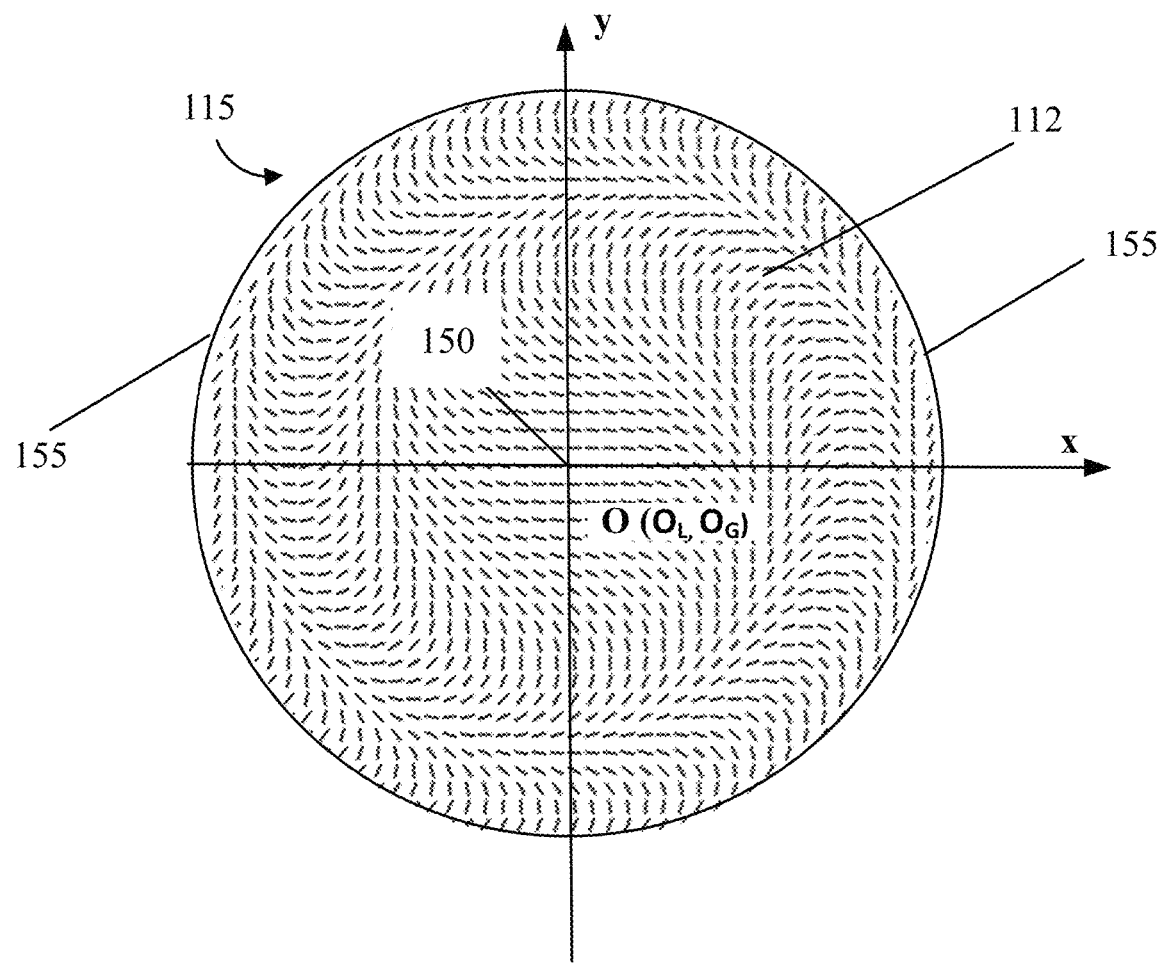
FIGS. 1B and 1C schematically illustrate various diagrams of a portion of the PBP lens shown in FIG. 1A, showing in-plane orientations of optically anisotropic molecules in the PBP lens, according to an embodiment of the present disclosure.
Figure 1C:
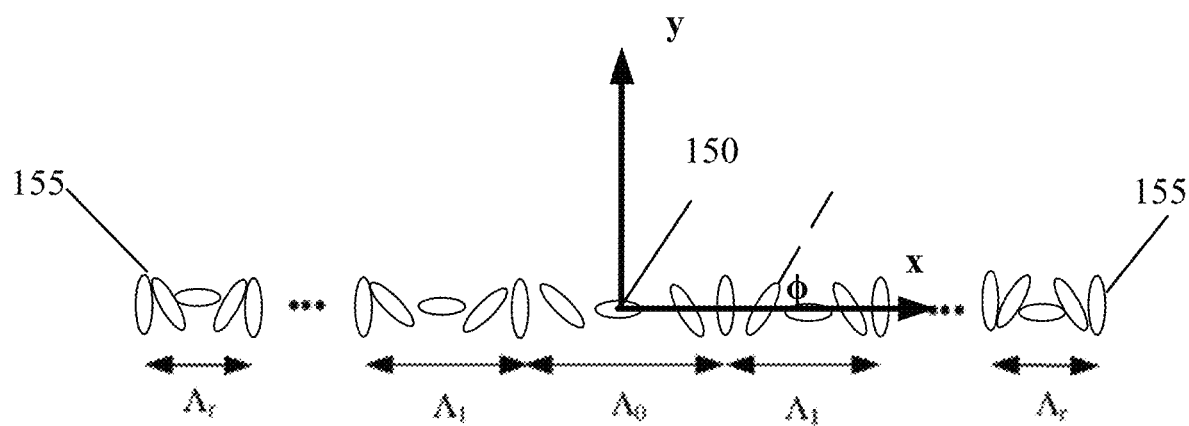

FIG. 1B schematically illustrates an x-y sectional view of a portion of the PBP lens 100 functioning as a PBP spherical lens, showing a radially varying in-plane orientation pattern of the LC directors of the LC molecules 112 within a film plane of the birefringent medium layer 115 shown in FIG. 1A. The film plane may be the first surface 115-1, the second surface 115-2, or a plane that is parallel with at least one of the first surface 115-1 or the second surface 115-2 of the birefringent medium layer 115. The film plane may be perpendicular to the thickness direction of the birefringent medium layer 115. FIG. 1C illustrates a section of the in-plane orientation pattern taken along an x-axis in the birefringent medium layer 115 shown in FIG. 1B, according to an embodiment of the present disclosure. For discussion purposes, the PBP lens 100 functioning as a PBP spherical lens may also be referred to as a PBP spherical lens 100. The PBP spherical lens 100 may focus a light into a point (e.g., a focal point or focus). For discussion purposes, FIG. 1B shows that the PBP lens 100 has a circular shape.

As shown in FIG. 1B, the orientations of the LC directors of the LC molecules 112 within the film plane of the birefringent medium layer 115 may be configured with an in-plane orientation pattern having a varying pitch in at least two opposite in-plane directions from a lens pattern center ("$O_L$") 150 to opposite lens peripheries 155. For example, the orientations of the LC directors of LC molecules 112 within the film plane of the birefringent medium layer 115 may exhibit a continuous rotation in at least two opposite in-plane directions (e.g., a plurality of opposite radial directions) from the lens pattern center ("$O_L$") 150 to the opposite lens peripheries 155 with a varying pitch. The orientations of the LC directors from the lens pattern center ("$O_L$") 150 to the opposite lens peripheries 155 may exhibit a rotation in a same rotation direction (e.g., clockwise, or counter-clockwise). That is, the rotation of the orientations of the LC directors from the lens pattern center ("$O_L$") 150 to the opposite lens peripheries 155 in the at least two opposite in-plane directions (e.g., a plurality of opposite radial directions) may exhibit a same handedness (e.g., right, or left handedness).

The in-plane orientation pattern of the LC directors (or the orientations of the optic axis of the birefringent medium layer 115) within the film plane of the birefringent medium layer 115 may be referred to as a lens pattern. The lens pattern center ($O_L$) 150 may be a center of the lens pattern of the PBP spherical lens 100, and may also be a symmetry center of the lens pattern. The lens pattern center ($O_L$) 150 may also be referred to as an optical center of the PBP spherical lens 100. In the PBP spherical lens 100, the lens pattern center ($O_L$) 150 may also be defined as the point at which an azimuthal angle changing rate of the optic axis (or an azimuthal angle changing rate of the optically anisotropic molecules) of the birefringent medium layer 115 in the at least two opposite in-plane directions is the smallest. The PBP spherical lens 100 may have a geometry center ($O_G$) that is a point of intersection of a first in-plane symmetric axis (e.g., a first diameter) and a second in-plane symmetric axis (e.g., a second diameter) of the shape of the aperture. As shown in FIG. 1B, the lens pattern center ($O_L$) 150 and the geometry center ($O_G$) (e.g., a center of lens aperture) of the PBP spherical lens 100 may substantially overlap (or coincide) with one another, at the origin (point "O" in FIG. 1B) of the x-y plane.

A pitch $\Lambda$ of the in-plane orientation pattern (or lens pattern) may be defined as a distance in the predetermined in-plane direction (e.g., a radial direction) over which the orientations of the LC directors (or azimuthal angles $\phi$ of the LC molecules 112) change by a predetermined angle (e.g., 180°) from a predetermined initial state (e.g., 0° relative to a predetermined direction, such as the +x-axis direction), or may be defined as a distance over which the azimuthal angle of the optic axis of the birefringent medium layer 115 changes by $\pi$ in the predetermined in-plane direction. For discussion purposes, the pitch $\Lambda$ may also be referred to as a distance in the predetermined in-plane direction over which the LC molecules distributed along the distance exhibit a periodic (e.g., 180°) rotation.

As shown in FIG. 1C, according to the LC director field along the x-axis direction, the pitch $\Lambda$ may be a function of the distance from the lens pattern center ("$O_L$") 150. The pitch $\Lambda$ may monotonically decrease from the lens pattern center ("$O_L$") 150 to the lens peripheries 155 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 155) of the lens pattern, which may be the smallest. In some embodiments, the azimuthal angle $\phi$ of the LC molecule 112 may change in proportional to the distance from the lens pattern center ("$O_L$") 150 to a local point of the birefringent medium layer 115 at which the LC molecule 112 is located.

Figure 1D:
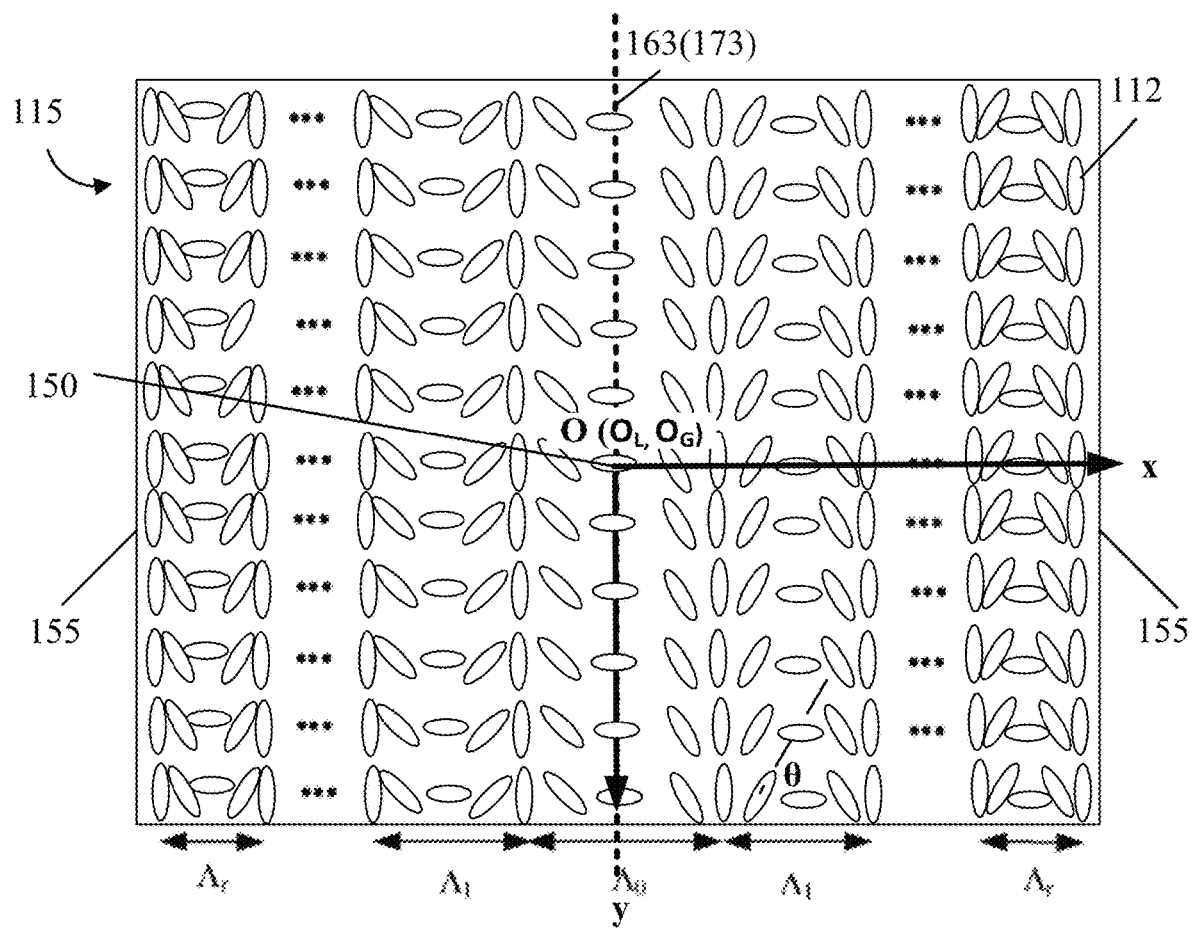
FIG. 1D schematically illustrates a diagram of a portion of the PBP lens shown in FIG. 1A, showing in-plane orientations of optically anisotropic molecules in the PBP lens, according to an embodiment of the present disclosure.

FIG. 1D schematically illustrates an x-y sectional view of a portion of the PBP lens 100 functioning as a PBP cylindrical lens, showing a laterally varying in-plane orientation pattern of the LC directors of the LC molecules 112 within the film plane of the birefringent medium layer 115 shown in FIG. 1A. In other words, the x-y sectional view shown in FIG. 1D may be a sectional view in the thickness direction close to or at the surface 115-1 or 115-2. For discussion purposes, the PBP lens 100 functioning as a PBP cylindrical lens may also be referred to as a PBP cylindrical lens 100. The PBP cylindrical lens 100 may focus a light into a line (e.g., a line of focal points or a line focus). For discussion purposes, FIG. 1D shows that the PBP cylindrical lens 100 has a rectangular shape (or a rectangular lens aperture). A width direction of PBP cylindrical lens 100 may be referred to as a lateral direction (e.g., an x-axis direction in FIG. 1D), and a length direction of the PBP cylindrical lens may be referred to as a longitudinal direction (e.g., a y-axis direction in FIG. 1D).

The PBP cylindrical lens 100 may be considered as a 1D case of the PBP spherical lens, and the at least two opposite in-plane directions in the PBP cylindrical lens 100 may include at least two opposite lateral directions (e.g., the +x-axis and −x-axis directions). For example, as shown in FIG. 1D, the orientations of the LC molecules 112 within the film plane of the birefringent medium layer 115 may be configured with an in-plane orientation pattern having a varying pitch in at least two opposite lateral directions, from the lens pattern center ("$O_L$") 150 to opposite lens peripheries 155. The orientations of the LC directors located on the same side of an in-plane lens pattern center axis 163 and at a same distance from the in-plane lens pattern center axis 163 may be substantially the same. The rotations of the orientations of the LC directors (or the in-plane orientations of the LC molecules 112) from the lens pattern center ("$O_L$") 150 to the opposite lens peripheries 155 in the two opposite lateral directions may exhibit a same handedness (e.g., right, or left handedness).

The directors of the LC molecules 155 (or azimuthal angles of the LC molecules 155) may be configured with a continuous in-plane rotation pattern with a varying pitch ($\Lambda_0, \Lambda_1, \ldots, \Lambda_r$) from the from the lens pattern center ("$O_L$") 150 to opposite lens peripheries 155 in the two opposite lateral directions. A pitch $\Lambda$ of the in-plane orientation pattern (or lens pattern) shown in FIG. 1D may be defined as a distance in the lateral direction over which the orientations of the LC directors (or azimuthal angles $\phi$ of the LC molecules 112) change by a predetermined angle (e.g., 180°) from a predetermined initial state (e.g., 0° relative to a predetermined direction, such as the +x-axis direction), or may be defined as a distance over which the azimuthal angle of the optic axis of the birefringent medium layer 115 changes by $\pi$ in the lateral direction. As shown in FIG. 1D, the pitch of the lens pattern may vary with the distance to the in-plane lens pattern center axis 163 in the lateral direction. In some embodiments, the pitch of the lens pattern may monotonically decrease as the distance to the in-plane lens pattern center axis 163 in the lateral direction increases, i.e., $\Lambda_0 > \Lambda_1 > \ldots > \Lambda_r$, where $\Lambda_0$ is the pitch at a central portion of the lens pattern, which may be the largest. The pitch $\Lambda_r$ is the pitch at an edge or periphery region of the lens pattern, which may be the smallest. In other words, an azimuthal angle changing rate of the optic axis of the birefringent medium layer 115 (or an azimuthal angle changing rate of the LC molecules) may increase from the lens pattern center ("$O_L$") 150 to the lens periphery 155 in the lateral direction. The azimuthal angles of the optic axis of the birefringent medium layer 115 (or the azimuthal angle changing rate of the LC molecules) at locations on the same side of an in-plane lens pattern center axis 163 and having a same distance from the in-plane lens pattern center axis 163 in the lateral direction, may be substantially the same.

The lens pattern center ($O_L$) of the PBP cylindrical lens 100 may be a point at which the azimuthal angle changing rate is the smallest. A geometry center ($O_G$) of the PBP cylindrical lens 100 may be the center of the rectangular lens shape. For example, the PBP cylindrical lens 100 may have two symmetric axes for the shape of the aperture, e.g., a lateral symmetric axis in a lateral direction (or width direction) of the PBP cylindrical lens 100 and a longitudinal symmetric axis in a longitudinal direction (or length direction) of the PBP cylindrical lens 100. The geometry center ($O_G$) of the PBP cylindrical lens 100 may be a point of intersection of the two symmetric axes. When the PBP cylindrical lens 100 has a rectangular shape, the geometry center ($O_G$) may also be a point of intersection of two diagonals. The PBP cylindrical lens 100 may have a plurality of points, at each of which an azimuthal angle changing rate of the optic axis (or an azimuthal angle changing rate of the LC molecules) of the birefringent medium layer 115 in the at least two opposite in-plane directions may be the smallest. The plurality of points, at each of which an azimuthal angle changing rate is the smallest may be arranged in a line. The line may be referred to as the "in-plane lens pattern center axis" 163 of the PBP cylindrical lens 100. The in-plane lens pattern center axis 163 may be in the longitudinal direction. The lens pattern center ($O_L$) 150 of the PBP cylindrical lens 100 may also be considered as one of the plurality of points, which is located on a same symmetric axis (e.g., the lateral symmetric axis) with the geometry center ($O_G$) of the PBP cylindrical lens 100. In other words, the lens pattern center ($O_L$) 150 is also a point of intersection of the in-plane lens pattern center axis 163 and the lateral symmetric axis. In FIG. 1D, the geometry center ($O_G$) may coincide with the lens pattern center ($O_L$) 150 at the origin (point "O" in FIG. 1D) of the x-y plane. The lens pattern center ($O_L$) 150 may also be referred to as an optical center of the PBP cylindrical lens 100.

Figure 1E:
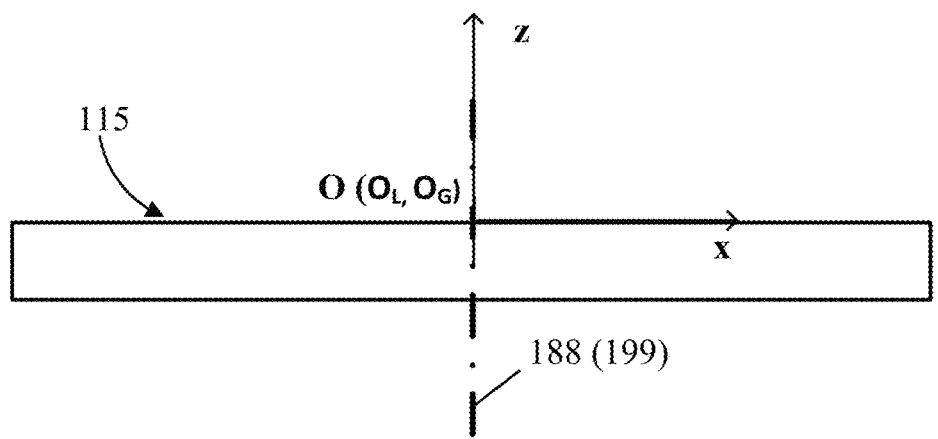
FIG. 1E schematically illustrates a side view of the PBP lens shown in FIG. 1D, according to an embodiment of the present disclosure.

FIG. 1E illustrates a side view of the PBP lens 100 having a lens pattern shown in FIG. 1D, according to an embodiment of the present disclosure. The side view shows an out-of-plane lens pattern center axis 188 passing through the lens pattern center ($O_L$) 150 and an out-of-plane geometry center axis 199 passing through the geometry center ($O_G$). The out-of-plane lens pattern center axis 188 and the out-of-plane geometry center axis 199 may be perpendicular to the surface plane (e.g., the x-y plane). That is, the out-of-plane lens pattern center axis 188 and the out-of-plane geometry center axis 199 may be in the z-axis direction or the thickness direction of the PBP lens 100. Referring to FIG. 1D and FIG. 1E, because the lens pattern center ($O_L$) 150 and the geometry center ($O_G$) coincide with one another, the out-of-plane lens pattern center axis 188 and the out-of-plane geometry center axis 199 also coincide with one another.

Figure 1F:
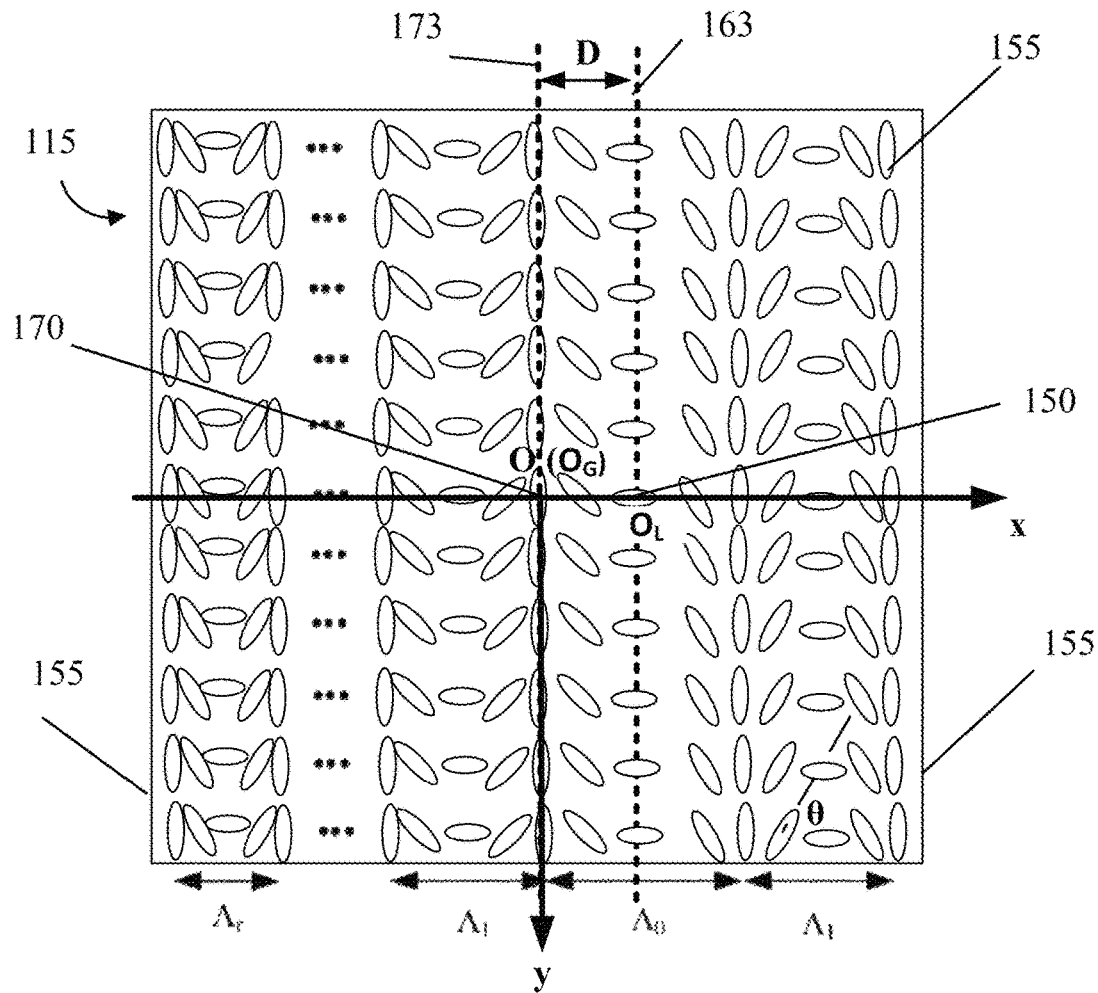
FIG. 1F schematically illustrates a diagram of a portion of the PBP lens shown in FIG. 1A, showing in-plane orientations of optically anisotropic molecules in the PBP lens, according to an embodiment of the present disclosure.

FIG. 1F schematically illustrates an x-y sectional view of a portion of the PBP lens 100 functioning as a PBP cylindrical lens, showing a laterally varying in-plane orientation pattern of the LC directors of the LC molecules 112 within the film plane of the birefringent medium layer 115 shown in FIG. 1A. In the embodiment shown in FIG. 1F, the origin (point "O" in FIG. 1F) of the x-y plane corresponds to a geometry center ($O_G$) 170 of the PBP lens 100. The lens pattern center ($O_L$) 150 of the PBP lens 100 may not coincide with the geometry center ($O_G$) 170. Instead, the lens pattern center ($O_L$) 150 may be shifted by a predetermined distance D in a predetermined direction from the geometry center ($O_G$) 170. Accordingly, the in-plane lens pattern center axis 163 may not coincide with the in-plane geometry center axis 173. Instead, the in-plane lens pattern center axis 163 may be shifted by the predetermined distance D in a predetermined direction from the in-plane geometry center axis 173. In the embodiment shown in FIG. 1F, the lens pattern center ($O_L$) 150 is shifted by the distance D in the +x direction from the geometry center ($O_G$). Accordingly, the in-plane lens pattern center axis 163 is shifted by the distance D in the +x direction from the in-plane geometry center axis 173. This shift is for illustrative purposes and is not intended to limit to the scope of the present disclosure. The shift may be in any other suitable directions and for any other suitable distances. For example, in some embodiments, the lens pattern center ($O_L$) 150 may be shifted by a predetermined distance in the −x-axis direction from the geometry center ($O_G$) 170. In some embodiments, the predetermined direction may be other directions.

Figure 1G:
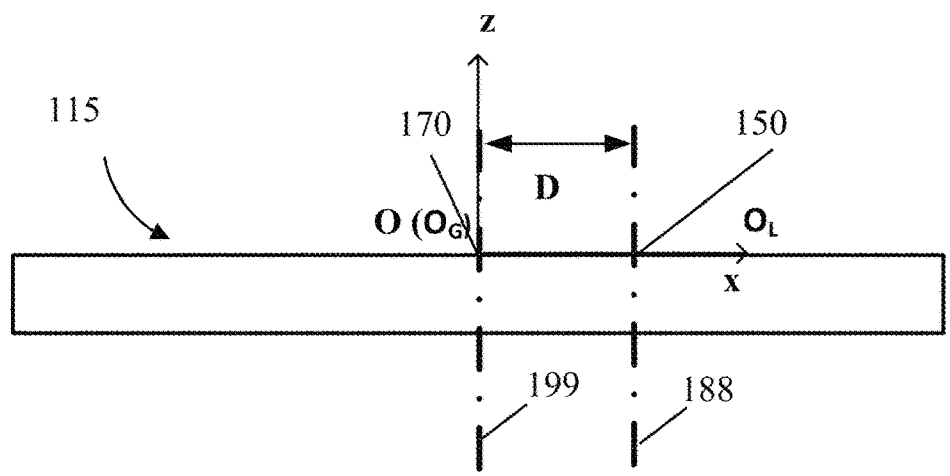
FIG. 1G schematically illustrates a side view of the PBP lens shown in FIG. 1F, according to an embodiment of the present disclosure.

FIG. 1G illustrates a side view of the PBP lens 100 having a lens pattern shown in FIG. 1F, according to an embodiment of the present disclosure. The side view shows an out-of-plane lens pattern center axis 188 and an out-of-plane geometry center axis 199 passing through the lens pattern center ($O_L$) 150 and the geometry center ($O_G$) 170, respectively. The out-of-plane lens pattern center axis 188 and the out-of-plane geometry center axis 199 may be perpendicular to the surface plane (e.g., the x-y plane). That is, the out-of-plane lens pattern center axis 188 and the out-of-plane geometry center axis 199 may be in the z-axis direction or the thickness direction of the PBP lens 100. Referring to FIG. 1F and FIG. 1G, the lens pattern center ($O_L$) 150 is shifted from the geometry center ($O_G$) 170 for the predetermined distance D. The shift may also correspond to the shift or distance between the parallel out-of-plane lens pattern center axis 188 and the out-of-plane geometry center axis 199.

Referring to FIG. 1D and FIG. 1F, as the lens pattern center ($O_L$) 150 is shifted from the geometry center ($O_G$) 170 for the predetermined distance D in the predetermined direction as shown in FIG. 1F, the position of the optical center of the PBP lens 100 shown in FIG. 1F may be moved by the predetermined distance D in the predetermined direction as compared to the position of the optical center of the PBP lens 100 shown in FIG. 1D. That is, the optical center of the PBP lens 100 may be adjustable or tunable through shifting the lens pattern center ($O_L$) 150.

Figure 1H:
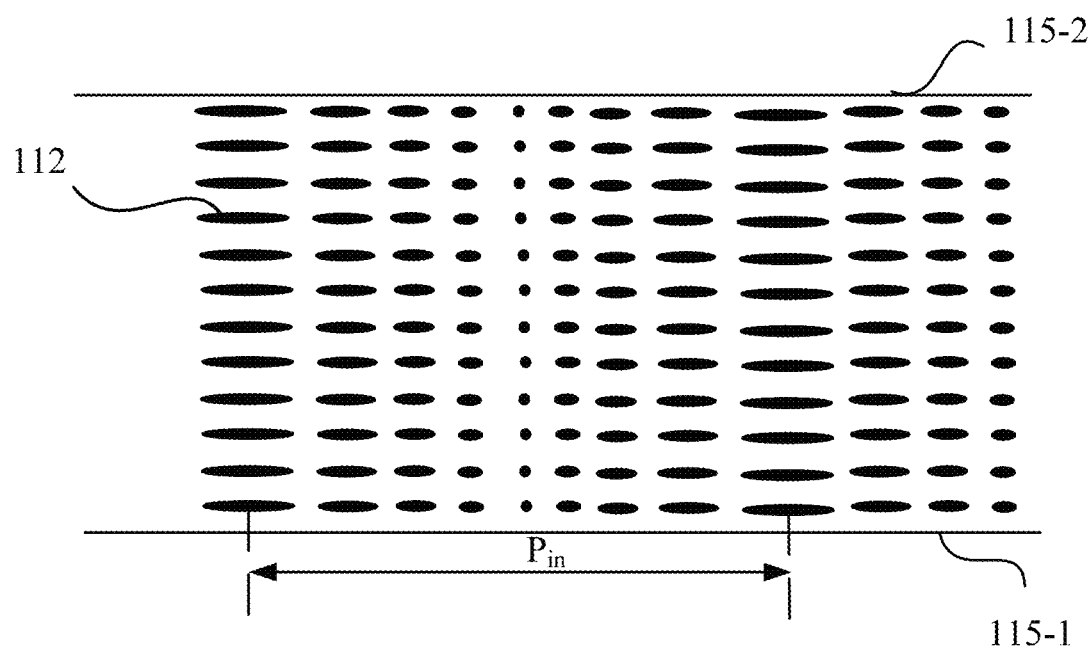
FIG. 1H schematically illustrates a diagram of a portion of the PBP lens shown in FIG. 1A, showing in-plane orientations of optically anisotropic molecules in the PBP lens, according to an embodiment of the present disclosure.
Figure 1H:
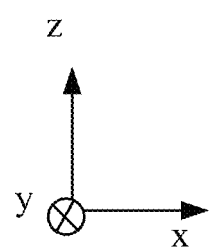

FIG. 1H schematically illustrates a y-z sectional view of a portion of the PBP lens 100, showing out-of-plane orientations of the LC directors of the LC molecules 112 in the PBP lens 100, according to an embodiment of the present disclosure. In the embodiment shown in FIG. 1H, in a volume of the birefringent medium layer 115, along the thickness direction (e.g., the z-axis direction) of the birefringent medium layer 115, the directors (or the azimuth angles) of the LC molecules 112 may remain in the same orientation (or same angle value) from the first surface 115-1 to the second surface 115-2 of the birefringent medium layer 115.

Referring to FIG. 1B, FIG. 1D, and FIG. 1F, in some embodiments, for a circularly polarized light having a wavelength range within an operating wavelength range of the PBP lens 100, the PBP lens 100 may be configured to operate in a positive state to converge (or focus) the circularly polarized light, or operate in a negative state to diverge (or defocus) the circularly polarized light, depending on the handedness of the circularly polarized light and the handedness of the rotation of the orientations of the LC directors (or the rotation of the optic axis of the birefringent medium 115) in the at least two opposite in-plane directions from the lens pattern center ($O_L$) 150 to the opposite lens peripheries 155. In some embodiments, the PBP lens 100 may be configured to operate in the positive state to converge (or focus) the circularly polarized light having a handedness that is the same as the handedness of the rotation of the orientations of the LC directors in the at least two opposite in-plane directions from the lens pattern center ($O_L$) 150 to the opposite lens peripheries 155. In some embodiments, the PBP lens 100 may be configured to operate in the negative state to diverge (or defocus) the circularly polarized light having a handedness that is the opposite to the handedness of the rotation of the orientations of the LC directors in the at least two opposite in-plane directions from the lens pattern center ($O_L$) 150 to the opposite lens peripheries 155. In some embodiments, the PBP lens 100 operating in the positive or negative state may reverse a handedness of the circularly polarized light transmitted therethrough.

In some embodiments, when the handedness of the circularly polarized light incident onto the PBP lens 100 is presumed to be fixed, through configuring the handedness of the rotation of the orientations of the LC directors in the at least two opposite in-plane directions from the lens pattern center ($O_L$) 150 to the opposite lens peripheries 155, the PBP lens 100 may be configured to operate in the positive state or the negative state. For example, through switching the handedness of the rotation of the orientations of the LC directors in the at least two opposite in-plane directions from the lens pattern center ($O_L$) 150 to the opposite lens peripheries 155 between a left handedness and a right handedness, the PBP lens 100 may be switchable between operating in the positive (or negative) state and the negative (or positive) state.

The in-plane orientation patterns (or lens patterns) of the LC directors shown in FIGS. 1B-1D and FIG. 1F are for illustrative purposes. The LC directors (or lens patterns) of the PBP lens 100 may have any suitable in-plane orientation patterns. In some embodiments, the lens pattern of the PBP lens 100 may be configured such that the PBP lens 100 may function as an aspheric lens, a freeform lens, an on-axis lens, or an off-axis lens, etc.

Referring to FIG. 1B, FIG. 1D, and FIG. 1F, the optical power (or focal length f) of the PBP lens 100 functioning as a PBP lens may be determined, in part, by the pitch of the in-plane orientation pattern (or lens pattern) of the PBP lens 100 and the aperture size of an aperture of the PBP lens 100. The optical power of the PBP lens 100, the pitch of the in-plane orientation pattern (or lens pattern) of the PBP lens 100, and the aperture size of the PBP lens 100 may satisfy the following lens equation:

$$\Lambda = \lambda/(\sin(\tan^{-1}(R*P_D))),$$

where $P_D$ is the optical power (unit: diopter) of the PBP lens 100, R is the radius of the aperture of the PBP lens 100, $\lambda$ is an incidence wavelength, $\Lambda$ is the pitch of the in-plane orientation pattern (or lens pattern) at the lens periphery 155 (referred to as the in-plane pitch at the lens periphery 155 for discussion purposes) of the PBP lens 100. In some embodiments, the radius R of the aperture of the PBP lens 100 may be a distance from the geometry center ($O_G$) to the lens periphery 155 in the predetermined in-plane direction (e.g. the radial direction shown in FIG. 1B, or the lateral direction shown in FIG. 1D and FIG. 1F). According to the lens equation, when the incidence wavelength $\lambda$ and the radius of the aperture of the PBP lens 100 are fixed, the optical power $P_D$ of the PBP lens 100 may change with the in-plane pitch at the lens periphery. For example, the optical power $P_D$ of the PBP lens 100 may decrease as the in-plane pitch at the lens periphery 155 increases, and the optical power $P_D$ of the PBP lens 100 may increase as the in-plane pitch at the lens periphery decrease. In some embodiments, the optical power $P_D$ of the PBP lens 100 may be adjustable or tunable through adjusting the in-plane pitch at the lens periphery. Thus, a tunable PBP lens may be obtained.

Figure 2A:
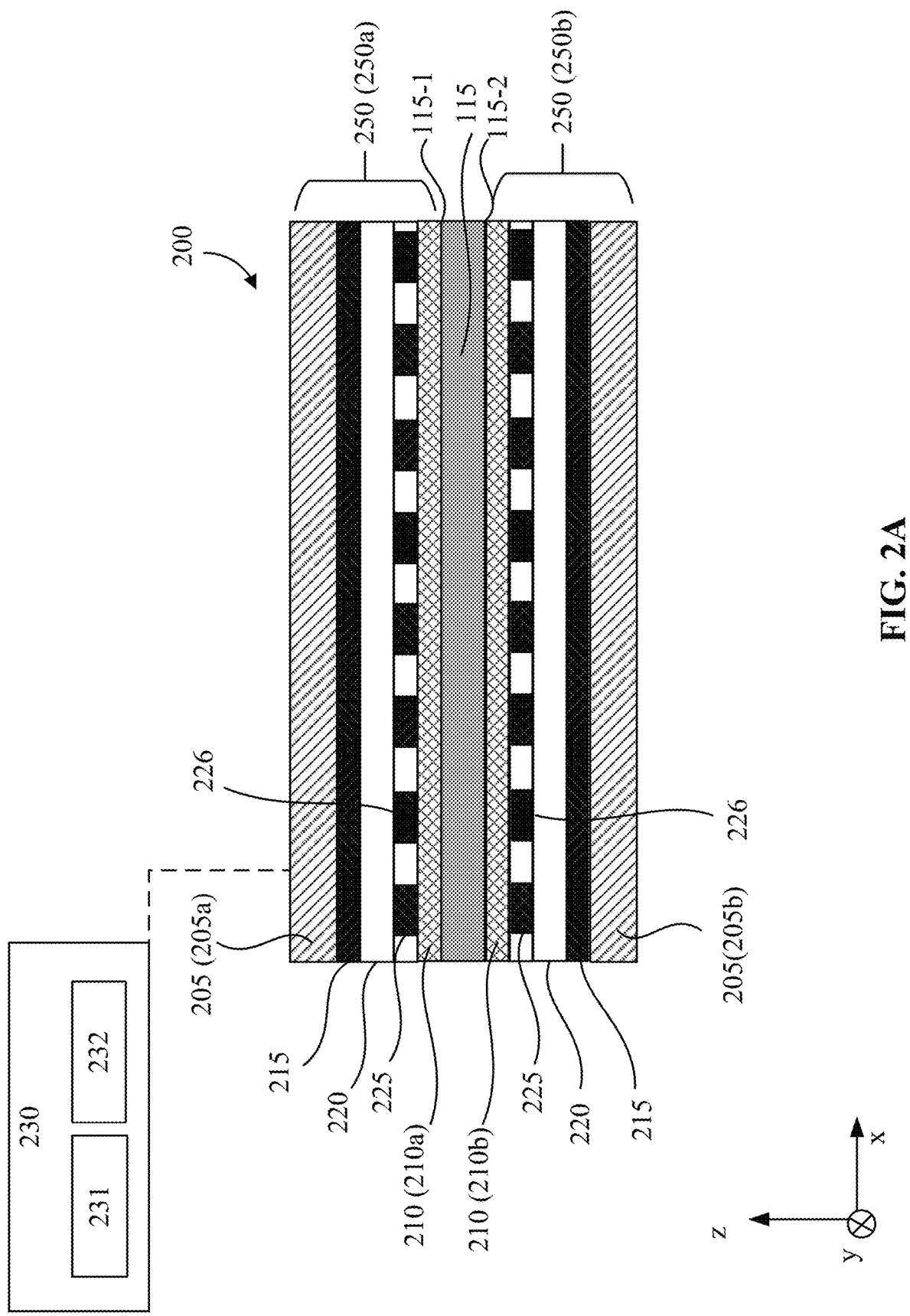
FIG. 2A schematically illustrates a diagram of a lens, according to an embodiment of the present disclosure.

FIG. 2A illustrates an x-z sectional view of a lens 200 according to an embodiment of the present disclosure. The lens 200 may be a tunable PBP lens, such as a tunable PBP spherical lens, a tunable PBP aspherical lens, a tunable PBP cylindrical lens, or a tunable PBP freeform lens, etc. In some embodiments, the lens 200 may be tunable or adjustable between a plurality of optical powers, which may include a zero optical power, one or more positive powers, and/or one or more negative optical powers. In some embodiments, an optical center (or lens pattern center) of the lens 200 may be tunable. In some embodiments, the lens 200 may be a reflective lens or a transmissive lens. The lens 200 may include elements that are the same as or similar to those included in the PBP lens 100 shown in FIGS. 1A-1H. Descriptions of the same or similar elements may refer to the above descriptions rendered in connection with FIGS. 1A-1H. For example, as shown in FIG. 2A, the lens 200 may include two substrates 205 (also labelled as 205a and 205b), and the birefringent medium layer or optically anisotropic layer 115 disposed between the two substrates 205. In some embodiments, each of the two substrates 205 may be provided with a first electrode layer 215, a second electrode layer 225, an electrically insulating layer 220, and an alignment structure 210. For illustrative purposes, the substrate and different layers, films, or structures formed thereon are shown as having flat surfaces. In some embodiments, the substrate and different layers or films or structures may have curved surfaces.

The substrate 205 may provide support and protection to various layers, films, and/or structures formed thereon. In some embodiments, the substrate 205 may also be at least partially transparent in the visible wavelength range (e.g., about 380 nm to about 700 nm). In some embodiments, the substrate 205 may also be at least partially transparent in at least a portion of the infrared ("IR") band (e.g., about 700 nm to about 1 mm). The substrate 205 may include a suitable material that is at least partially transparent to lights of the above-listed wavelength ranges, such as, a glass, a plastic, a sapphire, or a combination thereof, etc. The substrate 205 may be rigid, semi-rigid, flexible, or semi-flexible. The substrate 205 may include a flat surface or a curved surface, on which the different layers or films may be formed. In some embodiments, the substrate 205 may be a part of another optical element or device (e.g., another opto-electrical element or device). For example, the substrate 205 may be a solid optical lens, a part of a solid optical lens, or a light guide, etc.

The two substrates 205 (e.g., a first substrate 205a and a second substate 205b) may be disposed apposing (e.g., in parallel with) each other. The first electrode layers 215, the second electrode layers 225, the electrically insulating layers 220, and the alignment structures 210 may be disposed between the two substrates 205 to form a stack. For example, the first electrode layers 215 may be disposed at an inner surface of each of the first substrate 205a and the second substrate 205b. The electrically insulating layers 220 may be disposed at the inner surfaces of the first electrode layers 215 that face one another. Each of the electrically insulating layers 220 may be disposed between each pair of the first electrode layer 215 and the second electrode layer 225. Each of the alignment structures 210 may be disposed between the second electrode layer 225 and the birefringent medium layer. The two alignment structures 210 (e.g., a first alignment structure 210a disposed at the first substrate 205a and a second alignment structure 210b disposed at the second substrate 205b) may be in direct contact with the birefringent medium layer 115.

In some embodiments, the birefringent medium layer 115 may have the first surface 115-1 and the second surface 115-2. In some embodiments, the first surface 115-1 may also be an interface between the birefringent medium layer 115 and the first alignment structure 210a, and the second surface 115-2 may also be an interface between the birefringent medium layer 115 and the second alignment structure 210b. In some embodiments, the birefringent medium layer 115 may include an active, optically anisotropic material, such as active LCs with LC directors reorientable by an external field, e.g., an electric field provided by a power source. The active LCs may have a positive or negative dielectric anisotropy.

Each of the first alignment structure 210a and the second alignment structure 210b may be configured to provide a surface alignment to at least the LC molecules that are in close proximity to (including in contact with) the respective alignment structure (or respective interface). The first alignment structure 210a or the second alignment structure 210b may include any suitable alignment structure, such as a photo-alignment material layer, a mechanically rubbed alignment layer, an alignment layer with anisotropic nano-imprint, an anisotropic relief, or a ferroelectric or ferromagnetic material layer, etc. In some embodiments, the first alignment structure 210a and the second alignment structure 210b may be configured to provide homogeneous surface alignments to the LC molecules in contact with the alignment structure. In some embodiments, the directions of the homogeneous alignments (referred to as alignment directions) provided by the first alignment structure 210a and the second alignment structure 210b may be configured to be symmetrical with respect to a same predetermined in-plane direction.

Figure 2B:
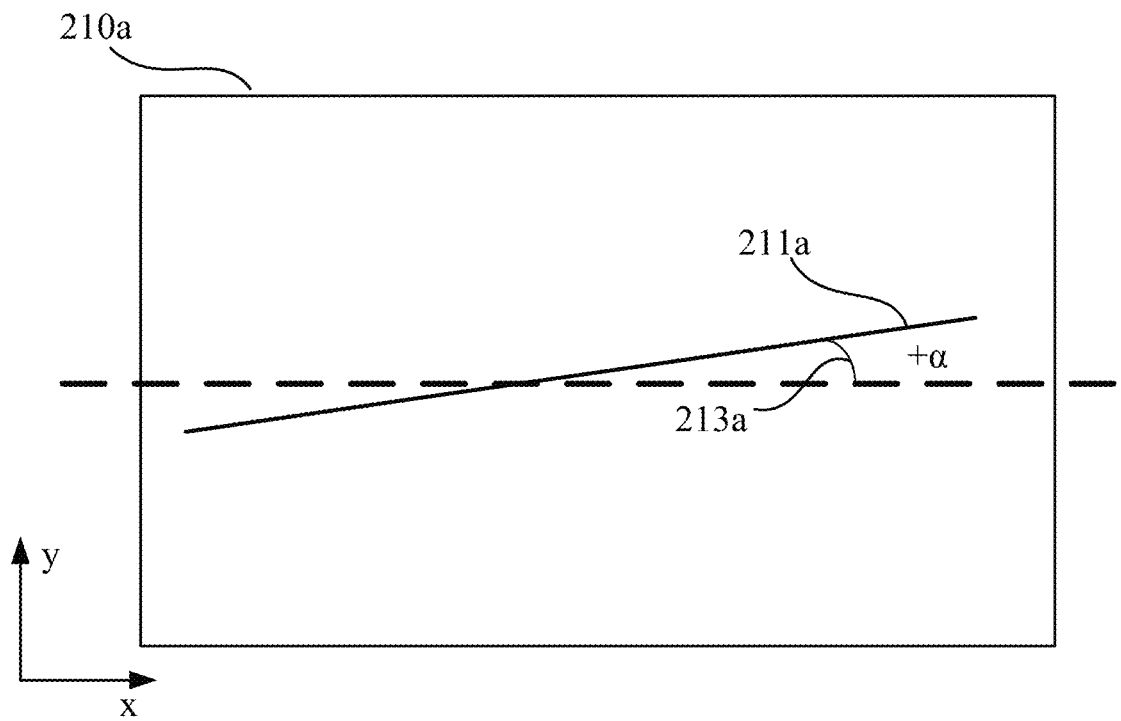
FIG. 2B schematically illustrates a diagram of a first alignment structure included in the lens shown in FIG. 2A, according to an embodiment of the present disclosure.
Figure 2C:
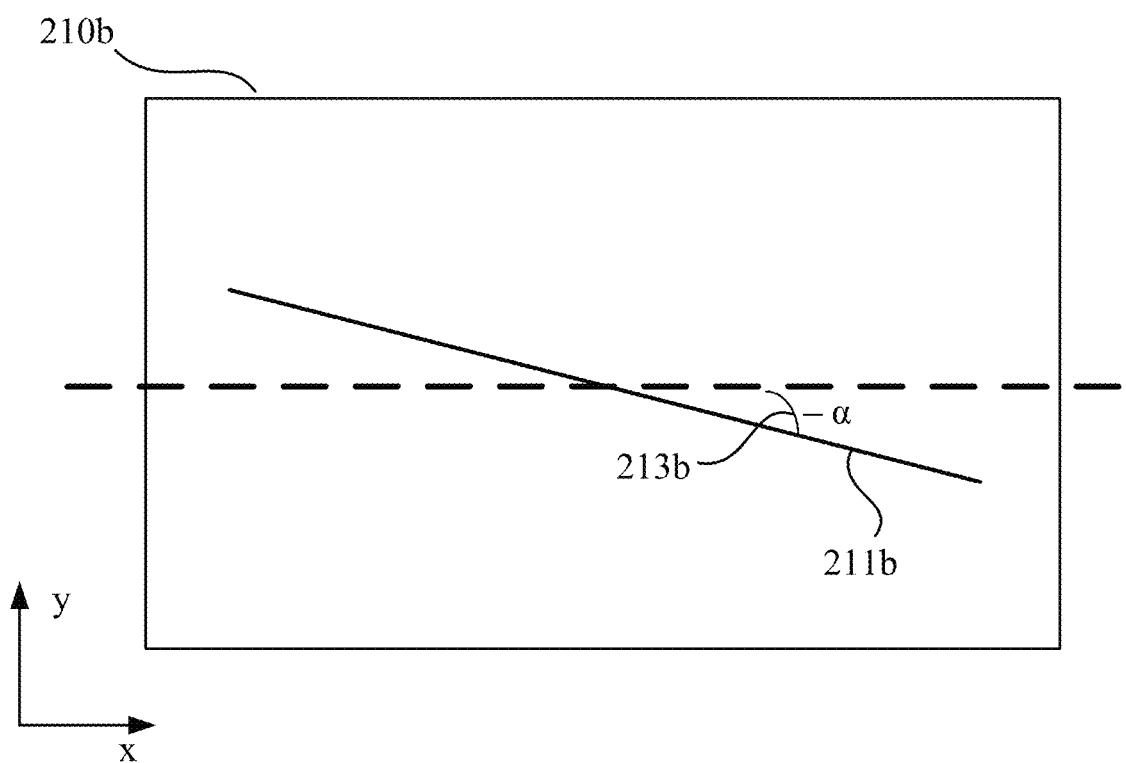
FIG. 2C schematically illustrates a diagram of a first alignment structure included in the lens shown in FIG. 2A, according to an embodiment of the present disclosure.

FIG. 2B illustrates an x-y sectional view of the first alignment structure 210a included in the lens 200 shown in FIG. 2A, according to an embodiment of the present discourse. FIG. 2C illustrates an x-y sectional view of the second alignment structure 210b included in the lens 200 shown in FIG. 2A, according to an embodiment of the present discourse. As shown in FIGS. 2B and 2C, a first alignment direction 211a provided by the first alignment structure 210a may be configured to be counter-clockwise from a predetermined in-plane direction (e.g., an x-axis direction). A second alignment direction 211b provided by the second alignment structure 210b may be configured to be clockwise from the predetermined in-plane direction (e.g., x-axis direction). A first angle 213a formed between the first alignment direction 211a and the predetermined in-plane direction (e.g., x-axis direction) and a second angle 213b formed between the second alignment direction 211b and the predetermined in-plane direction (e.g., x-axis direction) may be configured to have the substantially same absolute value and opposite signs. For example, when an alignment direction is counter-clockwise from the predetermined in-plane direction (e.g., x-axis direction), the angle formed between the alignment direction and the predetermined in-plane direction (e.g., x-axis direction) may be defined as a positive angle, and when an alignment direction is clockwise from the predetermined in-plane direction (e.g., x-axis direction), the angle formed between the alignment direction and the predetermined in-plane direction (e.g., x-axis direction) may be defined as a negative angle. For example, FIG. 2B shows the first angle 213a may be a positive angle +α, and FIG. 2C shows the second angle 213b may be a negative angle −α.

The first electrode layer 215 and the second electrode layer 225 disposed at the same substrate 215 (or same side of the birefringent medium layer 115) may be configured to apply a driving voltage provided by one or more power sources (not shown) to the birefringent medium layer 115. The first electrode layer 215 and the second electrode layer 225 disposed at the same substrate 215 may be configured to apply an in-plane electric field to the birefringent medium layer 115. The first electrode layer 215 and the second electrode layer 225 may include any suitable conductive electrodes, such as indium tin oxide ("ITO") electrodes. In some embodiments, the first electrode layer 215 and the second electrode layer 225 may include a flexible transparent conductive layer, such as ITO disposed on a plastic film. In some embodiments, the plastic film may include polyethylene terephthalate ("PET"). In some embodiments, the plastic film may include cellulose triacetate ("TAC"), which is a type of flexible plastic with a substantially low birefringence. In some embodiments, the first electrode layer 215 and the second electrode layer 225 may be substantially transmissive to an incident light.

Figure 2D:
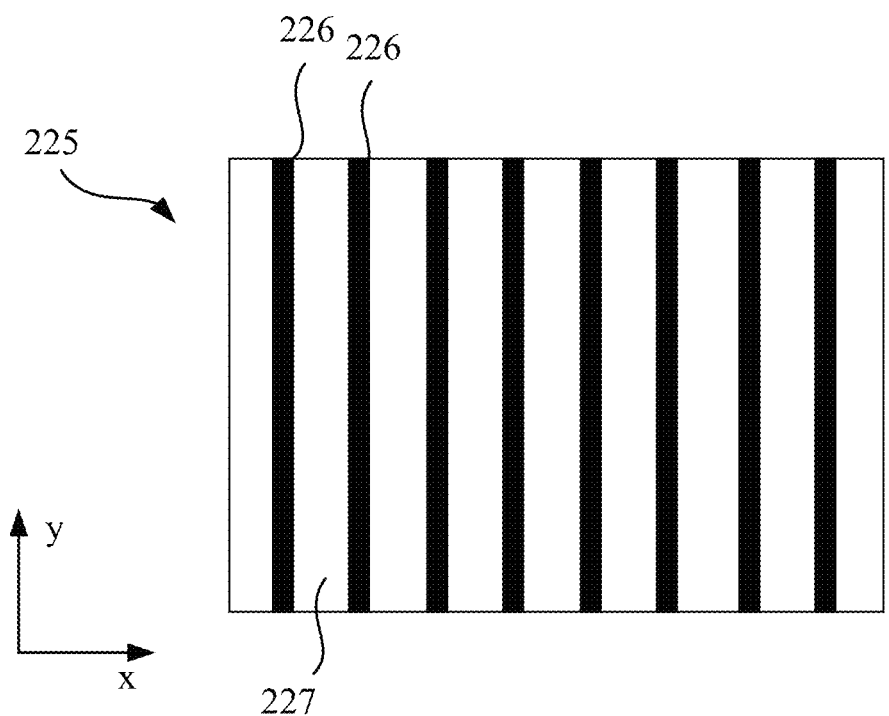
FIGS. 2D and 2E schematically illustrate various diagrams of a patterned electrode layer included in the lens shown in FIG. 2A, according to various embodiments of the present disclosure.
Figure 2E:
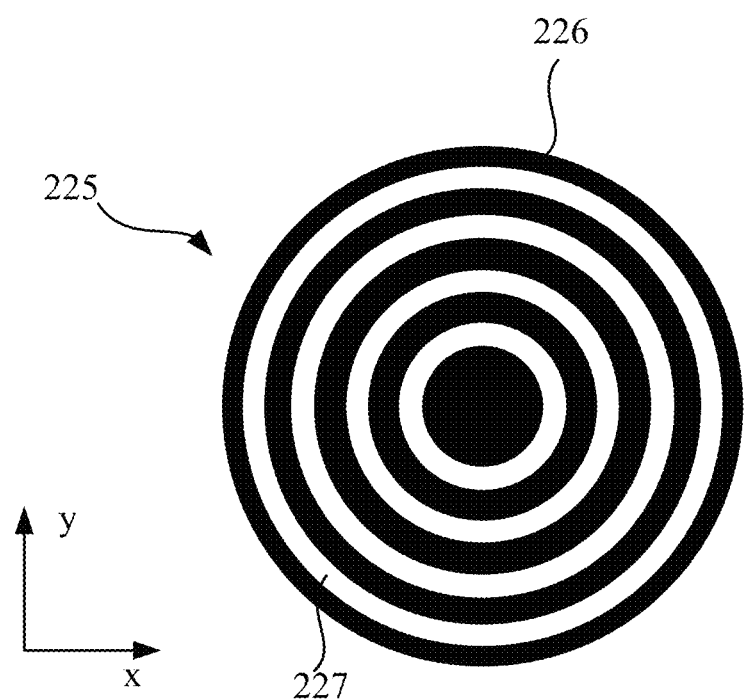

The first electrode layer 215 or the second electrode layer 225 may be a continuous planar electrode layer, a patterned planar electrode layer, or a patterned protrusion electrode layer. For discussion purposes, FIG. 2A shows that the first electrode layer 215 and the second electrode layer 225 are planar electrodes. In some embodiments, the first electrode layer 215 may be a continuous planar electrode layer, and the second electrode layer 225 may be a patterned planar electrode layer. FIGS. 2D and 2E illustrate x-y sectional views of the second electrode layer 225 included in the lens 200 shown in FIG. 2A, according to various embodiments of the present discourse. As shown in FIGS. 2D and 2E, the second electrode layer 225 may include a plurality of parallel, discrete electrodes 226 (also referred to as patterned electrodes 226) spaced apart from one another with gaps 227. In some embodiments, the electrodes 226 may include stripe-shaped electrodes, annular (ring-shaped) electrodes (which may include a circular electrode at the center), zig-zag electrodes, interdigitated electrodes, and/or pixelated electrodes, etc. The widths of the electrodes 226 and the widths of the gaps 227 may be smaller than the thickness of the birefringent medium layer 115. The widths of the gaps 227 may be smaller than the widths of the electrodes 226.

In some embodiments, the patterned electrodes 226 may be substantially transmissive to a light incident onto the second electrode layer 225. In some embodiments, the widths of the electrodes 226 may be substantially the same. For discussion purposes, FIG. 2D shows that the second electrode layer 225 includes a plurality of electrodes 226 that are stripe-shaped electrodes. The second electrode layer 225 shown in FIG. 2D may be included in the lens 200 functioning as a PBP cylindrical lens. FIG. 2E shows that the second electrode layer 225 includes a plurality of electrodes 226 that are annular (ring-shaped) electrodes (which may include a circular electrode at the center). The second electrode layer 225 shown in FIG. 2E may be included in the lens 200 functioning as a PBP spherical lens.

Referring to FIG. 2A, the electrodes 226 of the second electrode layer 225 at the first substrate 205a may be substantially aligned and are in parallel with the electrodes 226 of the second electrode layer 225 at the second substrate 205b. For discussion purposes, a combination of the substrate 205, and the first electrode layer 215, the electrically insulating layer 220, the second electrode layer 225, and the alignment structure 210 disposed at the substate 205 may be referred to as a fringe field switching ("FFS") substrate 250. For example, as shown in FIG. 2A, the combination of the first substrate 205a, and the first electrode layer 215, the electrically insulating layer 220, the second electrode layer 225, and the first alignment structure 210a disposed at the first substate 205a may be referred to as a first FFS substrate 250a. The combination of the second substate 205b, and the first electrode layer 215, the electrically insulating layer 220, the second electrode layer 225, and the second alignment structure 210b disposed at the second substate 205b may be referred to as a second FFS substrate 250b.

The second electrode layer 225 and the first electrode layer 215 disposed at the same substate 205 (or in the same FFS substrate 250) may be electrically coupled with one or more power sources (not shown). In some embodiments, during an operation of the lens 200, the first electrode layer 215 may be applied with a constant voltage, e.g., may be grounded (e.g., 0V) or applied with a predetermined positive or negative voltage (e.g., 10V or −10V). The voltages applied to the respective electrodes 226 of the second electrode layer 225 disposed at each substrate 205 may be individually or independently controlled. For example, the lens 100 may be communicatively coupled with a controller 230. The controller 230 may control the outputs of one or more power sources to individually or independently control the voltages applied to the respective electrodes 226 of the second electrode layer 225 on each substrate 205. The controller 230 may include a processor or processing unit 231. The processor 231 may by any suitable processor, such as a central processing unit ("CPU"), a graphic processing unit ("GPU"), etc. The controller 230 may include a storage device 232. The storage device 232 may be a non-transitory computer-readable medium, such as a memory, a hard disk, etc. The storage device 232 may be configured to store data or information, including computer-executable program instructions or codes, which may be executed by the processor 231 to perform various controls or functions described in the methods or processes disclosed herein.

Referring to FIGS. 2A-2E, through individually or independently controlling the voltages applied to the respective electrodes 226 of the second electrode layer 225, the in-plane electric fields that are generated between the respective electrodes 226 of the second electrode layer 225 and the first electrode layer 215 disposed at the same substate 205 may be individually or independently configured. Thus, the local orientations of the LC directors (or local azimuthal angles $\phi$ of the LC molecules) in the birefringent medium layer 115 may be individually or independently configured. For example, through individually or independently controlling the voltages applied to the respective electrodes 226 of the second electrode layer 225 on each substrate 205, the LC directors of the LC molecules in the birefringent medium layer 115 (or the orientations of the optic axis of the birefringent medium layer 115) may be configured to have an in-plane orientation pattern (or a lens pattern) similar to that shown in FIG. 1B, FIG. 1D, or FIG. 1F. In addition, through individually or independently changing the voltages applied to the respective electrodes 226 of the second electrode layer 225 on each substrate 205, the in-plane orientation pattern (or lens pattern) may be adjustable, e.g., at least one of the position of the lens pattern center ($O_L$), pitches of the lens pattern, or the handedness of the rotation of the orientations of the LC directors in the at least two opposite in-plane directions from the lens pattern center ($O_L$) to the opposite lens peripheries, may be adjustable. Thus, at least one of the position of the optical center or the optical power of the lens 200 may be dynamically adjustable or tunable during operations.

In some embodiments, the azimuthal angle $\phi$ of the LC molecule may have any suitable value within a range between +90° and −90°. For discussion purposes, when the LC director is counter-clockwise from the predetermined in-plane direction (e.g., x-axis direction), the azimuthal angle $\phi$ of the LC molecule may be defined as a positive angle, and when the LC director is clockwise from the predetermined in-plane direction (e.g., x-axis direction), the azimuthal angle $\phi$ of the LC molecule may be defined as a negative angle. When the LC director is along the predetermined in-plane direction (e.g., x-axis direction), the azimuthal angle $\phi$ of the LC molecule may be defined as zero.

Referring to FIG. 1B, FIG. 1D, FIG. 1F, and FIG. 2A, for discussion purposes, the lens 200 may be divided into a plurality of segments, in each of which the LC molecules may exhibit a periodic (e.g., 180°) rotation in the predetermined in-plane direction. In some embodiments, each segment may correspond to one in-plane pitch $\Lambda$ of the lens pattern. Each segment may include a portion of the first FFS substrate 250a, a corresponding portion of the second FFS substate 250b, and a corresponding portion of the birefringent medium layer 115. Referring to FIG. 1B, FIG. 1D, FIG. 1F, FIG. 2A, FIG. 2D, and FIG. 2E, in some embodiments, the segments of the lens 200 may include different numbers of the patterned electrodes 226. In some embodiments, a segment corresponding to a longer in-plane pitch $\Lambda$ of the lens pattern may include a larger number of the patterned electrodes 226, thereby realizing a smooth rotation of the LC molecules included in the segment. In some embodiments, as the in-plane pitch $\Lambda$ of the lens pattern decreases from the lens pattern center ("$O_L$") 150 to the opposite lens peripheries 155, the numbers of the patterned electrodes 226 included in the segments may decrease. For example, referring to FIG. 1D and FIG. 2D, a segment corresponding to the in-plane pitch $\Lambda_0$ of the lens pattern may include a maximum number of the patterned electrodes 226, and a segment corresponding to the in-plane pitch $\Lambda_r$ of the lens pattern may include a minimum number of the patterned electrodes 226. The number of the patterned electrodes 226 included in a segment corresponding to the in-plane pitch $\Lambda_1$ of the lens pattern may be less than the number of the patterned electrodes 226 included in the segment corresponding to the in-plane pitch $\Lambda_0$ of the lens pattern, and greater than the number of the patterned electrodes 226 included in the segment corresponding to the in-plane pitch $\Lambda_r$ of the lens pattern.

In some embodiments, the lens 200 may be configured to function as a PBP spherical lens. The second electrode layer 225 disposed at each substate 205 may include annular (ring-shaped) electrodes (similar to that shown in FIG. 2E).

In some embodiments, through individually or independently controlling the voltages applied to the respective annular (ring-shaped) electrodes 226 of the second electrode layer 225 on each substrate 205, the LC directors of the LC molecules (or the orientations of the optic axis of the birefringent medium layer 115) may be configured to have an in-plane orientation pattern (or a spherical lens pattern) that is similar to that shown in FIG. 1B. In some embodiments, through individually or independently changing the voltages applied to the annular (ring-shaped) electrodes 226 of the second electrode layer 225 on the substrates 205, the in-plane orientation pattern (or lens pattern) may be adjustable, e.g., at least one of the position of the lens pattern center ($O_L$), pitches of the lens pattern, or the handedness of the rotation of the orientations of the LC directors in the at least two opposite in-plane directions from the lens pattern center ($O_L$) to the opposite lens peripheries, may be adjustable. Thus, at least one of the position of the optical center or the optical power the lens 200 may be adjustable or tunable.

In some embodiments, the lens 200 may be configured to function as a PBP cylindrical lens. The second electrode layer 225 disposed at each substrate 205 may be configured to include stripe-shaped electrodes (similar to that shown in FIG. 2D). In some embodiments, through individually or independently controlling the voltages applied to the respective stripe-shaped electrodes 226 of the second electrode layer 225 on each substrate 205, the LC directors of the LC molecules (or the orientations of the optic axis of the birefringent medium layer 115) may be configured to have an in-plane orientation pattern (or a cylindrical lens pattern) that is similar to that shown in FIG. 1D or FIG. 1F. In some embodiments, through individually or independently changing the voltages applied to the respective stripe-shaped electrodes 226 of the second electrode layer 225 on the substrates 205, the in-plane orientation pattern (or lens pattern) may be adjustable, e.g., at least one of the position of the lens pattern center ($O_L$), pitches of the lens pattern, or the handedness of the rotation of the orientations of the LC directors in the at least two opposite in-plane directions from the lens pattern center ($O_L$) to the opposite lens peripheries, may be adjustable. Thus, at least one of the position of the optical center or the optical power the lens 200 may be adjustable or tunable.

Figure 3:
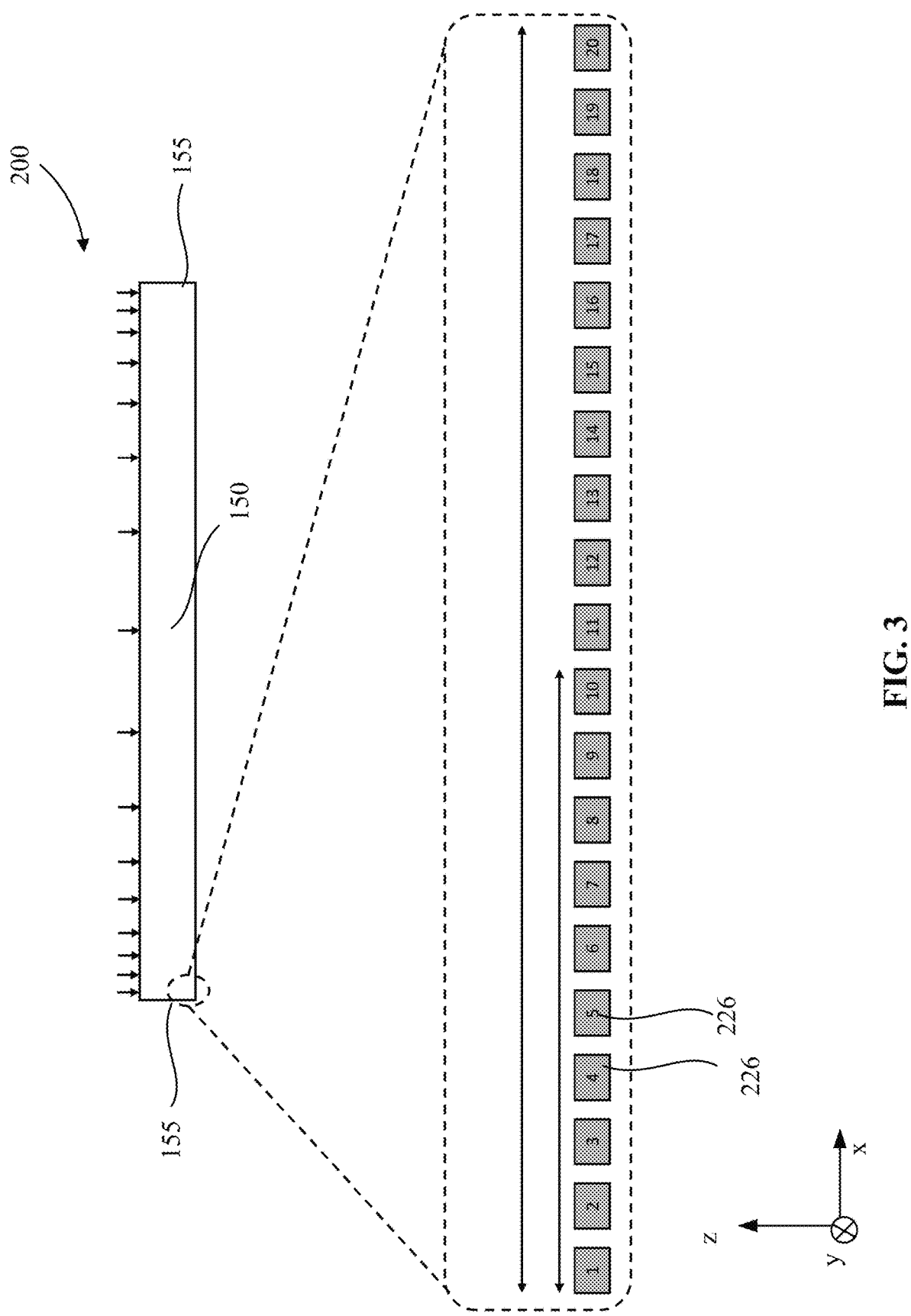
FIG. 3 schematically illustrates a diagram of patterned electrodes disposed at a lens periphery of the lens shown in FIG. 2A, according to an embodiment of the present disclosure.

FIG. 3 illustrates an x-z sectional view of the patterned electrodes 226 disposed at the lens peripheries 155 of the lens 200 shown in FIG. 2A-2E, according to an embodiment of the present disclosure. In some embodiments, when the incidence wavelength λ and the radius R of the aperture of the lens 200 are fixed, the optical power $P_D$ of the lens 200 may change with the in-plane pitch at the lens periphery 155. In some embodiments, to realize a smooth periodic (e.g., 180°) rotation of the LC molecules, the number of the patterned electrodes 226 that are selected to enable one periodic (e.g., 180°) rotation of the LC molecules at the lens periphery 155 may be configured to vary with the in-plane pitch at the lens periphery 155. For example, the number of the patterned electrodes 226 that are selected to be included in the segment located at the lens periphery 155 may be configured to vary with the in-plane pitch at the lens periphery 155. In other words, when the optical power D of the lens 200 is switched, the number of the patterned electrodes 226 that are selected to enable one periodic (e.g., 180°) rotation of the LC molecules at the lens periphery 155 may vary accordingly.

Referring to the enlarged view of the patterned electrodes 226 disposed at the lens peripheries 155 of the lens 200 shown in FIG. 3, for discussion purposes, FIG. 3 shows twenty patterned electrodes (e.g., stripe-shaped electrodes) 226 at the lens periphery 155. For discussion purposes, the twenty patterned electrodes (e.g., stripe-shaped electrodes) 226 may be included in the second FFS substrate 250b in FIG. 2A. For example, as shown in FIG. 3, to configure the lens 200 to have an optical power of four diopters, the in-plane pitch at the lens periphery 155 may be calculated as Λ1. Ten patterned electrodes 226 located at the lens periphery 155, e.g., the electrodes numbered from 1 to 10, may be selected to enable one periodic (e.g., 180°) rotation of the LC molecules at the lens periphery 155, corresponding to the in-plane pitch Λ1. To configure the lens 200 to have an optical power of two diopters, the in-plane pitch at the lens periphery 155 may be calculated as Λ2. In some embodiments, Λ2 may be two times of Λ1. Twenty patterned electrodes 226 located at the lens periphery 155, e.g., the electrodes numbered from 1 to 20, may be selected to enable one periodic (e.g., 180°) rotation of the LC molecules at the lens periphery 155, corresponding to the in-plane pitch Λ2.

Although not shown, in some embodiments, to configure the lens 200 to have an optical power of one diopter, the in-plane pitch at the lens periphery 155 may be calculated as Λ3. In some embodiments, Λ3 may be four times of Λ1. Forty patterned electrodes 226 located at the lens periphery 155, e.g., the electrodes numbered from 1 to 40 (not shown), may be selected to enable one periodic (e.g., 180°) rotation of the LC molecules at the lens periphery 155, corresponding to the in-plane pitch Λ3.

FIGS. 4A-4J illustrate x-z sectional views of the orientations of the LC molecules included in a segment corresponding to one in-plane pitch Λ of the lens pattern of the lens 200 shown in FIGS. 2A-2E. FIGS. 4A-4J also illustrate the patterned electrodes 226A-226H and 226A'-226H' that may be included in the segment corresponding to one in-plane pitch Λ of the lens pattern of the lens 200 shown in FIGS. 2A-2E. For discussion purposes, FIGS. 4A-4J show that the segment corresponding to one in-plane pitch Λ includes eight patterned electrodes 226A-226H at the first FFS substate 250a, and eight patterned electrodes 226A'-226H' included in the second FFS substate 250b. The patterned electrodes 226A-226H included in the first FFS substrate 250a may be aligned and parallel with the patterned electrodes 226A'-226H' included in the second FFS substate 250b, respectively. FIGS. 4A, 4C, 4E, 4G, and 4I illustrate the patterned electrodes 226A-226H included in the first FFS substate 250a, and the orientations of the LC molecules 112a-112h located in close proximity to or at the first surface 115-1 of the birefringent medium layer 115. FIGS. 4B, 4D, 4F, 4H, and 4J illustrate the patterned electrodes 226A'-226H' included in the second FFS substate 250b, and the orientations of the LC molecules 112a'-112h' located in close proximity to or at the second surface 115-2 of the birefringent medium layer 115.

FIGS. 4A and 4B illustrate the orientations of the LC molecules 112a-112h and the LC molecules 112a' to 112h' at a voltage-off state, respectively. As shown in FIGS. 4A and 4B, the voltages applied to the patterned electrodes 226A-226H and 226A'-226H' may be zero. As shown in FIG. 4A, the LC molecules 112a-112h at the first surface 115-1 of the birefringent medium layer 115 may be aligned in the alignment direction 211a, with azimuthal angles ϕ of +α (e.g., +2°). As shown in FIG. 4B, the LC molecules 112a'-112h' at the second surface 115-2 of the birefringent medium layer 115 may be aligned in the alignment direction 211b, with azimuthal angles ϕ of −α (e.g., −2°). The LC molecules in the volume of the birefringent medium layer 115 may follow the alignments or orientations of neighboring LC molecules. In such an embodiment, the lens 200 may operate in a relaxation state (or neutral state), with a zero optical power. The lens 200 that operates in the relaxation state (or neutral state) may not converge or diverge a circularly polarized light transmitted therethrough. In some embodiments, the lens 200 that operates in the relaxation state (or neutral state) may reverse or maintain the handedness of a circularly polarized light transmitted therethrough. The azimuthal angles of the LC molecules in the lens 200 operating at the voltage-off state may be referred to as initial azimuthal angles.

For a circularly polarized input light having a predetermined handedness, to configure the lens 200 to operate in an operation state with a predetermined optical power, the driving (i.e., the application of voltages) of the lens 200 may include two steps. In a first driving step, the signs (e.g., "+" or "−") of the azimuthal angles ϕ of the LC molecules may be set through the application of a first electric field. In a second driving step, the values of the azimuthal angles ϕ of the LC molecules may be set through the application of a second electric field. Thus, a desirable lens pattern corresponding to the predetermined optical power may be formed in the birefringent medium layer 115.

For example, to drive the lens 200 to operate in a first operation state to provide a first predetermined optical power to the circularly polarized input light having the predetermined handedness, the driving of the lens 200 may include two steps. FIGS. 4C and 4D illustrate the orientations of the LC molecules 112a-112h and the LC molecules 112a' to 112h' in the first driving step, respectively. As shown in FIGS. 4C and 4D, the orientations of the LC molecules 112a-112h shown in FIG. 4C may be different from the orientations of the LC molecules 112a'-112h' shown in FIG. 4D. The azimuthal angles of the LC molecules at the first driving step may be referred to as intermediate azimuthal angles.

FIGS. 4E and 4F illustrate the orientations of the LC molecules 112a-112h and the LC molecules 112a' to 112h' in the second driving step, respectively. The orientations of the LC molecules 112a-112h and the LC molecules 112a' to 112h' shown in FIGS. 4E and 4F may form a portion of the desirable (or predetermined) lens pattern corresponding to the first predetermined optical power. The orientations of the LC molecules 112a-112h shown in FIG. 4E may be substantially the same as the orientations of the LC molecules 112a'-112h' shown in FIG. 4F. As shown in FIGS. 4E and 4F, the LC molecules 112a-112d and 112a'-112d' may have positive azimuthal angles ϕ, and the molecules 112e-112h and 112e'-112h' may have negative azimuthal angles ϕ. The LC directions of the LC molecules 112a-112h (or 112a'-112h') may exhibit a continuous rotation in the predetermined in-plane direction, e.g., in a clockwise direction. The azimuthal angles of the LC molecules forming the desirable lens pattern corresponding to the predetermined optical power may be referred to as designated azimuthal angles.

To configure the LC molecules 112a-112h and the LC molecules 112a' to 112h' to have the desirable orientations shown in FIGS. 4E and 4F, in the first driving step, the patterned electrodes corresponding to the LC molecules, of which the initial azimuthal angles and the designated azimuthal angles have the same sign, may be applied with a same predetermined driving voltage (e.g., +10V), e.g., with a duration of about 1 ms to 15 ms. The patterned electrodes corresponding to the LC molecules, of which the initial azimuthal angles and designated azimuthal angles have opposite signs, may be grounded. The first electrode layers 215 on the first FFS substate 250a and the second FFS substate 250b may also be grounded.

For example, referring to FIG. 4C, the patterned electrodes 226A-226D corresponding to the LC molecules 112a-112d, of which the initial azimuthal angles and the designated azimuthal angles have the same sign (e.g., "+" sign), may be applied with the same predetermined driving voltage (e.g., +10V). The magnitude of the predetermined driving voltage (e.g., +10V) may be configured, such that the generated electric field may reorient the corresponding LC molecules 112a'-112d' located in close proximity to or at the second surface 115-2 of the birefringent medium layer 115 to have positive intermediate azimuthal angles, as shown in FIG. 4D. Referring to FIG. 4C, the patterned electrodes 226E-226H corresponding to the LC molecules 112e-112h, of which the initial azimuthal angles and the designated azimuthal angles have the opposite signs, may be grounded.

Referring to FIG. 4D, the patterned electrodes 226E'-226H' corresponding to the LC molecules 112e'-112h', of which the initial azimuthal angles and the designated azimuthal angles have the same sign (e.g., "−" sign), may be applied with the same predetermined driving voltage (e.g., +10V). The magnitude of the predetermined driving voltage (e.g., +10V) may be configured, such that the generated electric field may reorient the corresponding LC molecules 112e-112h located in close proximity to or at the first surface 115-1 of the birefringent medium layer 115 to have negative intermediate azimuthal angles, as shown in FIG. 4C. Referring to FIG. 4D, the patterned electrodes 226A'-226D' corresponding to the LC molecules 112a'-112e', of which the initial azimuthal angles and the designated azimuthal angles have the opposite signs, may be grounded.

In the second driving step, the voltages applied to the patterned electrodes 226A-226H and 226A'-226H' may be individually configured, such that the LC molecules 112a-112h and 112a'-112h' may be reoriented to have the designated azimuthal angles shown in FIGS. 4E and 4F. For example, in the embodiment shown in FIG. 4E, from the patterned electrode 226D to the patterned electrode 226A, and from the patterned electrode 226E to the patterned electrode 226H, the voltage difference between the patterned electrode and the first electrode layer 215 disposed at the first FFS substrate 250a may gradually decrease. In the embodiment shown in FIG. 4F, from the patterned electrode 226D' to the patterned electrode 226A', and from the patterned electrode 226E' to the patterned electrode 226H', the voltage difference between the patterned electrode and the first electrode layer 215 disposed at the second FFS substrate 250b may gradually decrease. In the embodiment shown in FIGS. 4E and 4F, the voltage differences between the patterned electrodes 226A-226H and the first electrode layer 215 disposed at the first FFS substrate 250a may follow a spatial profile from the leftmost patterned electrode 226A to the rightmost patterned electrode 226H. The voltage differences between the patterned electrodes 226A'-226H' and the first electrode layer 215 disposed at the second FFS substrate 250b may follow the same spatial profile from the leftmost patterned electrode 226A' to the rightmost patterned electrode 226H.

In some embodiments, the birefringent medium layer 115 may include negative LCs. To enhance the in-plane orientation of the LC molecules and reduce the out-of-plane orientation of the LC molecules during the driving of the lens 200, the first electrode layers 215 disposed at the first FFS substrate 250b and the second FFS substrate 250b may be applied with different voltages. In some embodiments, one of the first electrode layers 215 disposed at the first FFS substrate 250*b* and the second FFS substrate 250*b* may be grounded (e.g., 0V), and the other one of the first electrode layers 215 disposed at the first FFS substrate 250*b* and the second FFS substrate 250*b* may be applied with a predetermined voltage (e.g., +10V).

For example, the first electrode layer 215 disposed at the first FFS substrate 250*b* may be applied with the predetermined voltage (e.g., +10V), and the first electrode layer 215 disposed at the second FFS substrate 250*b* may be grounded. The patterned electrodes 226A-226H disposed at the first FFS substrate 250*a* may be applied with voltages of +9V, +5V, +3V, +0V, +0V, +3V, +5V, +9V, respectively. The voltage differences between the patterned electrodes 226A-226H and the first electrode layer 215 disposed at the first FFS substrate 250*a* may be 1V, 5V, 7V, 10V, 10V, 7V, 5V, 1V, respectively. Thus, the spatial distribution of the voltage differences versus the locations of the patterned electrodes 226A-226H follow a spatial profile. The patterned electrodes 226A'-226H' disposed at the second FFS substrate 250*b* may be applied with voltages of +1V, +5V, +7V, +10V, +10V, +7V, +5V, +1V, respectively. The voltage differences between the patterned electrodes 226A'-226H' and the first electrode layer 215 disposed at the second FFS substrate 250*b* may be 1V, 5V, 7V, 10V, 10V, 7V, 5V, 1V, respectively. The spatial distribution of the voltage differences versus the locations of the patterned electrodes 226A'-226H' follow the same spatial profile as the one associated with the patterned electrodes 226A-226H. The voltage difference between one of the patterned electrodes 226A-226H and the first electrode layer 215 disposed at the first FFS substrate 250*a* may be the same as the voltage difference between a corresponding one of the patterned electrodes 226A'-226H' and the first electrode layer 215 disposed at the second FFS substrate 250*b*.

In some embodiments, to switch the lens 200 to operate in a second operation state from the first operation state, the voltages applied to the patterned electrodes 226A-226H and 226A'-226H' and the first electrode layers 215 may be removed first. The LC molecules 112*a*-112*h* and 112*a*'-112*h*' may return to the relaxation state, as shown in FIGS. 4A and 4B. To drive the lens 200 to operate in the first operation state to provide a second predetermined optical power to the circularly polarized input light having the predetermined handedness, the driving of the lens 200 may include two steps. FIGS. 4G and 4H illustrate the orientations of the LC molecules 112*a*-112*h* and the LC molecules 112*a*' to 112*h*' in the first driving step, respectively. As shown in FIGS. 4G and 4H, the orientations of the LC molecules 112*a*-112*h* shown in FIG. 4G may be different from the orientations of the LC molecules 112*a*'-112*h*' shown in FIG. 4H. The azimuthal angles of the LC molecules at the first driving step may be referred to as intermediate azimuthal angles.

FIGS. 4I and 4J illustrate the orientations of the LC molecules 112*a*-112*h* and the LC molecules 112*a*' to 112*h*' in the second driving step, respectively. The orientations of the LC molecules 112*a*-112*h* and the LC molecules 112*a*' to 112*h*' shown in FIGS. 4I and 4J may form a portion of the desirable lens pattern corresponding to the second predetermined optical power. The orientations of the LC molecules 112*a*-112*h* shown in FIG. 4I may be substantially the same as the orientations of the LC molecules 112*a*'-112*h*' shown in FIG. 4J. As shown in FIGS. 4I and 4J, the LC molecules 112*a*-112*d* and 112*a*'-112*d*' may have negative azimuthal angles ϕ, and the molecules 112*e*-112*h* and 112*e*'-112*h*' may have positive azimuthal angles ϕ. The LC directions of LC molecules 112*a*-112*h* (or 112*a*'-112*h*') may exhibit a continuous rotation in the predetermined in-plane direction, e.g., in a counter-clockwise direction. The azimuthal angles of the LC molecules forming the desirable lens pattern corresponding to the predetermined optical power may be referred to as designated azimuthal angles.

To configure the LC molecules 112*a*-112*h* and the LC molecules 112*a*' to 112*h*' to have the desirable orientations shown in FIGS. 4I and 4J, in the first driving step, the patterned electrodes corresponding to the LC molecules, of which the initial azimuthal angles and the designated azimuthal angles have the same sign, may be applied with a same predetermined driving voltage (e.g., +10V), e.g., with a duration of about 1 ms to 15 ms. The patterned electrodes corresponding to the LC molecules, of which the initial azimuthal angles and designated azimuthal angles have opposite signs, may be grounded. The first electrode layers 215 on the first FFS substate 250*a* and the second FFS substate 250*b* may also be grounded.

For example, referring to FIG. 4G, the patterned electrodes 226E-226H corresponding to the LC molecules 112*e*-112*h*, of which the initial azimuthal angles and the designated azimuthal angles have the same sign (e.g., "+" sign), may be applied with the same predetermined driving voltage (e.g., +10V). The magnitude of the predetermined driving voltage (e.g., +10V) may be configured, such that the generated electric field may reorient the corresponding LC molecules 112*e*'-112*h*' located in close proximity to or at the second surface 115-2 of the birefringent medium layer 115 to have positive intermediate azimuthal angles, as shown in FIG. 4H. Referring to FIG. 4G, the patterned electrodes 226A-226D corresponding to the LC molecules 112*a*-112*d*, of which the initial azimuthal angles and the designated azimuthal angles have the opposite signs, may be grounded.

Referring to FIG. 4H, the patterned electrodes 226A'-226D' corresponding to the LC molecules 112*a*'-112*d*', of which the initial azimuthal angles and the designated azimuthal angles have the same sign (e.g., "−" sign), may be applied with the same predetermined driving voltage (e.g., +10V). The magnitude of the predetermined driving voltage (e.g., +10V) may be configured, such that the generated electric field may reorient the corresponding LC molecules 112*a*-112*d* located in close proximity to or at the first surface 115-1 of the birefringent medium layer 115 to have negative intermediate azimuthal angles, as shown in FIG. 4G. Referring to FIG. 4H, the patterned electrodes 226E'-226H' corresponding to the LC molecules 112*e*'-112*h*', of which the initial azimuthal angles and the designated azimuthal angles have the opposite signs, may be grounded.

In the second driving step, the voltages applied to the patterned electrodes 226A-226H and 226A'-226H' may be individually configured, such that the LC molecules 112*a*-112*h* and 112*a*'-112*h*' may be reoriented to have the designated azimuthal angles shown in FIGS. 4I and 4J. For example, in the embodiment shown in FIG. 4I, from the patterned electrode 226D to the patterned electrode 226A, and from the patterned electrode 226E to the patterned electrode 226H, the voltage difference between the patterned electrodes and the first electrode layer 215 disposed at the first FFS substrate 250*a* may gradually decrease. The gradual decrease in the voltage difference versus the locations of the patterned electrodes 226A-226H may follow a spatial profile. In the embodiment shown in FIG. 4J, from the patterned electrode 226D' to the patterned electrode 226A', and from the patterned electrode 226E' to the patterned electrode 226H', the voltage difference between the patterned electrodes and the first electrode layer 215 disposed at the second FFS substrate 250*b* may gradually decrease. The gradual decrease in the voltage difference versus the locations of the patterned electrodes 226A'-226H' may follow the same spatial profile as the one associated with the patterned electrodes 226A-226H. In the embodiment shown in FIGS. 4I and 4J, the voltage difference between one of the patterned electrodes 226A-226H and the first electrode layer 215 disposed at the first FFS substrate 250a may be the same as the voltage difference between a corresponding one of the patterned electrodes 226A'-226H' and the first electrode layer 215 disposed at the second FFS substrate 250b.

In some embodiments, the birefringent medium layer 115 may include negative LCs. To enhance the in-plane orientation of the LC molecules and reduce the out-of-plane orientation of the LC molecules during the driving of the lens 200, the first electrode layers 215 disposed at the first FFS substrate 250b and the second FFS substrate 250b may be applied with different voltages. In some embodiments, one of the first electrode layers 215 disposed at the first FFS substrate 250b and the second FFS substrate 250b may be grounded (e.g., 0V), and the other one of the first electrode layers 215 disposed at the first FFS substrate 250b and the second FFS substrate 250b may be applied with a predetermined voltage (e.g., +10V).

For example, the first electrode layer 215 disposed at the first FFS substrate 250b may be applied with the predetermined voltage (e.g., +10V), and the first electrode layer 215 disposed at the second FFS substrate 250b may be grounded. The patterned electrodes 226A-226H disposed at the first FFS substrate 250a may be applied with voltages of +9V, +5V, +3V, +0V, +0V, +3V, +5V, +9V, respectively. The voltage differences between the patterned electrodes 226A-226H and the first electrode layer 215 disposed at the first FFS substrate 250a may be 1V, 5V, 7V, 10V, 10V, 7V, 5V, 1V, respectively. The spatial distribution of the voltage differences versus the locations of the patterned electrodes 226A-226H may follow a spatial profile. The patterned electrodes 226A'-226H' disposed at the second FFS substrate 250b may be applied with voltages of +1V, +5V, +7V, +10V, +10V, +7V, +5V, +1V, respectively. The voltage differences between the patterned electrodes 226A'-226H' and the first electrode layer 215 disposed at the second FFS substrate 250b may be 1V, 5V, 7V, 10V, 10V, 7V, 5V, 1V, respectively. The spatial distribution of the voltage differences versus the locations of the patterned electrodes 226A'-226H' may follow the same spatial profile as the one associated with the patterned electrodes 226A-226H. The voltage difference between one of the patterned electrodes 226A-226H and the first electrode layer 215 disposed at the first FFS substrate 250a may be the same as the voltage difference between a corresponding one of the patterned electrodes 226A'-226H' and the first electrode layer 215 disposed at the second FFS substrate 250b.

FIGS. 4A-4J illustrate the driving of one segment corresponding to one in-plane pitch of the lens pattern of the lens 200 shown in FIG. 2. The driving of other segments in the lens 200 may be similar to that shown in FIGS. 4A-4J. For discussion purposes, FIGS. 4A-4J illustrate that one segment of the lens 200 includes eight patterned electrodes at each of the first FFS substate 250a and the second FFS substance 250b. For discussion purposes, FIGS. 4C and 4D, 4G, and 4H illustrate that during the first driving step, half of the eight patterned electrodes at each of the first FFS substrate 250a and the second FFS substance 250b may be applied with the predetermined voltage (e.g., 10V), in which the half of the eight patterned electrodes at the first FFS substate 250a and the half of the eight patterned electrodes at the second FFS substate 250a may correspond to two non-overlapping regions (e.g., a left region and a right region) of the segment of the lens 200. In some embodiments, one segment of the lens 200 may be configured to include N patterned electrodes at each of the first FFS substate 250a and the second FFS substance 250b, where N is a positive even number. During the first driving step, N/2 patterned electrodes at each of the first FFS substate 250a and the second FFS substance 250b may be applied with the predetermined voltage (e.g., 10V), in which the N/2 patterned electrodes at the first FFS substate 250a and the N/2 patterned electrodes at the second FFS substate 250a may correspond to two non-overlapping regions of the segment of the lens 200.

In some embodiments, one segment of the lens 200 may include any suitable number of patterned electrodes at each of the first FFS substate 250a and the second FFS substance 250b. During the first driving step, less than half or more than half of the patterned electrodes at each of the first FFS substate 250a and the second FFS substance 250b may be applied with the predetermined voltage (e.g., 10V).

Figure 5A:
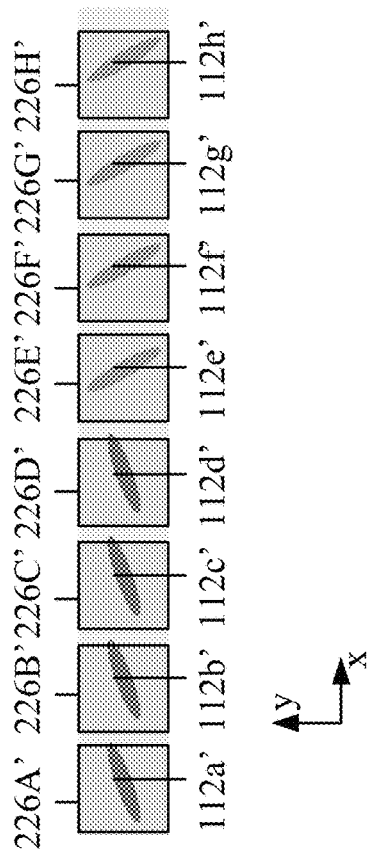
FIGS. 5A and 5B schematically illustrate diagrams of orientations of LC molecules included in a segment of the lens shown in FIGS. 2A-2E, during a first driving step, according to an embodiment of the present disclosure.
Figure 5B:
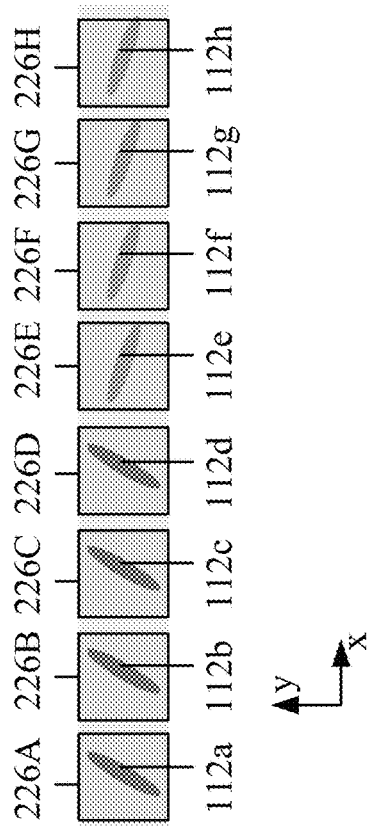
Figure 5C:
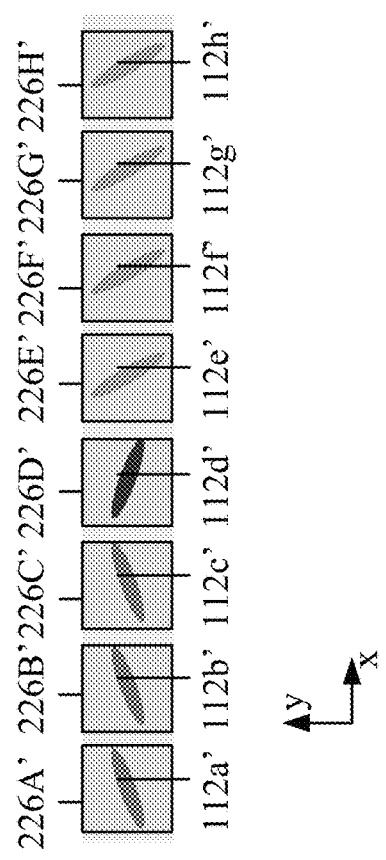
FIGS. 5C and 5D schematically illustrate diagrams of orientations of LC molecules included in a segment of the lens shown in FIGS. 2A-2E, during a second driving step, according to an embodiment of the present disclosure.
Figure 5D:
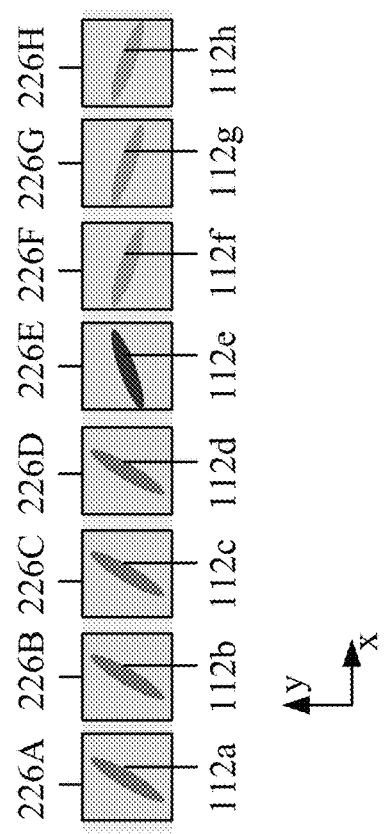

FIGS. 5A-5D illustrate x-z sectional views of the orientations of the LC molecules included in a segment corresponding to one in-plane pitch Λ of the lens pattern of the lens 200 shown in FIGS. 2A-2E. FIGS. 5A-5D also illustrate the patterned electrodes 226A-226H and 226A'-226H' that may be included in the segment corresponding to the one in-plane pitch Λ of the lens pattern of the lens 200 shown in FIGS. 2A-2E. FIGS. 5A and 5C illustrate the patterned electrodes 226A-226H included in the first FFS substate 250a, and the orientations of the LC molecules 112a-112h located in close proximity to or at the first surface 115-1 of the birefringent medium layer 115. FIGS. 5B and 5D illustrate the patterned electrodes 226A'-226H' included in the second FFS substate 250b, and the orientations of the LC molecules 112a'-112h' located in close proximity to or at the second surface 115-2 of the birefringent medium layer 115.

FIGS. 5A and 5B illustrate the orientations of the LC molecules 112a-112h located in close proximity to or at the first surface 115-1, and the orientations of the LC molecules 112a'-112h' located in close proximity to or at the second surface 115-2, respectively, during the first driving step of the lens 200. In the embodiment shown in FIGS. 5A and 5B, an elastic torque along the horizontal direction experienced by the LC molecules 112a-112h and 112a'-112h' may be substantially small, and may not affect the orientations of the LC molecules 112a-112h and 112a'-112h'.

Referring to FIG. 5A, the patterned electrodes 226A-226D corresponding to the LC molecules 112a-112d may be applied with the same predetermined driving voltage (e.g., +10V), and the patterned electrodes 226E-226H corresponding to the LC molecules 112e-112h may be grounded. The magnitude of the predetermined driving voltage (e.g., +10V) may be configured, such that the generated electric field may reorient the corresponding LC molecules 112a'-112d' located in close proximity to or at the second surface 115-2 of the birefringent medium layer 115 to have positive intermediate azimuthal angles, as shown in FIG. 5B. The positive intermediate azimuthal angles of the LC molecules 112a'-112d' located in close proximity to or at the second surface 115-2 of the birefringent medium layer 115 may be substantially the same.

Referring to FIG. 5B, the patterned electrodes 226E'-226H' corresponding to the LC molecules 112e'-112h' may be applied with the same predetermined driving voltage (e.g., +10V), and the patterned electrodes 226A'-226D' corresponding to the LC molecules 112a'-112d' may be grounded. The magnitude of the predetermined driving voltage (e.g., +10V) may be configured, such that the generated electric field may reorient the corresponding LC molecules 112e-112h located in close proximity to or at the first surface 115-1 of the birefringent medium layer 115 to have negative intermediate azimuthal angles, as shown in FIG. 5B. The negative intermediate azimuthal angles of the LC molecules 112e-112h located in close proximity to or at the first surface 115-1 of the birefringent medium layer 115 may be substantially the same.

FIGS. 5C and 5D illustrate the orientations of the LC molecules 112a-112h located in close proximity to or at the first surface 115-1, and the orientations of the LC molecules 112a'-112h' located in close proximity to or at the second surface 115-2, respectively, during the first driving step of the lens 200. In the embodiment shown in FIGS. 5C and 5D, an elastic torque along the horizontal direction experienced by the LC molecules 112a-112h and 112a'-112h' may be substantially large, and may affect the orientations of the LC molecules 112a-112h and 112a'-112h'.

Referring to FIG. 5C, the patterned electrodes 226A-226D corresponding to the LC molecules 112a-112d may be applied with the same predetermined driving voltage (e.g., +10V), and the patterned electrodes 226E-226H corresponding to the LC molecules 112e-112h may be grounded. The magnitude of the predetermined driving voltage (e.g., +10V) may be configured, such that the generated electric field may trend to reorient the corresponding LC molecules 112a'-112d' located in close proximity to or at the second surface 115-2 of the birefringent medium layer 115 to have positive intermediate azimuthal angles. However, due to elastic torque the horizontal direction, the LC molecule 112d', which is located with the left region of the segment and adjacent to the right region of the segment, may not be reoriented to have a positive intermediate azimuthal angle. For example, as shown in FIG. 5D, the LC molecules 112a'-112c' may have positive intermediate azimuthal angles, and the LC molecule 112d' may have a negative intermediate azimuthal angle.

Referring to FIG. 5D, the patterned electrodes 226E'-226H' corresponding to the LC molecules 112e'-112h' may be applied with the same predetermined driving voltage (e.g., +10V), and the patterned electrodes 226A'-226D' corresponding to the LC molecules 112a'-112d' may be grounded. The magnitude of the predetermined driving voltage (e.g., +10V) may be configured, such that the generated electric field may trend to reorient the corresponding LC molecules 112e-112h located in close proximity to or at the first surface 115-1 of the birefringent medium layer 115 to have negative intermediate azimuthal angles. However, due to an elastic torque in the horizontal direction, the LC molecule 112e, which is located with the right region of the segment and adjacent to the left region of the segment, may not be reoriented to have a negative intermediate azimuthal angle. For example, as shown in FIG. 5C, the LC molecules 112f-112h may have negative intermediate azimuthal angles, and the LC molecule 112e may have a positive intermediate azimuthal angle.

Referring to FIGS. 5C and 5D, as the LC molecules 112a-112e and 112a'-112c' have positive intermediate azimuthal angles, and the LC molecule 112f-112h and 112d'-112h' have a negative intermediate azimuthal angle, a "trapped wall" may be formed over the patterned electrodes 226E and 226D'. In some embodiments, the "trapped wall" may decrease the efficiency of the lens 200. In some embodiments, the efficiency of the lens 200 may decease as the region of the "trapped wall" increases.

Figure 5E:
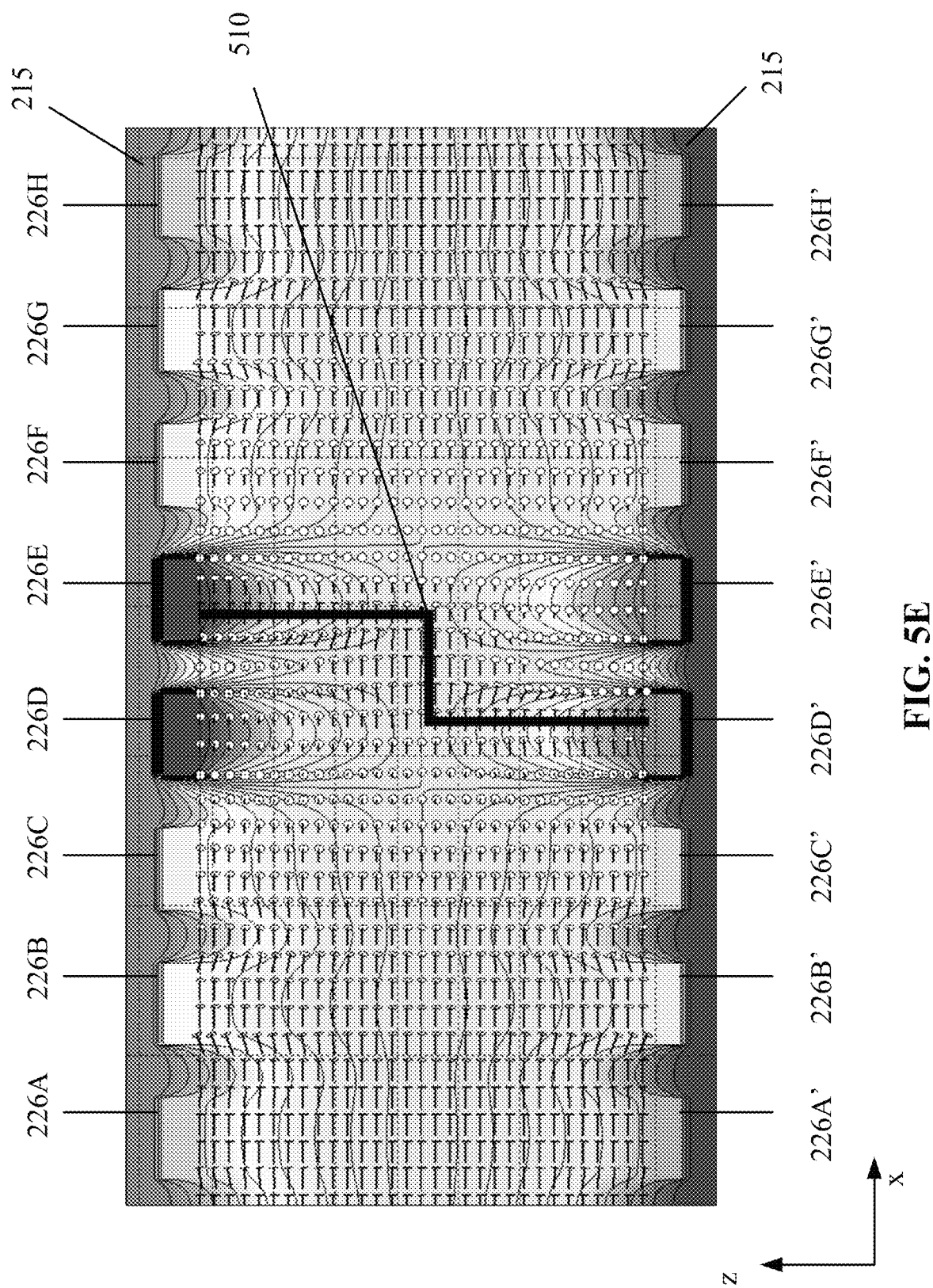
FIG. 5E illustrates simulation results showing orientations of LC molecules included in the segment shown in FIGS. 5C and 5D, during a second driving step, according to an embodiment of the present disclosure.

FIG. 5E illustrates simulation results showing orientations of LC molecules included in the segment shown in FIGS. 5C and 5D, during the second driving step. As shown in FIG. 5E, in the simulation, the first electrode layer 215 disposed at the first FFS substrate 250b is applied with a voltage of +10V, and the first electrode layer 215 disposed at the second FFS substrate 250b is grounded. The voltages applied to the patterned electrodes 226A-226H disposed at the first FFS substrate 250a is increased from the patterned electrode 226D to 226A (e.g., 0V, 7V, 8V, 9V), and from the patterned electrode 226E to 226H (e.g., 0V, 7V, 8V, 9V). The voltages applied to the patterned electrodes 226A'-226H' disposed at the second FFS substrate 250b is deceased from the patterned electrode 226D' to 226A' (e.g., 10V, 5V, 3V, 0V), and from the patterned electrode 226E' to 226H' (e.g., 10V, 5V, 3V, 0V). FIG. 5E shows that a "trapped wall" 510 is formed over portions of the patterned electrodes 226E and 226D' and a portion between the patterned electrodes 226E and 226D' as a zig-zag line, which decreases the efficiency of the lens 200. The efficiency of the lens 200 having the "trapped wall" 510 shown in FIG. 5E is calculated to be about 80%.

When the elastic torque along the horizontal direction experienced by the LC molecules 112a-112h and 112a'-112h' is substantially large, and affects the orientations of the LC molecules 112a-112h and 112a'-112h', to reduce the region of the "trapped wall", the magnitude, distribution, and duration of the voltages applied to the patterned electrodes 226A-226H and 226A'-226H' during the driving steps may be configured, such that the "trapped wall" is located between the electrodes 226D' and 226E' (and also between 226D and 226E) as a straight line. For example, in some embodiments, the patterned electrodes 226D and 226E' may be grounded during the first driving step. In some embodiments, through configuring the magnitudes of the voltages and/or the durations of the voltages applied to the patterned electrodes 226A-226H' and 226A'-226H' during the first driving step, the orientations of the LC molecules 112a-112h located in close proximity to or at the first surface 115-1, and the orientations of the LC molecules 112a'-112h' located in close proximity to or at the second surface 115-2 may be similar to that shown in FIGS. 5A and 5B, respectively.

Figure 5F:
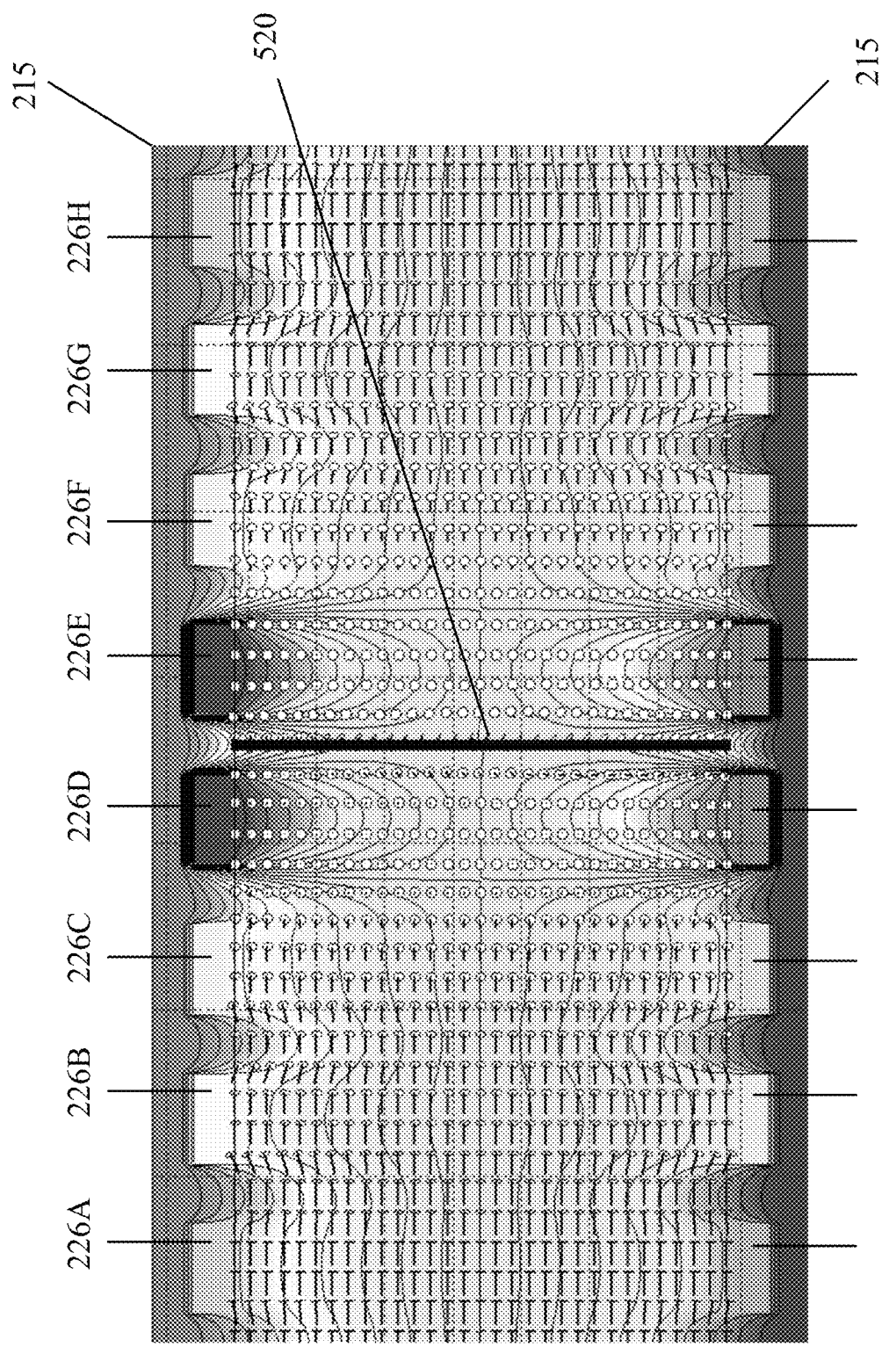
FIG. 5F illustrates simulation results showing orientations of LC molecules included in the segment shown in FIGS. 5A and 5B, during a second driving step, according to an embodiment of the present disclosure.

FIG. 5F illustrates simulation results showing orientations of LC molecules included in the segment shown in FIGS. 5A and 5B, during the second driving step. As shown in FIG. 5F, in the simulation, the first electrode layer 215 disposed at the first FFS substrate 250b is applied with a voltage of +10V, and the first electrode layer 215 disposed at the second FFS substrate 250b is grounded. The voltages applied to the patterned electrodes 226A-226H disposed at the first FFS substrate 250a is increased from the patterned electrode 226D to 226A, and from the patterned electrode 226E to 226H. The voltages applied to the patterned electrodes 226A'-226H' disposed at the second FFS substrate 250b is deceased from the patterned electrode 226D' to 226A', and from the patterned electrode 226E' to 226H'. FIG. 5F shows that a "trapped wall" 520 is formed between the patterned electrodes 226D and 226E (or 226D' and 226E') as a straight line. The efficiency of the lens 200 having the "trapped wall" 520 shown in FIG. 5F is calculated to be about 90%, higher than the efficiency when the trapped wall is in the form shown in FIG. 5E.

Referring to FIG. 5E and FIG. 5F, through configuring the magnitude, distribution, and duration of the voltages applied to the patterned electrodes 226A-226H and 226A'-226H' during the first driving step, the "trapped wall" 520 may be moved to a region between the patterned electrodes 226D and 226E (or 226D' ad 226E') as a straight line, thereby reducing the region or area of the trapped wall. The "trapped wall" 520 shown in FIG. 5F may occupy a smaller region than the "trapped wall" 510 shown in FIG. 5E. The efficiency of the lens 200 having the "trapped wall" 520 shown in FIG. 5F may be greater than the efficiency of the lens 200 having the "trapped wall" 510 shown in FIG. 5E.

Figure 6A:
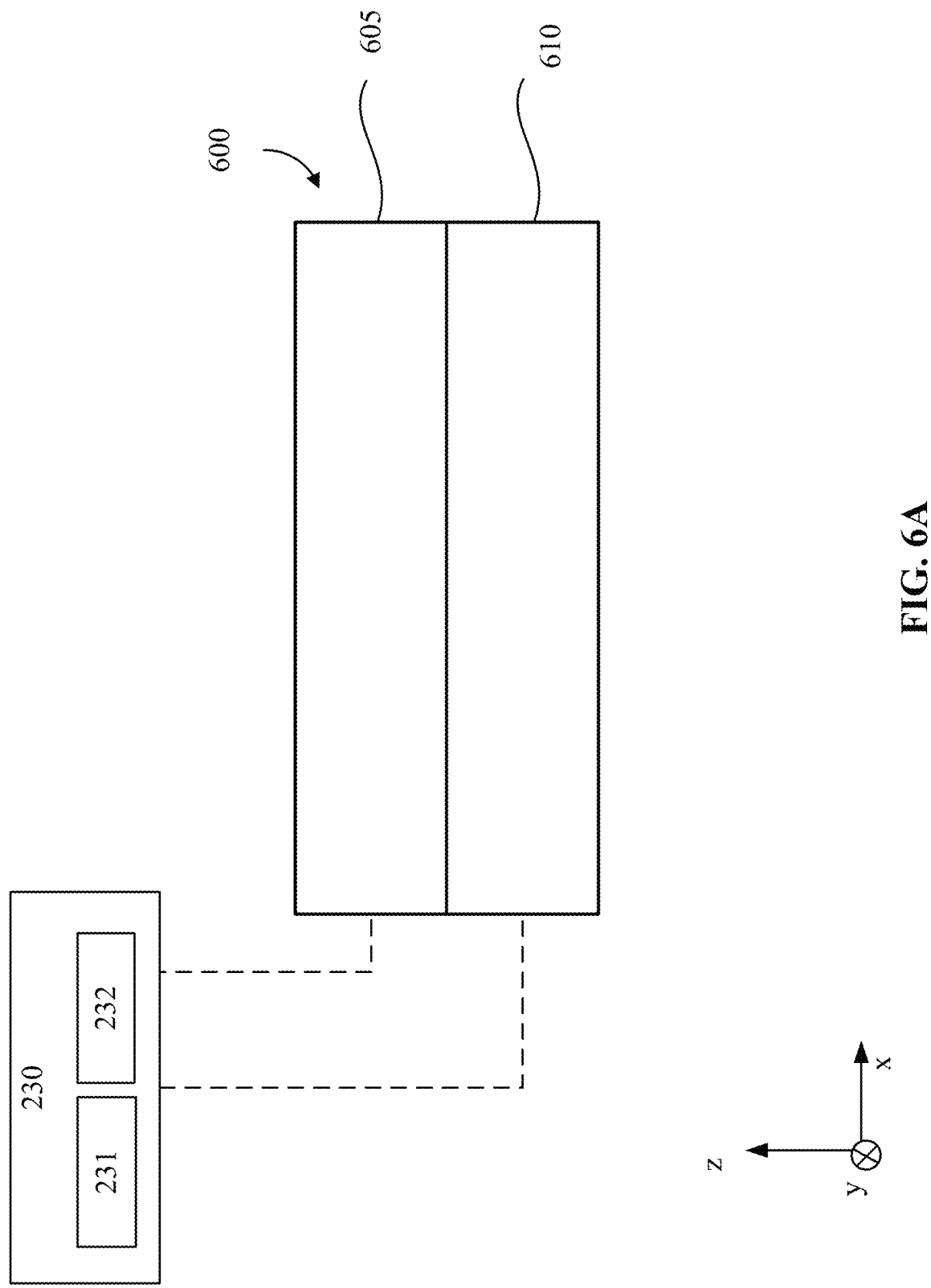
FIG. 6A schematically illustrates a diagram of a lens assembly, according to an embodiment of the present disclosure.

FIG. 6A illustrates an x-z sectional view of a lens assembly 600, according to an embodiment of the present disclosure. The lens assembly 600 may include elements that are the same as or similar to those included in the PBP lens 100 shown in FIGS. 1A-1H, or the lens 200 shown in FIGS. 2A-5F. Descriptions of the same or similar elements may refer to the above descriptions rendered in connection with FIGS. 1A-1H or FIGS. 2A-5F. The lens assembly 600 may be a tunable PBP lens assembly that is tunable or adjustable between a plurality of optical powers, which may include a zero optical power, one or more positive powers, and/or one or more negative optical powers. For example, the lens assembly 600 may be dynamically switched between providing a positive power, providing a zero optical power, or providing a negative power to a circularly polarized light with a predetermined handedness. For example, the lens assembly 600 may be dynamically switched between providing a plurality of positive powers, providing a plurality of negative powers, providing a positive optical power and providing a negative optical power, providing a positive optical power and providing a zero optical power, or providing a negative optical power and providing a zero optical power, to the circularly polarized light with a predetermined handedness. In some embodiments, an optical center of the lens assembly 600 may be tunable. In some embodiments, the lens assembly 600 may be a reflective lens assembly or a transmissive lens assembly.

As shown in FIG. 6A, the lens assembly 600 may include a plurality of lenses arranged in an optical series. For illustrative purposes, FIG. 6A shows that the lens assembly 600 includes a first lens 605 and a second lens 610 stacked together. In some embodiments, the lens assembly 600 may include any suitable number of lenses, such as three, four, five, or six, etc. For illustrative purposes, the lenses 605 and 610 are shown as having flat surfaces. In some embodiments, at least one of the lenses 605 and 610 may have curved surfaces. At least one of the lenses 605 and 610 may be an embodiment of the lens 200 shown in FIGS. 2A-2E. In some embodiments, each of the lenses 605 and 610 may be an embodiment of the lens 200 shown in FIGS. 2A-2E. For example, each of the lenses 605 and 610 may function as a tunable PBP spherical lens, a tunable PBP aspherical lens, a tunable PBP cylindrical lens, or a tunable PBP freeform lens, etc. In some embodiments, an optical center of each of the lenses 605 and 610 may be tunable. In some embodiments, the lens assembly 600 may be communicatively coupled with the controller 230. In some embodiments, the controller 230 may individually or independently control the operations of the respective lenses 605 and 610.

Figure 6B:
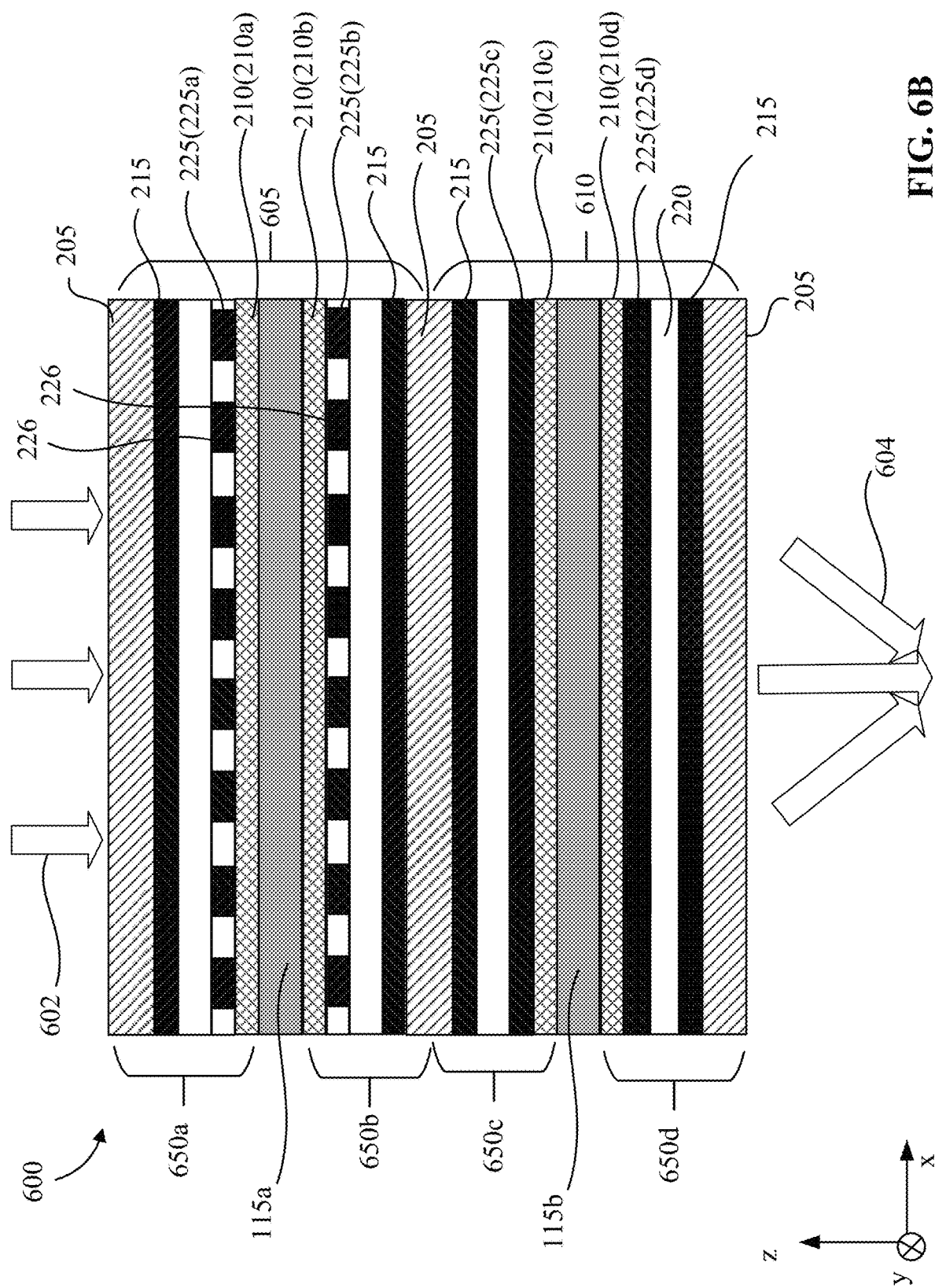
FIG. 6B schematically illustrates a diagram of the lens assembly shown in FIG. 6A operating in a first operation state, according to an embodiment of the present disclosure.

FIG. 6B illustrates an x-z sectional view of the lens assembly 600, according to an embodiment of the present disclosure. As shown in FIG. 6B, each of the lenses 605 and 610 may include two FFS substrates arranged opposite to each other, and a birefringent medium layer disposed between the two FFS substrates. For discussion purposes, FIG. 6B shows that the lens 605 includes two FFS substrates 650*a* and 650*b*, and a birefringent medium layer 115*a* disposed between the two FFS substrates 650*a* and 650*b*. The lens 610 includes two FFS substrates 650*c* and 650*d*, and a birefringent medium layer 115*b* disposed between the two FFS substrates 650*c* and 650*d*. The FFS substrate 650*a*, 650*b*, 650*c*, or 650*d* may be similar to the FFS substrate 250*a* or 250*b* shown in FIGS. 2A-2E. For example, each of the FFS substrates 650*a*, 650*b*, 650*c*, and 650*d* may include the substate 205, the first electrode layer 215, the electrically insulating layer 220, the second electrode layer 225 (e.g., 225*a*, 225*b*, 225*c*, or 225*d*), and the alignment structure 210 (e.g., 210*a*, 210*b*, 210*c*, or 210*d*). In the embodiment shown in FIG. 6B, the FFS substrates 650*b* and 650*c* may share a same substrate 205. Each of the birefringent medium layer 115*a* and the birefringent medium layer 115*b* may be similar to the birefringent medium layer 115 shown in FIGS. 1A-2A.

In some embodiments, the lenses 605 and 610 may be configured to be tunable PBP cylindrical lenses. For example, in some embodiments, the alignment structures 210*a*, 210*b*, 210*c*, and 210*d* may be configured to provide homogeneous alignments. For example, in the first lens 605, the alignment directions provided by the alignment structures 210*a* and 210*b* may be configured to be symmetric with respect to a first predetermined in-plane direction, e.g., the x-axis direction shown in FIG. 6B. The angles formed between the respective alignment directions and the first predetermined in-plane direction (e.g., x-axis direction) may be configured to have substantially the same first absolute value and opposite signs. In the second lens 610, the alignment directions provided by the alignment structures 210*c* and 210*d* may be configured to be symmetric with respect to a second predetermined in-plane direction, e.g., the y-axis direction shown in FIG. 6B. The angles formed between the respective alignment directions and the second predetermined in-plane direction (e.g., y-axis direction) may be configured to have substantially the same second absolute value and opposite signs. The first absolute value may be substantially the same as or different from the second absolute value.

In some embodiments, the second electrode layers 225*a*, 225*b*, 225*c*, and 225*d* may be configured to include a plurality of stripe-shaped electrodes (or patterned electrodes), e.g., similar to that shown in FIG. 2D. For example, in the first lens 605, the stripe-shaped electrodes in the second electrode layers 225*a* and 225*b* may be distributed along the first predetermined in-plane direction (e.g., x-axis direction). Each of the stripe-shaped electrodes in the second electrode layers 225*a* and 225*b* may extend along the second predetermined in-plane direction (e.g., y-axis direction). The stripe-shaped electrodes in the second electrode layer 225*a* may be substantially aligned and parallel with the stripe-shaped electrodes in the second electrode layer 225*b* in the thickness direction. In the second lens 610, the stripe-shaped electrodes in the second electrode layers 225*c* and 225*d* may be distributed along the second predetermined in-plane direction (e.g., y-axis direction). Each of the stripe-shaped electrodes in the second electrode layers 225*c* and 225*d* may extend along the first predetermined in-plane direction (e.g., x-axis direction). The stripe-shaped electrodes in the second electrode layer 225*c* may be substantially aligned and parallel with the stripe-shaped electrodes in the second electrode layer 225*d* in the thickness direction. As shown in FIG. 6B, the stripe-shaped electrodes in the first lens 605 and the stripe-shaped electrodes in the second lens 610 are perpendicular, forming a matrix configuration. It is noted that because the stripe-shaped electrodes included in the second electrode layers 225*c* and 225*d* of the second lens 610 are perpendicular to the stripe-shaped electrodes 226 included in second electrode layers 225*a* and 225*b* of the first lens 605, in this x-z cross sectional view, the stripe-shaped electrodes in the second electrode layers 225*c* and 225*d* are shown as black, continuous strips. An illustration of the arrangement between the stripe-shaped electrodes 226 in the second electrode layers 225a and 225b, and the stripe-shaped electrodes 226 in the second electrode layers 225c and 225d are shown in FIG. 6K and FIG. 6L.

Figure 6C:
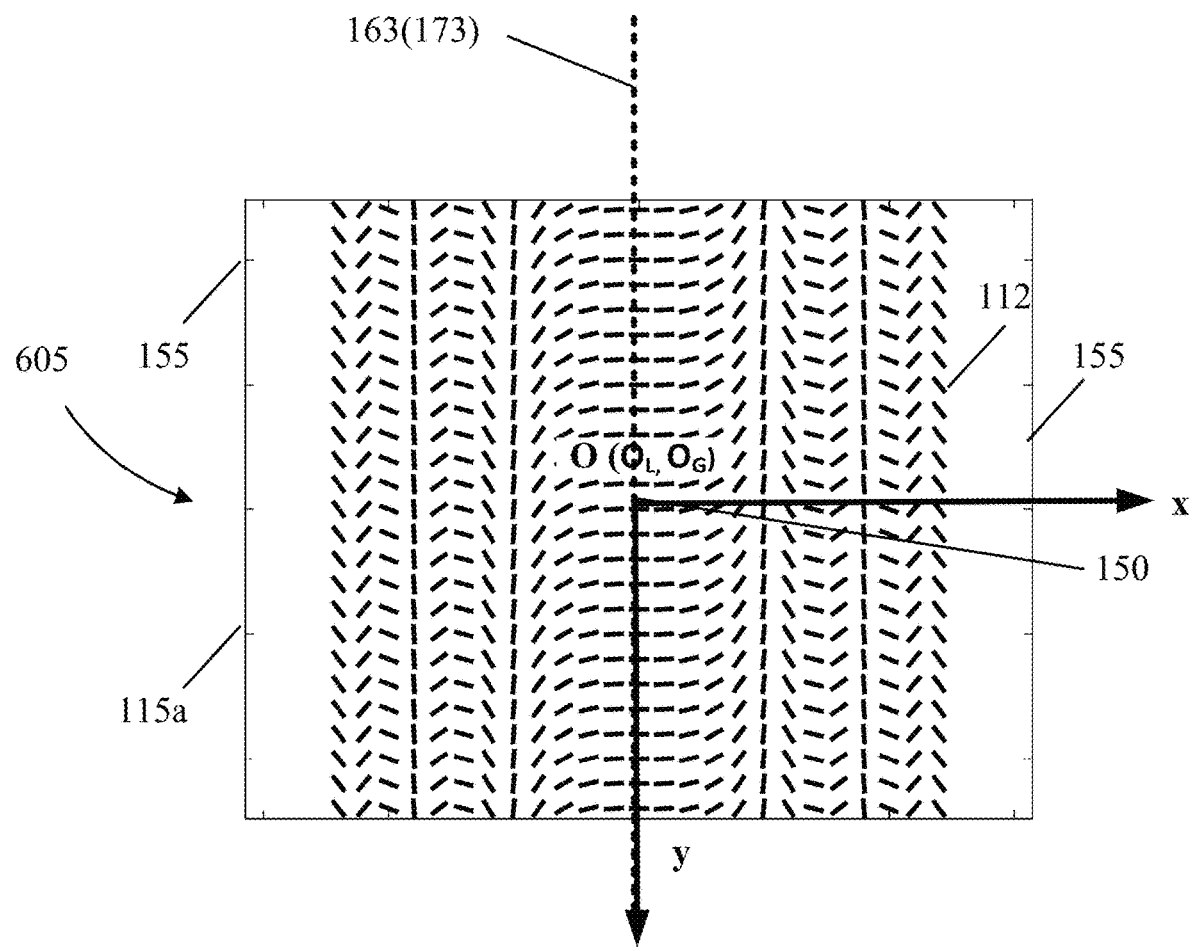
FIGS. 6C and 6D schematically illustrate diagrams of cylindrical lens patterns that may be formed in respective lenses included in the lens assembly shown in FIG. 6B, according to an embodiment of the present disclosure.
Figure 6D:
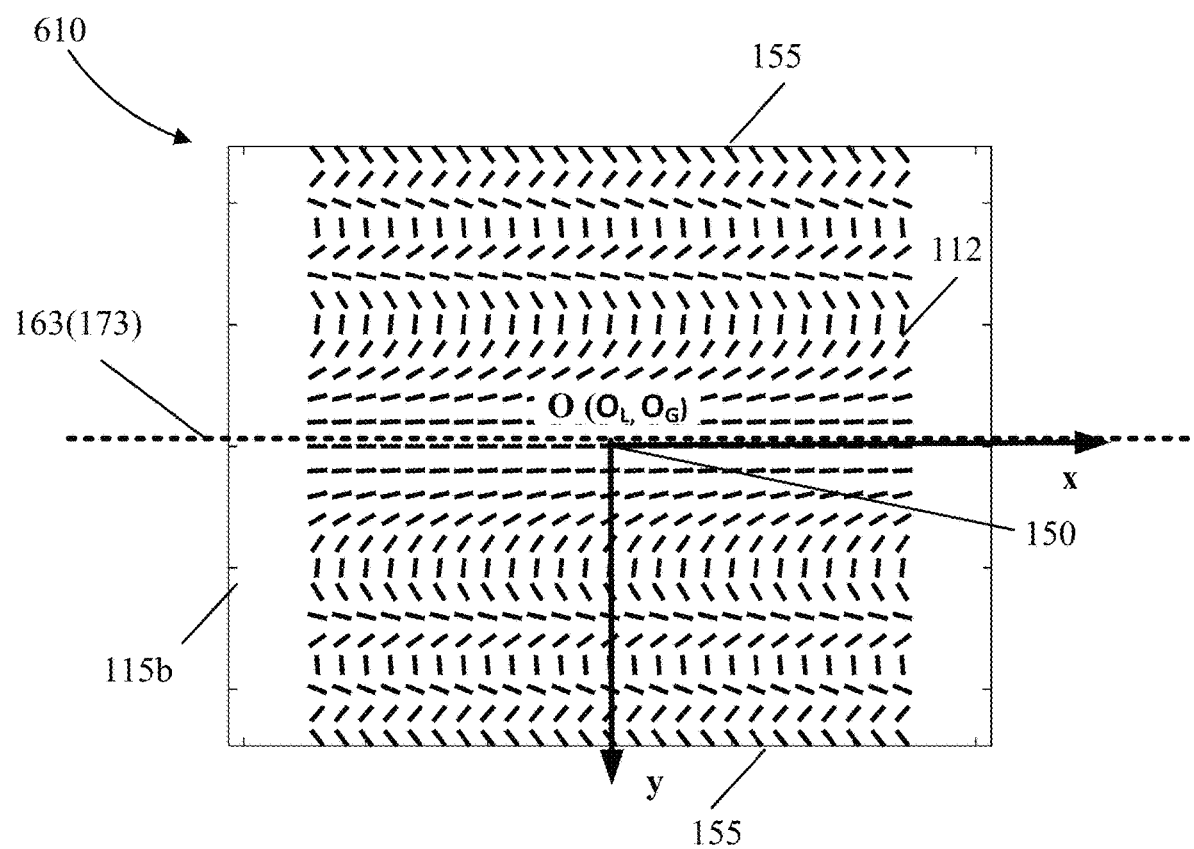
Figure 6E:
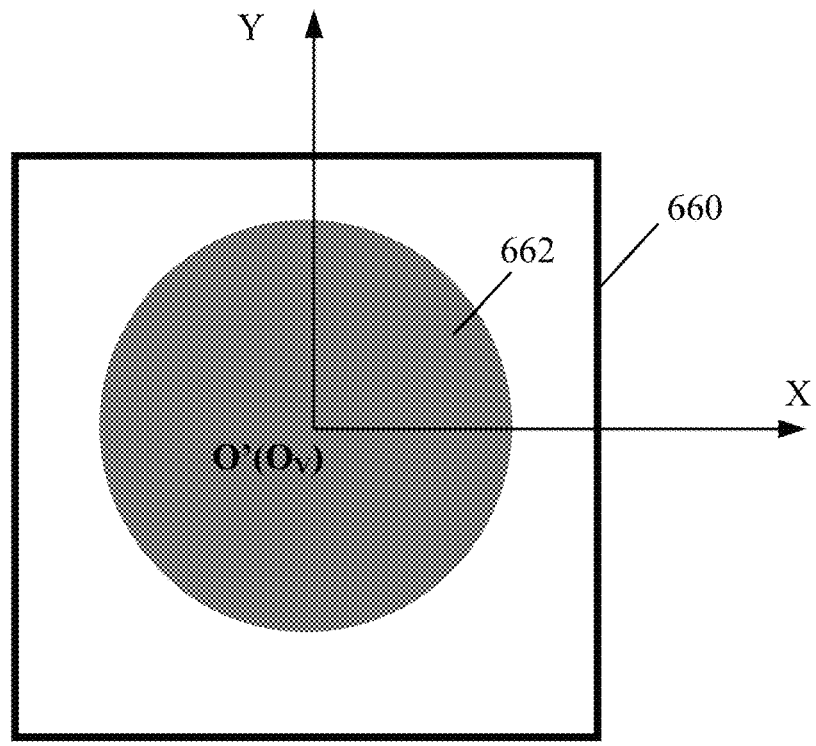
FIG. 6E schematically illustrates a diagram of a beam spot of an input light of the lens assembly shown in FIG. 6B, according to an embodiment of the present disclosure.
Figure 6F:
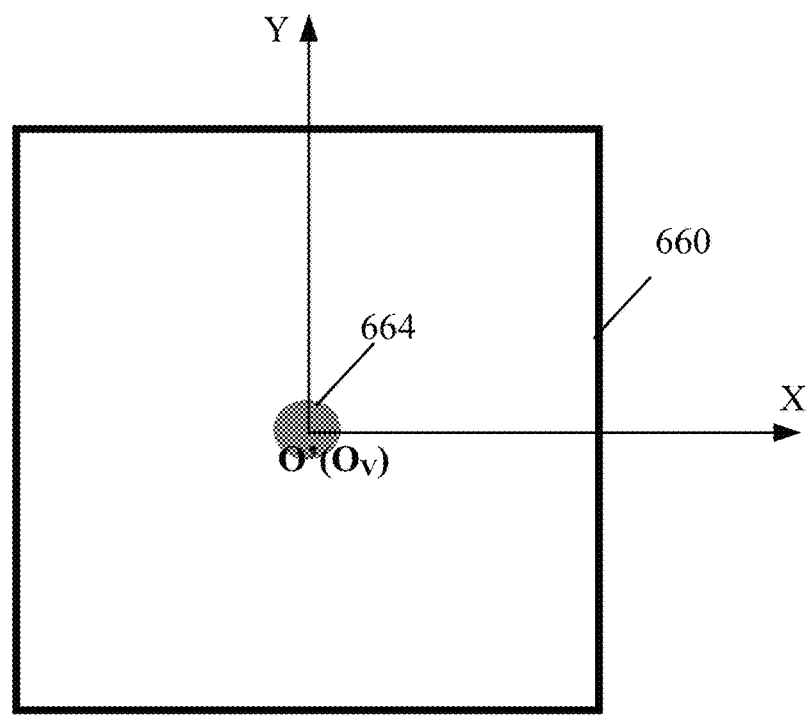
FIG. 6F schematically illustrates a diagram of a beam spot, at an image plane, of an output light of the lens assembly shown in FIG. 6B, according to an embodiment of the present disclosure.
Figure 6G:
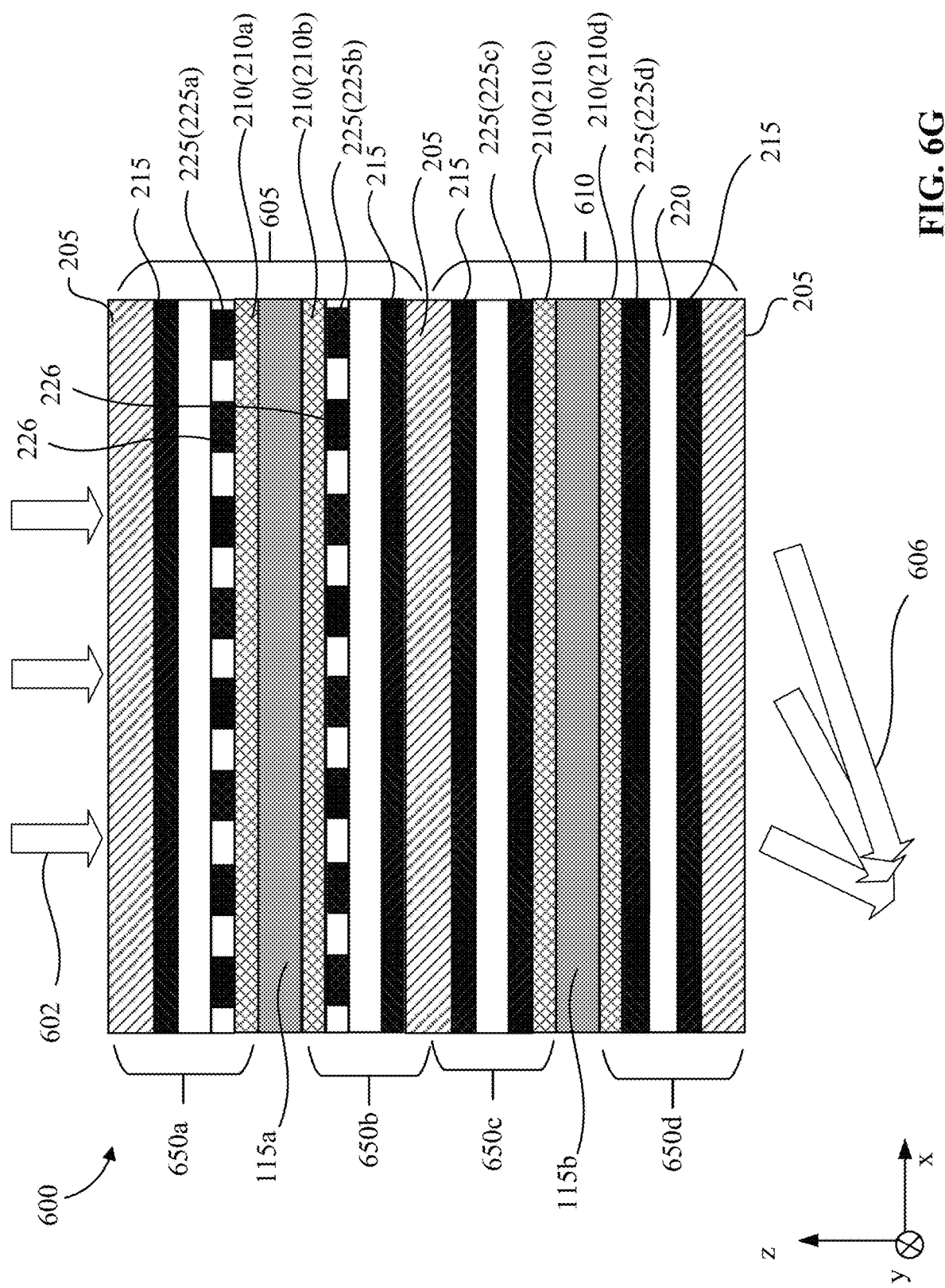
FIG. 6G schematically illustrates a diagram of the lens assembly shown in FIG. 6A operating in a second operation state, according to an embodiment of the present disclosure.
Figure 6H:
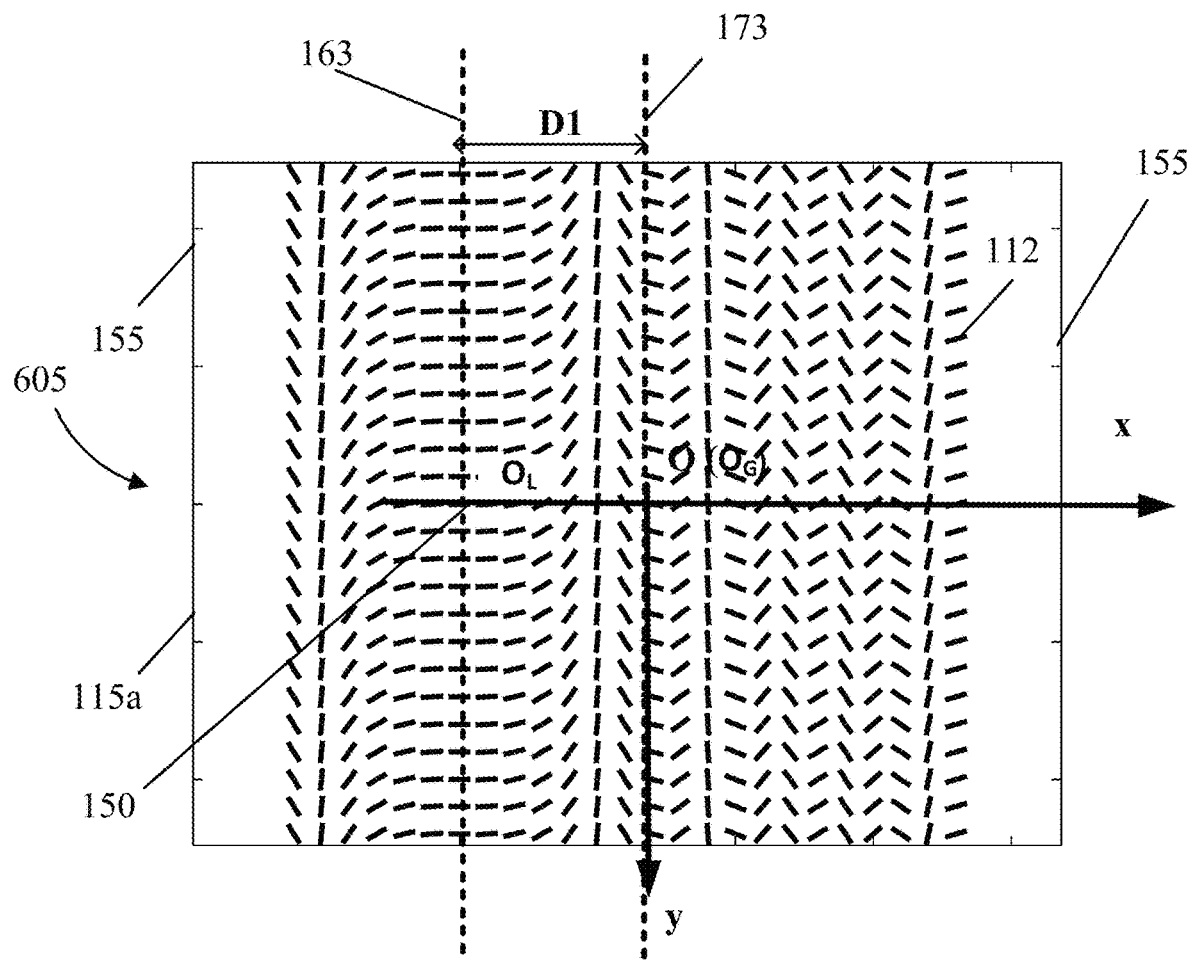
FIGS. 6H and 6I schematically illustrate diagrams of cylindrical lens patterns that may be formed in respective lenses included in the lens assembly shown in FIG. 6G, according to an embodiment of the present disclosure.
Figure 6I:
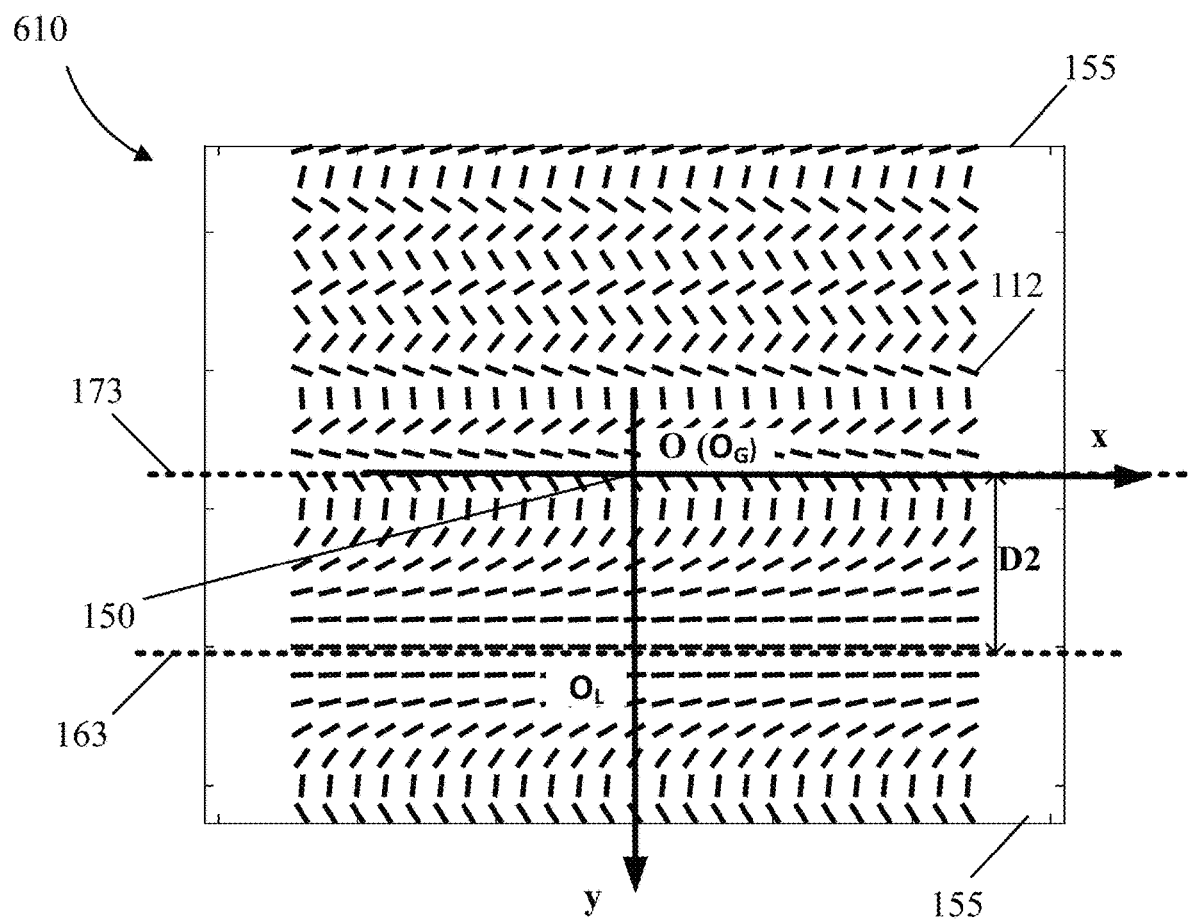
Figure 6J:
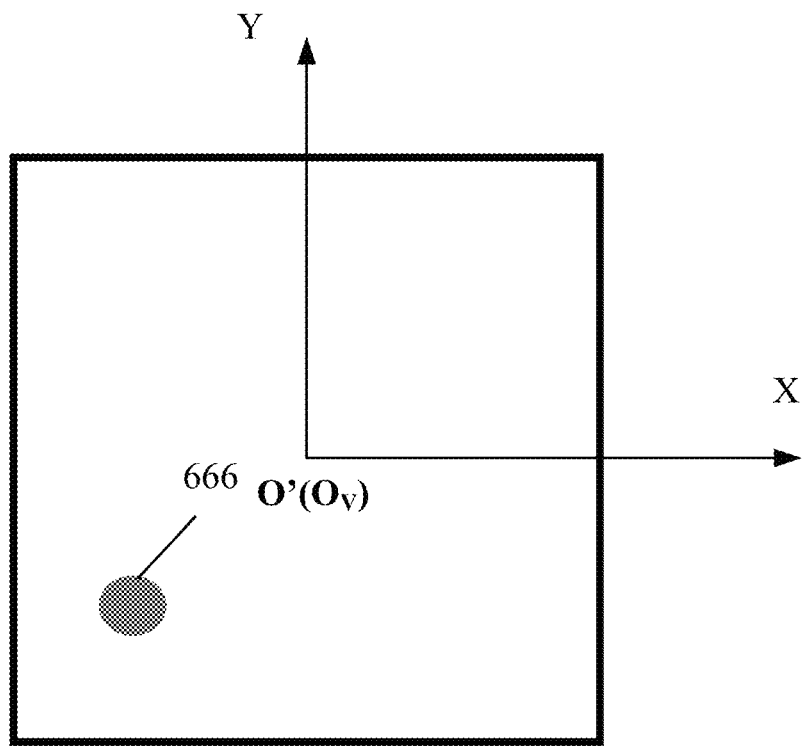
FIG. 6J schematically illustrates a diagram of a beam spot, at an image plane, of an output light of the lens assembly shown in FIG. 6G, according to an embodiment of the present disclosure.
Figure 6K:
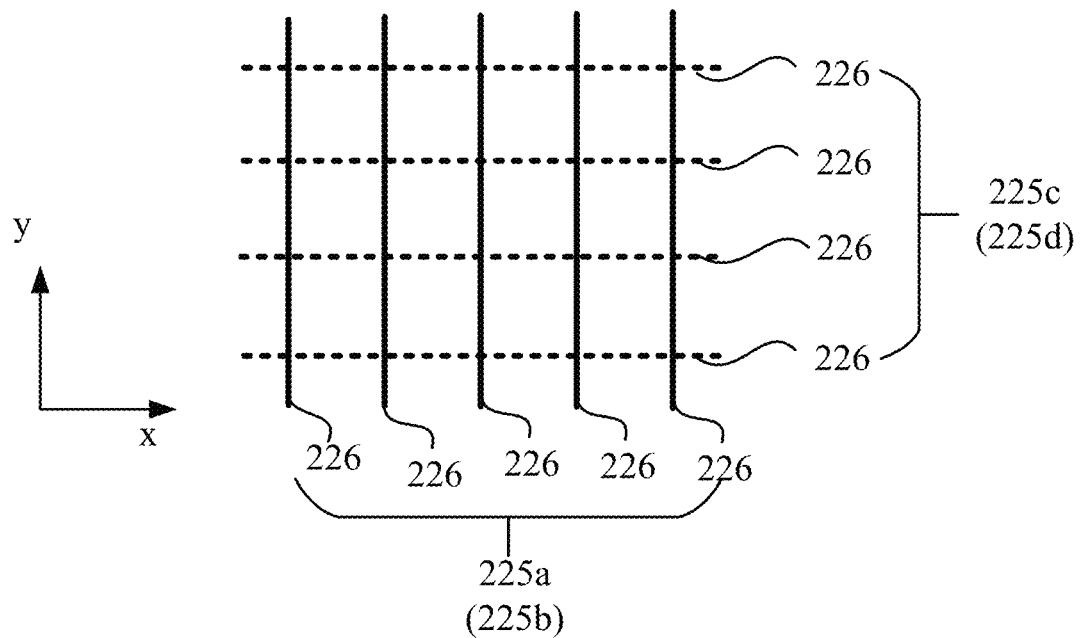
FIG. 6K schematically illustrates a top view of an arrangement of patterned electrodes included in a first lens and a second lens included in the lens assembly shown in FIG. 6A, where only the patterned electrodes in the first lens (shown as solid lines) and in the second lens (shown as dotted lines) are shown, and other elements of the first lens and the second lens are omitted for the simplicity of illustration, according to an embodiment of the present disclosure.

FIG. 6K illustrates an x-y sectional view (or a top view) showing the arrangement of the stripe-shaped electrodes 226 included in the second electrode layers 225a and 225b of the first lens 605 and the stripe-shaped electrodes 226 included in the second electrode layers 225c and 225d of the second lens 610. The solid lines represent the stripe-shaped electrodes 226 included in the second electrode layers 225a and 225b of the first lens 605, and the dotted lines represent the stripe-shaped electrodes 226 included in the second electrode layers 225c and 225d of the second lens 610. It is noted that other elements of the lenses 605 and 610 are not shown for the simplicity of illustration. As shown in FIG. 6K, the stripe-shaped electrodes 226 (solid lines 226) included in the second electrode layers 225a and 225b of the first lens 605 may be arranged in parallel with one another, and the stripe-shaped electrodes 226 (dotted lines 226) included in the second electrode layers 225c and 225d of the second lens 610 may be arranged in parallel with one another. The stripe-shaped electrodes 226 (solid lines 226) included in the first lens 605 may be non-parallel to the stripe-shaped electrodes 226 (dotted lines) included in the second lens 610. In the embodiment shown in FIG. 6K, the stripe-shaped electrodes 226 (solid lines 226) included in the first lens 605 may be arranged to be perpendicular to the stripe-shaped electrodes 226 (dotted lines) included in the second lens 610. As shown in FIG. 6K, the stripe-shaped electrodes 226 (solid lines 226) included in the first lens 605 may extend in the y-axis direction, and may be arranged in parallel with one another in the x-axis direction. The stripe-shaped electrodes 226 (dotted lines 226) included in the second lens 610 may extend in the x-axis direction, and may be arranged in parallel with one another in the y-axis direction.

Figure 6L:
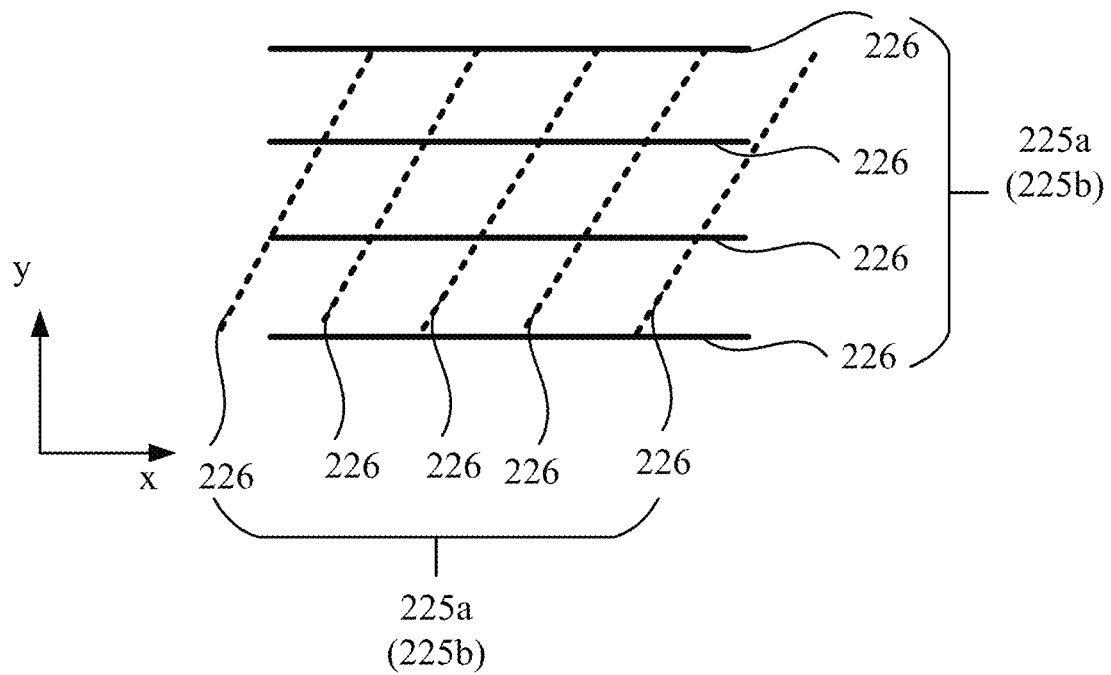
FIG. 6L schematically illustrates a top view of an arrangement of the patterned electrodes included in the first lens and the second lens included in the lens assembly shown in FIG. 6A, where only the patterned electrodes in the first lens (shown as solid lines) and in the second lens (shown as dotted lines) are shown, and other elements of the first lens and the second lens are omitted for the simplicity of illustration, according to another embodiment of the present disclosure.

FIG. 6L illustrates an x-y sectional view (or a top view) showing another non-parallel arrangement of the stripe-shaped electrodes 226 (solid lines 226) included in the second electrode layers 225a and 225b of the first lens 605 and the stripe-shaped electrodes 226 (dotted lines 226) included in the second electrode layers 225c and 225d of the second lens 610. The stripe-shaped electrodes 226 (dotted lines 226) included in the second lens 610 may be arranged in parallel with one another. The stripe-shaped electrodes 226 (solid lines 226) included in the first lens 605 may be arranged in parallel with one another. The stripe-shaped electrodes 226 (dotted lines 226) included in the second lens 610 may be arranged to form an acute angle with the stripe-shaped electrodes 226 (solid lines 226) included in the first lens 605. The acute angle may be 30°, 45°, 60°, or any other suitable angle. As shown in FIG. 6L, the stripe-shaped electrodes 226 (solid lines 226) included in the second electrode layers 225a and 225b of the first lens 605 may extend in the x-axis direction, and may be arranged in parallel with one another in the y-axis direction. The stripe-shaped electrodes 226 (dotted lines 226) included in the second electrode layers 225c and 225d of the second lens 610 may be arranged in parallel with one another in the x-axis direction, and each of the stripe-shaped electrodes 226 (dotted lines 226) included in the second lens 610 may form an acute angle with respect to the stripe-shaped electrodes 226 (solid lines 226) included in the first lens 605.

In some embodiments, the first lens 605 and the second lens 610 may be configured to have substantially the same structure. The relative orientations of the first lens 605 and the second lens 610 may be configured, such that the extending direction of the stripe-shaped electrodes in the first lens 605 may be substantially perpendicular to the extending direction of the stripe-shaped electrodes in the second lens 610. In some embodiments, each of the first lens 605 and the second lens 610 may be configured to function as a tunable PBP cylindrical lens with a tunable optical power (e.g., between one or more negative optical powers, a zero optical power, and one or more positive optical powers) and/or an adjustable optical center. In some embodiments, the first lens 605 and the second lens 610 may be configured to focus a light to line focuses with substantially perpendicular extending directions. For example, the first lens 605 may be configured to focus a light to a first line focus extending in the second predetermined in-plane direction (e.g., y-axis direction). The second lens 610 may be configured to focus a light to a second line focus extending in the first predetermined in-plane direction (e.g., x-axis direction). That is, the first lens 605 may be configured to focus a light in the first predetermined in-plane direction, and the second lens 610 may be configured to focus a light in the second predetermined in-plane direction. The absolute values of the optical powers of the first lens 605 and the second lens 610 may be configured to be substantially the same. In some embodiments, the first line focus of the first lens 605 may be shiftable in the second predetermined in-plane direction by the in-plane electric field generated in the LC layer of the first lens 605. In some embodiments, the second line focus of the second lens 610 may be shiftable in the first predetermined in-plane direction by the in-plane electric field generated in the LC layer of the second lens 610.

As a PBP cylindrical lens may be considered as a 1D case of a PBP spherical lens, in some embodiments, the lens 600 that includes a stack of the lenses 605 and 610 functioning as tunable PBP cylindrical lenses may be configured to function as a tunable PBP spherical lens 600. The tunable PBP spherical lens 600 may have a tunable optical power (e.g., between one or more negative optical powers, a zero optical power, and one or more positive optical powers) and/or an adjustable optical center.

For discussion purposes, FIG. 6B shows that the lens assembly 600 operates in a first operation state, transforming an input light 602 to an output light 604. FIG. 6C illustrates an x-y section view of a cylindrical lens pattern that may be formed in the birefringent medium layer 115a included in the lens assembly 600 that operates in the first operation state, according to an embodiment of the present disclosure. For example, the controller 230 may individually or independently control the voltages applied to the respective stripe-shaped electrodes 226 included in the second electrode layers 225a and 225b of the first lens 605 shown in FIG. 6B, thereby reorientating the LC molecules 112 to form the cylindrical lens pattern shown in FIG. 6C in the birefringent medium layer 115a of the first lens 605.

As shown in FIG. 6C, the orientations of the LC molecules 112 in the birefringent medium layer 115a may be configured with an in-plane orientation pattern having a varying pitch in at least two opposite in-plane directions from the lens pattern center ("$O_L$") 150 to opposite lens peripheries 155. In some embodiments, the at least two opposite in-plane directions may be in the first predetermined in-plane direction (e.g., x-axis direction). The rotations of the orientations of the LC directors from the lens pattern center ("$O_L$") 150 to the opposite lens peripheries 155 in the at least two opposite in-plane directions may exhibit a same first handedness (e.g., a right handedness).

The lens pattern center ($O_L$) 150 and the geometry center ($O_G$) of the first lens 605 may substantially coincide with one another, at the origin (point "O" in FIG. 6C) of the x-y plane. The optical center of the first lens 605 may be located at the lens pattern center ($O_L$) 150 or origin (point "O" in FIG. 6C) of the x-y plane.

FIG. 6D illustrates an x-y section view of a cylindrical lens pattern that may be formed in the birefringent medium layer 115b included in the lens assembly 600 that operates in the first operation state, according to an embodiment of the present disclosure. For example, the controller 230 may individually or independently control the voltages applied to the respective stripe-shaped electrodes 226 included in the second electrode layers 225c and 225d of the second lens 610 shown in FIG. 6B, thereby reorientating the LC molecules 112 to form the cylindrical lens pattern shown in FIG. 6D in the birefringent medium layer 115b of the second lens 610.

As shown in FIG. 6D, the orientations of the LC molecules 112 in the birefringent medium layer 115a may be configured with an in-plane orientation pattern having a varying pitch in at least two opposite in-plane directions, from the lens pattern center ("$O_L$") 150 to opposite lens peripheries 155. In some embodiments, the at least two opposite in-plane directions may be in the second predetermined in-plane direction (e.g., y-axis direction). The rotations of the orientations of the LC directors from the lens pattern center ("$O_L$") 150 to the opposite lens peripheries 155 in the at least two opposite in-plane directions may exhibit a same second handedness (e.g., a left handedness) that is opposite to the first handedness (e.g., right handedness). The lens pattern center ($O_L$) 150 and the geometry center ($O_G$) of the second lens 610 may substantially coincide with one another, at the origin (point "O" in FIG. 6D) of the x-y plane. The optical center of the second lens 610 may be located at the lens pattern center ($O_L$) 150 or origin (point "O" in FIG. 6D) of the x-y plane.

In some embodiments, the optical center of the lens assembly 600 may be located at an intersection between the in-plane lens pattern center axes 163 of the first lens 605 and the second lens 610. Referring to FIGS. 6B-6D, when the first lens 605 and the second lens 610 are configured with the cylindrical lens patterns shown in FIGS. 6C and 6D respectively, the optical center of the lens assembly 600 that operates in the first operation state may overlap or coincide with the optical centers of the first lens 605 and the second lens 610, at the origin (point "O" in FIG. 6C or 6D) of the x-y plane. For discussion purposes, the origin (point "O" in FIG. 6C or 6D) of the x-y plane may also correspond to a geometry center of the lens assembly 600. That is, the optical center of the lens assembly 600 that operates in the first operation state may overlap or coincide with the geometry center of the lens assembly 600.

In some embodiments, when the lens assembly 600 operates in the first operation state, for a circularly polarized light having a predetermined handedness, the first lens 605 and the second lens 610 may be configured to provide optical powers having substantially the same absolute values and opposite signs (i.e., positive and negative). In some embodiments, for circularly polarized lights having opposite handednesses, the first lens 605 and the second lens 610 may be configured to provide optical powers having substantially the same absolute values and the same sign.

As shown in FIG. 6B, the input light 602 of the lens assembly 600 (or the tunable PBP spherical lens 600) may be a circularly polarized light having the first handedness (e.g., right handedness). That is, the input light 602 may be a right-handed, circularly polarized ("RHCP") light. The input light 602 may be a collimated light, and substantially normally incident onto the lens assembly 600. FIG. 6E schematically illustrates an X-Y sectional view of a beam spot 662 of the input light 602 of the lens assembly 600 shown in FIG. 6B, according to an embodiment of the present disclosure. As shown in FIG. 6E, the beam spot 662 of the input light 602 may have a circular shape. A center of the beam spot 662 may substantially overlap or coincide with a center ("$O_F$") of a field of view 660, at the origin (point O' in FIG. 6E) of the X-Y plane.

Referring to FIGS. 6B and 6C, the input light 602 may be first incident onto the first lens 605. As the rotations of the LC directors from the lens pattern center ("$O_L$") 150 to the opposite lens peripheries 155 in the at least two opposite in-plane directions exhibit the first handedness (e.g., right handedness), the first lens 605 may be configured to operate in the positive state for the input light (e.g., RHCP light) 602. The first lens 605 may provide a positive optical power to the input light 602. For example, the first lens 605 may converge the input light 602 in the first predetermined in-plane direction (e.g., x-axis direction). The first lens 605 may focus the input light 602 to a line focus extending in the second predetermined in-plane direction (e.g., y-axis direction). The first lens 605 may also reverse the handedness of a circularly polarized light transmitted therethrough, e.g., the first lens 605 may transform the input light (e.g., RHCP light) 602 to a left-handed circularly polarized ("LHCP") light (not shown).

Referring to FIGS. 6B and 6D, the LHCP light output from the first lens 605 may be incident onto the second lens 610. As the rotations of the LC directors from the lens pattern center ("$O_L$") 150 to the opposite lens peripheries 155 in the at least two opposite in-plane directions exhibit the second handedness (e.g., left handedness), the second lens 610 may be configured to operate in the positive state for the LHCP light. The second lens 610 may provide a positive optical power to the LHCP light. For example, the second lens 610 may converge the LHCP light in the second predetermined in-plane direction (e.g., y-axis direction). In some embodiments, the positive optical power provided by the second lens 610 to the LHCP light and the positive optical power provided by the first lens 605 to the input light (e.g., RHCP light) 602 may have substantially the same value. The second lens 610 may also reverse the handedness of a circularly polarized light transmitted therethrough. For example, the first lens 605 may transform the LHCP light to an RHCP light.

Referring to FIG. 6B, thus, the lens assembly 600 that operates in the first operation state may converge the input light (e.g., RHCP light) 602 in both of the first predetermined in-plane direction (e.g., x-axis direction) and the second predetermined in-plane direction (e.g., y-axis direction). In some embodiments, an output light 604 of the lens assembly 600 may be an RHCP light. FIG. 6F schematically illustrates an X-Y sectional view of a beam spot 664 of the output light 604 at an image plane of the lens assembly 600 that operates in the first operation state, according to an embodiment of the present disclosure. The position of the image plane (or the distance between the image plane and the lens assembly 600) may be determined by the positive optical power provided by the second lens 610 to the LHCP light or the positive optical power provided by the first lens 605 to the input light (e.g., RHCP light) 602. As shown in FIG. 6F, the beam spot 664 of the output light 604 may have a circular shape. The size of the beam spot 664 of the output light 604 shown in FIG. 6F may be smaller than the size of the beam spot 662 of the input light 602 shown in FIG. 6E. A center of the beam spot 664 may substantially overlap or coincide with the center ("$O_V$") of the field of view 660, at the origin (point O' in FIG. 6F) of the X-Y plane.

For the input light (e.g., RHCP light) 602, the lens assembly 600 that operates in the first operation state may focus the input light (e.g., RHCP light) 602 to the circular beam spot 664 that has the center overlapping or coinciding with the center ("$O_V$") of the field of view 660. In some embodiments, the controller 620 may switch the lens assembly 600 to a second operation state different from the first operation state, e.g., through changing the voltages applied to the respective stripe-shaped electrodes 226 included in at least one the first lens 605 or the second lens 610 of the lens assembly 600. For discussion purposes, FIG. 6G shows that the lens assembly 600 operates in a second operation state. The lens assembly 600 that operates in a second operation state may transform an input light 602 to an output light 606.

FIG. 6H illustrates an x-y section view of a cylindrical lens pattern that may be formed in the birefringent medium layer 115a included in the lens assembly 600 that operates in the second operation state, according to an embodiment of the present disclosure. For example, the controller 230 may individually or independently control the voltages applied to the respective stripe-shaped electrodes 226 of the second electrode layers 225a and 225b in the first lens 605 shown in FIG. 6G, thereby reorientating the LC molecules 112 to form the cylindrical lens pattern shown in FIG. 6H in the birefringent medium layer 115a of the first lens 605.

As shown in FIG. 6H, the origin (point "O" in FIG. 6H) of the x-y plane corresponds to the geometry center ($O_G$) of the first lens 605. The orientations of the LC molecules 112 in the birefringent medium layer 115a may be configured with an in-plane orientation pattern having a varying pitch in at least two opposite in-plane directions, from the lens pattern center ("$O_L$") 150 to opposite lens peripheries 155. In some embodiments, the at least two opposite in-plane directions may be along the first predetermined in-plane direction (e.g., x-axis direction). The changes of the orientations of the LC directors from the lens pattern center ("$O_L$") 150 to the opposite lens peripheries 155 in the at least two opposite in-plane directions may exhibit a same first handedness (e.g., a right handedness). The lens pattern center ($O_L$) 150 of the first lens 610 may be shifted by a distance D1 in the −x-axis direction from the geometry center ($O_G$). Accordingly, the in-plane lens pattern center axis 163 may be shifted by the distance D1 in the −x-axis direction from the in-plane geometry center axis 173. The optical center of the first lens 605 may be located at the lens pattern center ($O_L$) 150.

FIG. 6I illustrates an x-y section view of a cylindrical lens pattern that may be formed in the birefringent medium layer 115b included in the lens assembly 600 that operates in the second operation state, according to an embodiment of the present disclosure. For example, the controller 230 may individually or independently control the voltages applied to the respective stripe-shaped electrodes 226 of the second electrode layers 225c and 225d in the second lens 610 shown in FIG. 6G, thereby reorientating the LC molecules 112 to form the cylindrical lens pattern shown in FIG. 6I in the birefringent medium layer 115b of the second lens 610.

As shown in FIG. 6I, the origin (point "O" in FIG. 6H) of the x-y plane corresponds to the geometry center ($O_G$) of the first lens 605. The orientations of the LC molecules 112 in the birefringent medium layer 115a may be configured with an in-plane orientation pattern having a varying pitch in at least two opposite in-plane directions, from the lens pattern center ("$O_L$") 150 to opposite lens peripheries 155. In some embodiments, the at least two opposite in-plane directions may be in the second predetermined in-plane direction (e.g., y-axis direction). The rotations of the LC directors from the lens pattern center ("$O_L$") 150 to the opposite lens peripheries 155 in the at least two opposite in-plane directions may exhibit a same second handedness (e.g., a left handedness) that is opposite to the first handedness (e.g., right handedness). The lens pattern center ($O_L$) 150 of the second lens 610 may be shifted by a distance D2 in the +y-axis direction from the geometry center ($O_G$). Accordingly, the in-plane lens pattern center axis 163 may be shifted by the distance D2 in the +y-axis direction from the in-plane geometry center axis 173. The optical center of the second lens 610 may be located at the lens pattern center ($O_L$) 150 of the second lens 610.

In some embodiments, the optical center of the lens assembly 600 may be located at an intersection between the in-plane lens pattern center axes 163 of the first lens 605 and the second lens 610. Referring to FIGS. 6G-6I, when the first lens 605 and the second lens 610 are configured with the cylindrical lens patterns shown in FIGS. 6H and 6I respectively, the optical center of the lens assembly 600 that operates in the second operation state may be moved away from the origin (point "O" in FIG. 6H or 6I) of the x-y plane. For example, the optical center of the lens assembly 600 that operates in the second operation state may be shifted by the distance D1 in the −x-axis direction and the distance D2 in the +y-axis direction from the origin (point "O" in FIG. 6H or 6I) of the x-y plane. For discussion purposes, the origin (point "O" in FIG. 6H or 6I) of the x-y plane may also correspond to the geometry center of the lens assembly 600. That is, the optical center of the lens assembly 600 that operates in the second center may be shifted by the distance D1 in the −x-axis direction and the distance D2 in the +y-axis direction from the geometry center of the lens assembly 600.

In some embodiments, when the lens assembly 600 operates in the second operation state, for a circularly polarized light having a predetermined handedness, the first lens 605 and the second lens 610 may be configured to provide optical powers having substantially the same absolute values and opposite signs. In some embodiments, for circularly polarized lights having opposite handednesses, the first lens 605 and the second lens 610 may be configured to provide optical powers having substantially the same absolute values and the same sign.

Referring to FIGS. 6G and 6H, the input light 602 may be first incident onto the first lens 605. As the rotations of the LC directors from the lens pattern center ("$O_L$") 150 to the opposite lens peripheries 155 in the at least two opposite in-plane directions exhibit the first handedness (e.g., right handedness), the first lens 605 may be configured to operate in the positive state for the input light (e.g., RHCP light) 602. The first lens 605 may provide a positive optical power to the input light 602. For example, the first lens 605 may converge the input light 602 in the first predetermined in-plane direction (e.g., x-axis direction). The first lens 605 may also reverse the handedness of a circularly polarized light transmitted therethrough, e.g., the first lens 605 may transform the input light (e.g., RHCP light) 602 to an LHCP light (not shown).

Referring to FIGS. 6G and 6I, the LHCP light output from the first lens 605 may be incident onto the second lens 610. As the rotations of the LC directors from the lens pattern center ("$O_L$") 150 to the opposite lens peripheries 155 in the at least two opposite in-plane directions exhibit the second handedness (e.g., left handedness), the second lens 610 may be configured to operate in the positive state for the LHCP light. The second lens 610 may provide a positive optical power to the LHCP light. For example, the second lens 610 may converge the LHCP light in the second predetermined in-plane direction (e.g., y-axis direction). In some embodiments, the positive optical power provided by the second lens 610 to the LHCP light and the positive optical power provided by the first lens 605 to the input light (e.g. RHCP light) 602 may have substantially the same value.

Referring to FIG. 6G, the lens assembly 600 that operates in the second operation state may converge the input light (e.g., RHCP light) 602 in both of the first predetermined in-plane direction (e.g., x-axis direction) and the second predetermined in-plane direction (e.g., y-axis direction). In some embodiments, an output light 606 of the lens assembly 600 may be an RHCP light. FIG. 6J schematically illustrates an X-Y sectional view of a beam spot 666 of the output light 606 at an image plane of the lens assembly 600 that operates in the second operation state, according to an embodiment of the present disclosure. The position of the image plane (or the distance between the image plane and the lens assembly 600) may be determined by the positive optical power provided by the second lens 610 to the LHCP light or the positive optical power provided by the first lens 605 to the input light (e.g. RHCP light) 602. As shown in FIG. 6J, in some embodiments, the beam spot 666 of the output light 606 may have a circular shape. The size of the beam spot 666 of the output light 606 shown in FIG. 6J may be smaller than the size of the beam spot 662 of the input light 602 shown in FIG. 6E. A center of the beam spot 666 may be shifted from the center ("$O_{F'}$") of the field of view 660. The displacement of the center of the beam spot 666 from the center ("$O_{F'}$") of the field of view 660 may be determined, in part, by the position of the optical center and the optical power of the lens assembly 600.

For discussion purposes, the in-plane pitches at the lens periphery 155 in the cylindrical lens patterns shown in FIGS. 6C, 6D, 6H, and 6I may be configured to be substantially the same. Thus, the lens assembly 600 operating in the first operation state and the second operation state may have substantially the same optical power. Accordingly, the lens assembly 600 operating in the first operation state and the second operation state may focus the input light 602 to the same image plane, and the sizes of the beam spot 664 shown in FIG. 6F and the beam spot 666 shown in FIG. 6J may be substantially the same. As the optical center of the lens assembly 600 shifts when the lens assembly 600 is switched from operating in the first operation state to the second operation state, the position of the beam spot of the output light at the image plane may be shifted accordingly. For example, the position of the beam spot 666 shown in FIG. 6J may be different from the position of the beam spot 664 shown in FIG. 6F. In some embodiments, when the lens assembly 600 is switched from operating in the first operation state to the second operation state, the optical power of the lens assembly 600 may be configured to be changed and/or the optical center of the lens assembly 600 may be configured to be shifted. Accordingly, the image plane of the lens assembly 600 may be changed and/or the position of the beam spot of the output light at the image plane may be shifted.

The tunable PBP lenses or lens assemblies disclosed herein have features such as electrically tunable optical powers, electrically movable (or adjustable) optical center, low operating voltage, fast response, high efficiency (≥90%), small thickness, light weight, compactness, large aperture, simple fabrication, etc. The tunable lenses or lens assemblies disclosed herein may be implemented in systems or devices for imaging, sensing, communication, biomedical applications, etc. Beam steering devices based on the disclosed tunable PBP lenses or lens assemblies may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc. For example, beam steering devices based on the disclosed tunable PBP lenses or lens assemblies may be implemented in displays and optical modules to enable multiple image planes (e.g., image plane distance of infinity, 2 m, 1 m, 0.5 m, or 0.25 m) with the AR/VR HMDs by adjusting its optical power (i.e., 0, 0.5 Diopter, 1 Diopter, 2 Diopters, and 4 Diopters), enable pupil steered AR, VR, and/or MR display systems (e.g., holographic near eye displays, retinal projection eyewear, and wedged waveguide displays), smart glasses for AR, VR, and/or MR applications, compact illumination optics for projectors, light-field displays. Beam steering devices based on the disclosed tunable PBP lenses or lens assemblies may be implemented in HUDs for vehicles. Pupil steered AR, VR, and/or MR display systems have features such as compactness, large field of views ("FOVs"), high system efficiencies, and small eye-boxes. Beam steering devices based on the disclosed PBP lenses may be implemented in the pupil steered AR, VR, and/or MR display systems to enlarge the eye-box spatially and/or temporally.

In some embodiments, beam steering devices based on the disclosed tunable PBP lenses or lens assemblies may be implemented in AR, VR, and/or MR sensing modules to detect objects in a wide angular range to enable other functions. In some embodiments, beam steering devices based on the disclosed tunable PBP lenses or lens assemblies may be implemented in AR, VR, and/or MR sensing modules to extend the FOV (or detecting range) of the sensors in space constrained optical systems, increase detecting resolution or accuracy of the sensors, and/or reduce the signal processing time. Beam steering devices based on the disclosed tunable PBP lenses or lens assemblies may also be used in Light Detection and Ranging ("Lidar") systems in autonomous vehicles. Beam steering devices based on the disclosed tunable PBP lenses or lens assemblies may also be used in optical communications, e.g., to provide fast speeds (e.g., speeds at the level of Gigabyte/second) and long ranges (e.g., ranges at kilometer levels). Beam steering devices based on the disclosed tunable PBP lenses or lens assemblies may also be implemented in microwave communications, 3D imaging and sensing (e.g., Lidar), lithography, and 3D printing, etc.

In some embodiments, the disclosed tunable PBP lenses or lens assemblies may replace conventional objective lenses having a high numerical aperture in microscopes. The disclosed tunable PBP lenses or lens assemblies may be implemented into light source assemblies to provide a polarized structured illumination to a sample, for identifying various features of the sample. The disclosed tunable PBP lenses or lens assemblies may be used as compact laser backlight units. The disclosed tunable PBP lenses or lens assemblies may enable polarization patterned illumination systems that add a new degree for sample analysis.

Figure 7A:
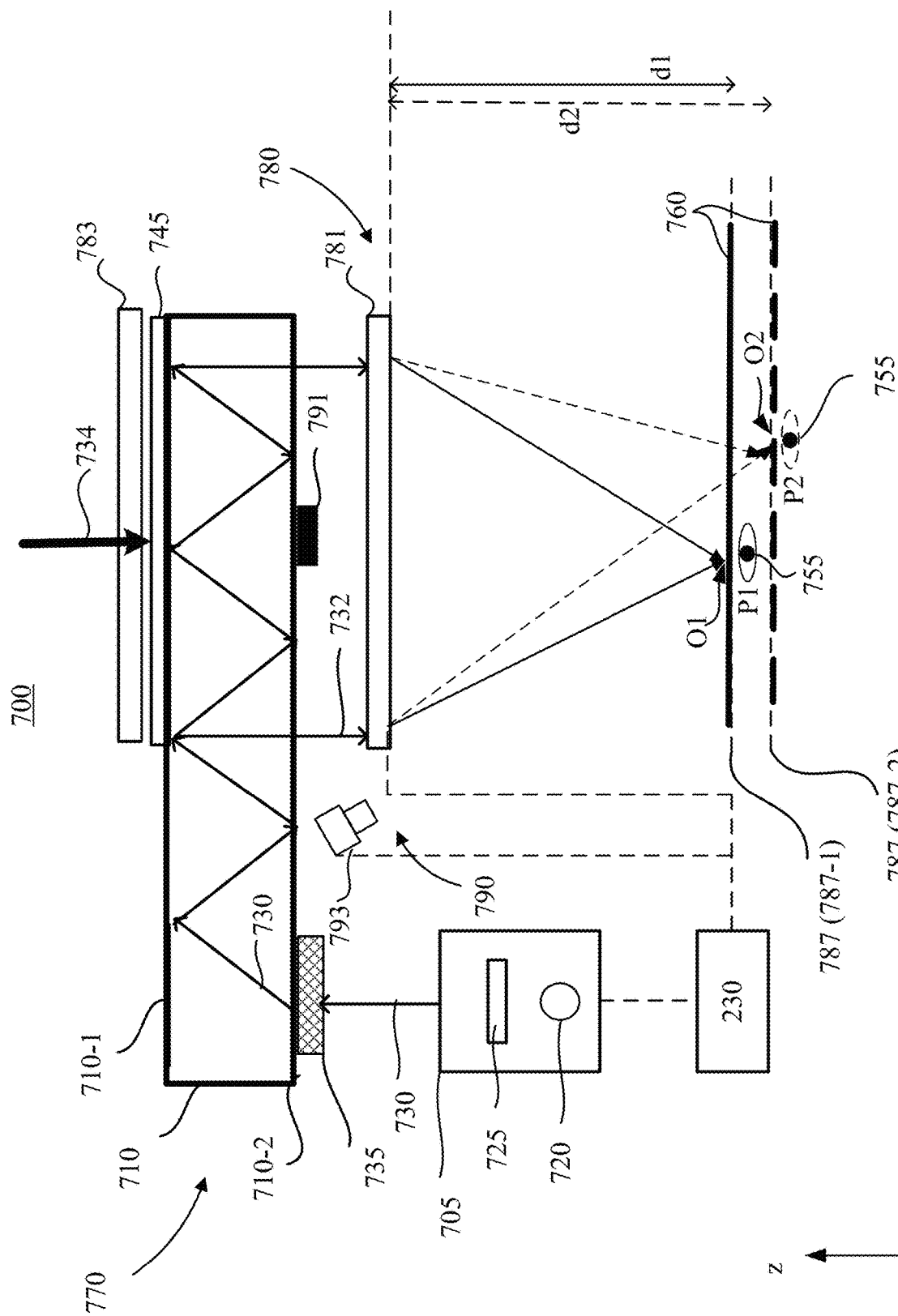
FIG. 7A schematically illustrates a diagram of an optical system, according to an embodiment of the present disclosure.

FIG. 7A schematically illustrates an x-y sectional view of an optical system 700, according to an embodiment of the present disclosure. The optical system 700 may be a part of a system (e.g., an NED, an HUD, an HMD, a smart phone, a laptop, or a television, etc.) for VR, AR, and/or MR applications. The optical system 700 may include a display system 770, a viewing optical system 780, and an eye tracking system 790. In some embodiments, the optical system 700 may also include the controller 230. The controller 230 may be electrically coupled with, and may control, various devices in the display system 770, the viewing optical system 780, and the eye tracking system 790. In the embodiment shown in FIG. 7A, the display system 770, the viewing optical system 780, and the eye tracking system 790 may share the controller 230. In some embodiments, the display system 770, the viewing optical system 780, and the eye tracking system 790 may have individual controllers.

The display system 770 may include image display components configured to project an image light (forming computer-generated virtual images) into a display window in a field of view ("FOV"). The eye tracking system 790 may be configured to provide eye-tracking information, based on which a position of an eye pupil 755 of the user of the display stem 700 may be determined. The viewing optical system 780 may be configured to guide the image light output from the display system 770 to an exit pupil. The exit pupil may be a location where the eye pupil 755 of an eye of a user is positioned in an eye-box region 760 of the display system 770.

In the embodiment shown in FIG. 7A, the display system 770 may be a light guide display system 770. As shown in FIG. 7A, the light guide display system 770 may include a light source assembly 705 and a light guide 710. The light source assembly 705 may include a light source 720 and a light conditioning system 725. In some embodiments, the light source 720 may be a light source configured to generate a coherent or partially coherent light. The light source 720 may include, e.g., a laser diode, a vertical cavity surface emitting laser, a light emitting diode, or a combination thereof. In some embodiments, the light source 720 may be a display panel, such as a liquid crystal display ("LCD") panel, a liquid-crystal-on-silicon ("LCoS") display panel, a light-emitting diode ("LED") display panel, an organic light-emitting diode ("OLED") display panel, a micro light-emitting diode ("micro-LED") display panel, a micro organic light-emitting diode ("micro-OLED") display panel, a digital light processing ("DLP") display panel, a laser scanning display panel, or a combination thereof. In some embodiments, the light source 720 may be a self-emissive panel, such as an LED display panel, an OLED display panel, a micro-OLED display panel, or a micro-LED display panel. In some embodiments, the light source 720 may be a display panel that is illuminated by an external source, such as an LCD panel, an LCoS display panel, or a DLP display panel. Examples of an external source may include a laser, an LED, an OLED, or a combination thereof. The light conditioning system 725 may include one or more optical components configured to condition the light from the light source 720. For example, the controller 230 may control the light conditioning system 725 to condition the light from the light source 720, which may include, e.g., transmitting, attenuating, expanding, collimating, and/or adjusting orientation of the light.

The light source assembly 705 may generate and output an image light (e.g., a visible light) 730 propagating toward an in-coupling element 735 disposed at a first portion of the light guide 710. The light guide 710 may expand and direct the image light 730 to the eye-box region 760. The in-coupling element 735 located at the first portion of the light guide 710 may receive the image light 730, and couple the image light 730 into a total iteral reflection ("TIR") path inside the light guide 710. The image light 730 may propagate inside the light guide 710 through TIR toward an out-coupling element 745 located at a second portion of the light guide 710. The first portion and the second portion may be located at different portions of the light guide 710. The out-coupling element 745 may be configured to couple the image light 730 out of the light guide 710 toward the eye-box region 760. For example, the out-coupling element 745 may be configured to couple the image light 730 out of the light guide 710 as an image light 732.

The light guide 710 may include a first surface or side 710-1 facing the real-world environment and an opposing second surface or side 710-2 facing the eye-box region 760. Each of the in-coupling element 735 and the out-coupling element 745 may be disposed at the first surface 710-1 or the second surface 710-2 of the light guide 710. In some embodiments, as shown in FIG. 7A, the in-coupling element 735 may be disposed at the second surface 710-2 of the light guide 710, and the out-coupling element 745 may be disposed at the first surface 710-1 of the light guide 710. In some embodiments, the in-coupling element 735 may be disposed at the first surface 710-1 of the light guide 710. In some embodiments, the out-coupling element 745 may be disposed at the second surface 710-2 of the light guide 710. In some embodiments, both of the in-coupling element 735 and the out-coupling element 745 may be disposed at the first surface 710-1 or the second surface 710-2 of the light guide 710. In some embodiments, the in-coupling element 735 or the out-coupling element 745 may be integrally formed as a part of the light guide 710 at the corresponding surface. In some embodiments, the in-coupling element 735 or the out-coupling element 745 may be separately formed, and may be disposed at (e.g., affixed to) the corresponding surface.

In some embodiments, each of the in-coupling element 735 and the out-coupling element 745 may have a designed operating wavelength band that includes at least a portion of the visible wavelength band. In some embodiments, the designed operating wavelength band of each of the in-coupling element 735 and the out-coupling element 745 may not include the IR wavelength band. For example, each of the in-coupling element 735 and the out-coupling element 745 may be configured to deflect a visible light, and transmit an IR light without a deflection or with negligible deflection.

In some embodiments, each of the in-coupling element 735 and the out-coupling element 745 may include one or more diffraction gratings, one or more cascaded reflectors, one or more prismatic surface elements, and/or an array of holographic reflectors, or any combination thereof. In some embodiments, each of the in-coupling element 735 and the out-coupling element 745 may include one or more diffraction gratings, such as a surface relief grating, a volume hologram, a polarization selective grating, a polarization volume hologram ("PVH"), a metasurface grating, or any combination thereof. In some embodiments, a period of the diffraction grating included in the in-coupling element 735 may be configured to enable TIR of the image light 730 within the light guide 710. In some embodiments, a period of the diffraction grating included in the out-coupling element 745 may be configured to couple the image light 730 propagating inside the light guide 710 through TIR out of the light guide 710 via diffraction.

The controller 230 may be communicatively coupled with the light source assembly 705, and may control the operations of the light source assembly 705. In some embodiments, the light guide 710 may output the expanded image light 732 to the eye with an increased or expanded FOV. The light guide 710 coupled with the in-coupling element 735 and the out-coupling element 745 may also function as an image combiner (e.g., AR or MR combiner). The light guide 710 may combine the image light 732 representing a virtual image and a light 734 from the real world environment (or a real world light 734), such that the virtual image may be superimposed with real-world images. With the light guide display system 770, the physical display and electronics may be moved to a side of a front body of an NED. A substantially fully unobstructed view of the real world environment may be achieved, which enhances the AR or MR user experience.

The eye tracking system 790 may be configured to provide eye tracking information, based on which a position of an eye pupil 855 of the user of the display system 770 may be determined. Any suitable eye tracking system 790 may be used. The eye tracking system 790 may include, e.g., one or more light sources 791 configured to illuminate one or both eyes of the user, and one or more optical sensors (e.g., cameras) 793 configured to capture images of one or both eyes. The eye tracking system 790 may be configured to track a position, a movement, and/or a viewing direction of the eye pupil 755. In some embodiments, the eye tracking system 790 may measure the eye position and/or eye movement up to six degrees of freedom for each eye (i.e., 3D position, roll, pitch, and yaw). In some embodiments, the eye tracking system 790 may measure a pupil size. The eye tracking system 790 may provide a signal (or feedback) containing the position and/or movement of the eye pupil 755 to the controller 230.

The image light 732 coupled out of the light guide 710 by the out-coupling element 745 may be incident onto the viewing optical system 780. The viewing optical system 780 may be configured to guide the image light 732 output from the display system 770 to the eye pupil 755, based on the eye tracking information. In some embodiments, the viewing optical system 780 may be configured to correct aberrations in the image light 732, magnify the image light 732, or perform another type of optical adjustment to the image light 732. The viewing optical system 785 may include multiple optical elements, such as one or more lenses, one or more reflectors, one or more waveplates, etc. In the embodiment shown in FIG. 7A, the viewing optical system 785 may include a lens or lens assembly 781 having at least one of tunable optical power or adjustable optical center. The lens or lens assembly 781 may be any lens or lens assembly disclosed herein, such as the lens 200 shown in FIGS. 2A-4J, or the lens assembly 600 shown in FIGS. 6A-6J. For discussion purposes, in the embodiment show in FIG. 7A, the lens assembly 781 may be similar to the lens assembly 600 shown in FIGS. 6A-6J.

The lens assembly 781 may be configured to provide a 3D beam steering to the image light 732 output from the display system 770. For example, the lens assembly 781 may be configured to laterally steer (or shift), e.g., in an x-y place, the image light 732 output from the display system 770 relative to an input optical path of the image light 732 in one or two dimensions (e.g., an x-axis direction and/or a y-axis direction). The lens assembly 781 may be configured to vertically shift an image plane 787, at which the image light 732 output from the display system 770 is focused, in a third dimension (e.g., in a z-axis direction). In some embodiments, based on the eye tracking information from the eye tracking system 790, the controller 230 may be configured to control the lens assembly 781 to steer and focus the image light 732 to the image plane 787, where one or more exit pupils of the display system 770 are located.

For illustrative purposes, FIG. 7A shows two operation states of the lens assembly 781. For example, at a first time instance or period, the eye tracking system 790 may detect that the eye pupil 755 is located at a first position P1 within the eye-box 730. Based on the eye-tracking information, the controller 230 may control the lens assembly 781 to operate at (e.g., be switched to) a first operation state. The image light 732 output from the light guide 710 may be focused by the lens assembly 781 to a first exit pupil O1 at a first image plane 787-1 having an image distance d1 from the lens assembly 781. The first exit pupil O1 may substantially coincide with the first position P1 of the eye pupil 755.

At a second time instance or period, the eye tracking system 790 may detect that the eye pupil 755 has moved to a second position P2 at the eye-box 760. The eye tracking system 790 may provide the new position information (as part of the eye tracking information) to the controller 230. Alternatively, in some embodiments, the controller 230 may determine the new eye tracking information based on images of the eye pupil 755 received from the eye tracking system 790. The controller 230 may control the lens assembly 781 to switch to a second operation state different from the first operation state. Thus, the image light 732 output from the light guide 710 may be focused by the lens assembly 781 to a second exit pupil O2 at a second image plane 787-2 having an image distance d2 from the lens assembly 781. The second exit pupil O2 may substantially coincide with the second position P2 of the eye pupil 755. As shown in FIG. 7A, the image distance d2 is greater than the image distance d1, and the second exit pupil O2 has both a lateral shift (e.g., in the y-axis direction) and a vertical shift (e.g., in the z-axis direction) from the first exit pupil O1.

Although not shown, in some embodiments, the second exit pupil O2 may have both a lateral shift (e.g., in the y-axis direction and/or in the x-axis direction) and a vertical shift (e.g., in the z-axis direction) from the first exit pupil O1. Thus, based on the eye tracking information, the controller 230 may be configured to control the lens assembly 781 to steer and focus the image light 732 output from the light guide 710 in a 3D space based on a changing position of the eye pupil 755 in real time.

In some embodiments, when used for AR and/or MR applications, in addition to the lens assembly 781 (referred to as a first lens assembly 781), the display system 770 may further include a second lens assembly 783 disposed at the first side 710-1 of the light guide 710. The controller 230 may be communicatively coupled with the second lens assembly 783. In some embodiments, when used for AR and/or MR applications, the controller 230 may be configured to control the first lens assembly 781 and the second lens assembly 783 to provide opposite steering effects and lensing effects to the light 734 from the real word environment. For example, the optical powers provided by the first lens assembly 781 and the second lens assembly 783 may have opposite signs and a substantially same absolute value, the optical center movements provided by the first lens assembly 781 and the second lens assembly 783 may have opposite directions. Thus, the second lens assembly 783 may be configured to compensate for the distortion of the light 734 (representing real-world images) caused by the first lens assembly 781, such that images of the real-world objects viewed through the display system 770 may be substantially unaltered.

In the disclosed embodiments, the lens assembly 781 may be configured to provide a 3D beam steering to an image beam (representing a virtual image). The lens assembly 781 may be configured to provide a plurality of operation states to the image light 732 output from the light guide 710. In some embodiments, the plurality of operation states may correspond to a range of discrete adjustments of an optical power provided to the image light 732. The range of discrete adjustments of the optical power may correspond to an adjustment range of the image distance d of the image plane 787, at which the image light 732 is focused. In some embodiments, the plurality of operation states may correspond to a range of continuous or discrete movements of the focus of the image light 732. The range of continuous or discrete movements of the focus of the image light 732 may correspond to an adjustment range of a lateral position (e.g., x and y coordinates) of the spot O (at the image plane 787) to which the image light 732 is steered. Thus, a continuous or discrete shift of the exit pupil of the display system 770 may be provided in a 3D space to cover an expanded eye-box based on the eye tracking information. The lens assembly 781 may be compact with a thickness of a few millimeters to reduce the form factor of the optical system 070. In addition, the lens assembly 781 may have a fast switching speed when switching between different operation states. For example, a switching time between different operation states may be at the milliseconds level or tens of milliseconds level. Thus, the switching of the lens assembly 781 may be sufficiently fast to keep pace with the movement of the eye pupil 755. Thus, the real-time eye tracking and real-time 3D shifting of the exit pupil positions may be provided.

Figure 7B:
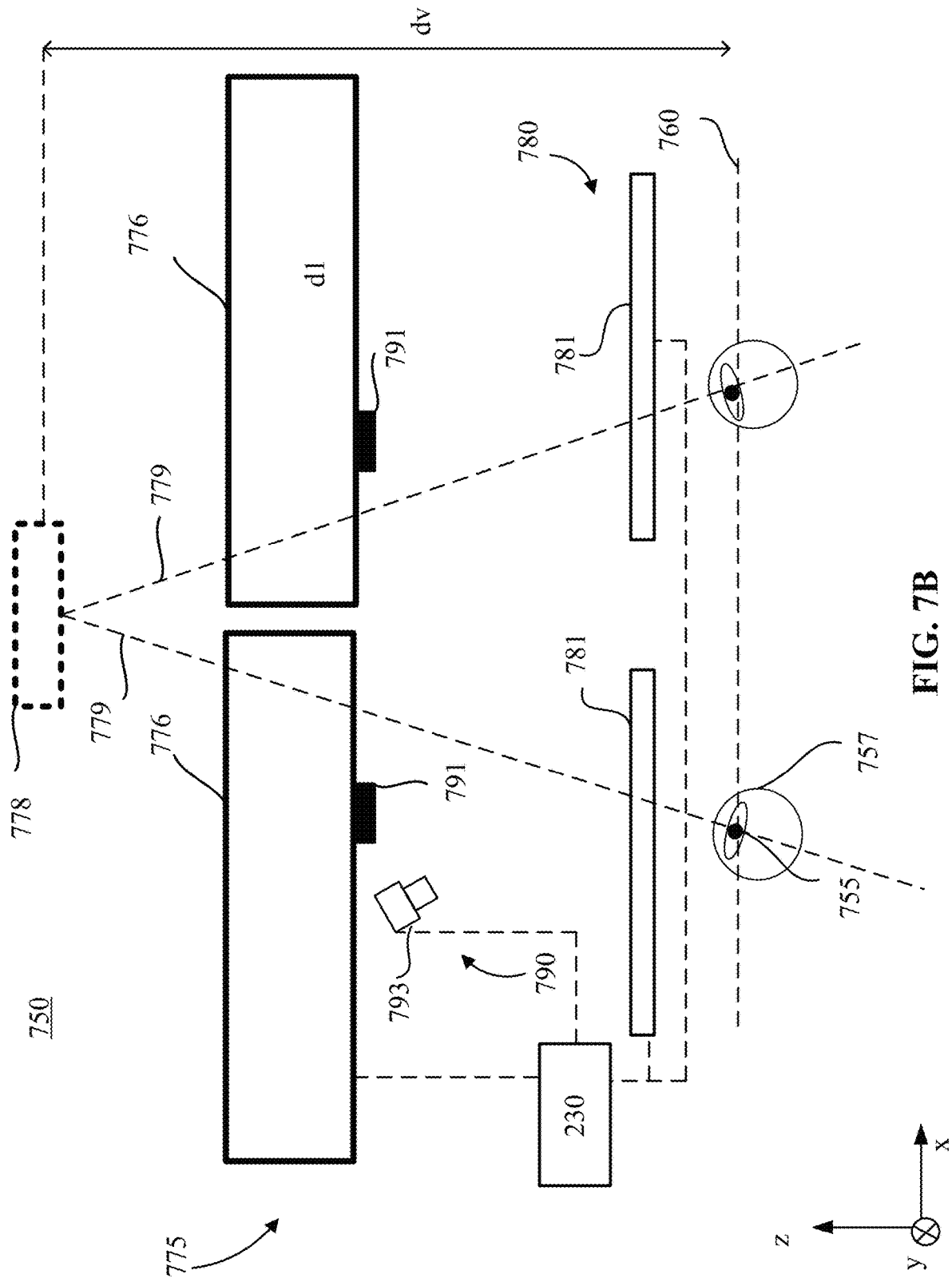
FIG. 7B schematically illustrates a diagram of an optical system, according to an embodiment of the present disclosure.

FIG. 7B schematically illustrates an x-y sectional view of an optical system 750, according to an embodiment of the present disclosure. The optical system 750 may be a part of a system (e.g., an NED, an HUD, an HMD, a smart phone, a laptop, or a television, etc.) for AR, MR, and/or VR applications. The optical system 750 may include a display system 775, the viewing optical system 780, and the eye tracking system 790, and the controller 230. The display system 775 may display virtual images to the user. In some embodiments, the display system 775 may include a single electronic display or multiple electronic displays 776 (e.g., a display for each eye 757 of the user). For discussion purposes, FIG. 7B shows that the display system 775 includes two electronic displays 776 for the left and right eyes 757 of the user of the optical system 750, respectively. The electronic displays 781 and the viewing optical system 780 together may guide an image light (forming the virtual images) to the exit pupil in the eye-box region 760. For discussion purpose, FIG. 7B shows that the viewing optical system 780 may include two lenses or lens assemblies 781 for the left and right eyes 757, respectively. The lens or lens assembly 781 may be configured to address the accommodation-vergence conflict in the optical system 750. For example, the lens or lens assembly 781 may be configured to have a large aperture size (e.g., 50 mm) for large FOC (e.g., 65 degrees with 20 mm eye relief distance), a large optical power (e.g., ±2.0 Diopters) for adapting human eye vergence accommodation, and a fast switching speed (at the milli-seconds level or tens of milliseconds level) for adapting vergence-accommodation of human eyes, and a good image quality for meeting human eye acuity.

In some embodiments, the electronic displays 776 may display a virtual image. Based on the eye tracking information provided by the eye tracking system 790, the controller 230 may determine a virtual object 778 within the virtual image at which the eyes 757 are currently looking. The controller 230 may determine a vergence depth ($d_v$) of the gaze of the user based on the gaze point or an estimated intersection of gaze lines 779 determined by the eye tracking system 790. As shown in FIG. 7B, the gaze lines 779 may converge or intersect at the distance $d_v$, where the virtual object 778 is located. The controller 230 may control the lens or lens assembly 781 to adjust the optical power to provide an accommodation that matches the vergence depth ($d_v$) associated with the virtual object 778 at which the eyes 757 are currently looking, thereby reducing the accommodation-vergence conflict in the optical system 750. For example, the controller 230 may control the lens or lens assembly 781 to operate in a desirable operation state to provide an optical power corresponding to a focal plane (or an image plane) that matches the vergence depth ($d_v$).

Figure 8A:
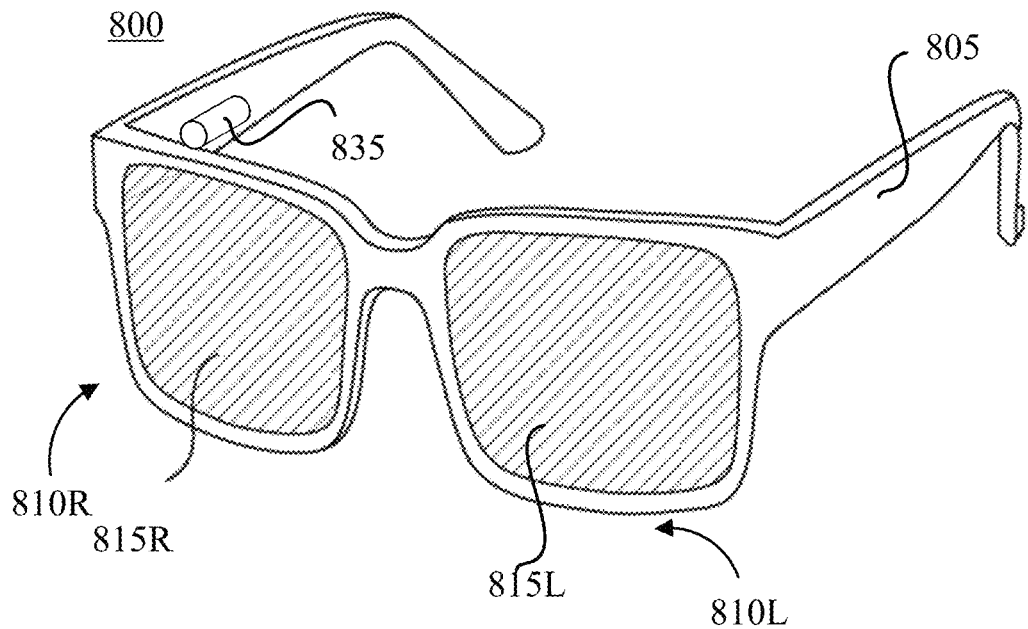
FIG. 8A illustrates a schematic diagram of a near-eye display ("NED"), according to an embodiment of the present disclosure.
Figure 8B:
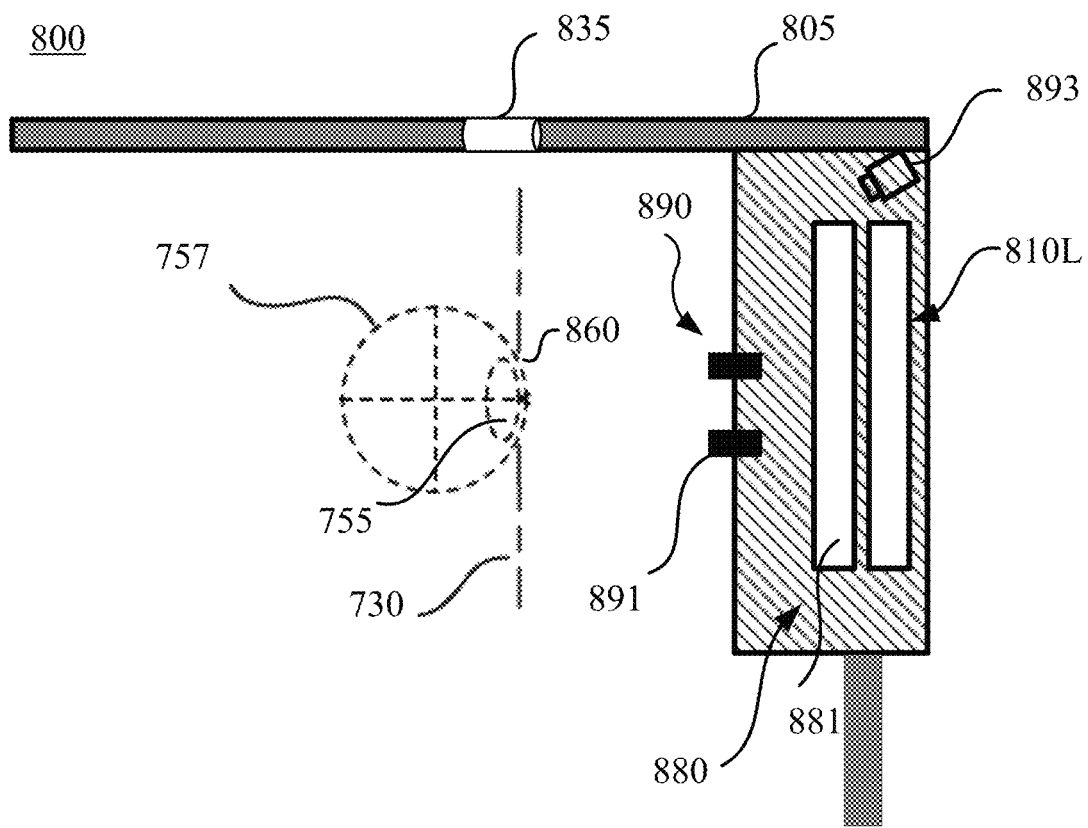
FIG. 8B illustrates a schematic cross sectional view of half of the NED shown in FIG. 8A, according to an embodiment of the present disclosure.

FIG. 8A illustrates a schematic diagram of a near-eye display ("NED") 800 according to an embodiment of the disclosure. FIG. 8B is a cross-sectional view of half of the NED 800 shown in FIG. 8A according to an embodiment of the disclosure. For purposes of illustration, FIG. 8B shows the cross-sectional view associated with a left-eye display system 810L. The NED 800 may include a controller (not shown). The NED 800 may include a frame 805 configured to mount to a user's head. The frame 805 is merely an example structure to which various components of the NED 800 may be mounted. Other suitable type of fixtures may be used in place of or in combination with the frame 805. The NED 800 may include right-eye and left-eye display systems 810R and 810L mounted to the frame 805. The NED 800 may function as a VR device, an AR device, an MR device, or any combination thereof. In some embodiments, when the NED 800 functions as an AR or an MR device, the right-eye and left-eye display systems 810R and 810L may be entirely or partially transparent from the perspective of the user, which may provide the user with a view of a surrounding real-world environment. In some embodiments, when the NED 800 functions as a VR device, the right-eye and left-eye display systems 810R and 810L may be opaque to block the light from the real-world environment, such that the user may be immersed in the VR imagery based on computer-generated images.

The right-eye and left-eye display systems 810R and 810L may include image display components configured to project computer-generated virtual images into left and right display windows 815L and 815R in a field of view ("FOV"). The right-eye and left-eye display systems 810R and 810L may be any suitable display systems. In some embodiments, the right-eye and left-eye display systems 810R and 810L may include one or more optical systems (e.g., display systems) disclosed herein, such as the display system 770 shown in FIG. 7A, or the display system 775 shown in FIG. 7B. For illustrative purposes, FIG. 8A shows that the left-eye display systems 810L may include a light source assembly (e.g., a projector) 835 coupled to the frame 805 and configured to generate an image light representing a virtual image.

As shown in FIG. 8B, the left-eye display systems 810L may also include a viewing optical system 880 and an object tracking system 890 (e.g., eye tracking system and/or face tracking system). The viewing optical system 880 may be configured to guide the image light output from the left-eye display system 810L to an exit pupil 860. The exit pupil 860 may be a location where the eye pupil 755 of an eye 757 of the user is positioned in an eye-box region 730 of the left-eye display system 810L. The viewing optical system 880 may include a lens or lens assembly 781 having at least one of tunable optical power or adjustable optical center. The lens or lens assembly 781 may be any lens or lens assembly disclosed herein, such as the lens 200 shown in FIGS. 2A-4J, or the lens assembly 600 shown in FIGS.

6A-6J. The object tracking system 890 may include an IR light source 891 configured to illuminate the eye 757 and/or the face, and an optical sensor 893 (e.g., a camera) configured to receive the IR light reflected by the eye 757 and generate a tracking signal relating to the eye 757 (e.g., an image of the eye 757). In some embodiments, the object tracking system 890 may include one or more disclosed lenses or lens assemblies.

In some embodiments, the driving of the lens 200 may include a first step of setting voltages applied to all of the electrodes (215 and 225) to be 0V, and maintaining the 0V state for about 50 milli-seconds ("ms") until the directors of the LC molecules restore to their original, initial alignment directions. FIGS. 4A and 4B show example initial directions of the LC molecules close to the first substrate 205a and the second substrate 205b of the lens 200, respectively. In a second step, predetermined voltages (e.g., 10V) may be applied to selective patterned electrodes 226. As shown in FIG. 4C, at the first substrate 205a, the electrodes 226A-226D are selectively applied with 10V voltages, and at the second substrate 205b, the electrodes 226E'-226H' are applied with the 10V voltages. The application of the 10V voltages may take 1 ms to 15 ms, such that the LC directors corresponding to the selected electrodes turn to predetermined angles. Accordingly, the azimuthal angle of the LC molecules corresponding to the selected electrodes may have a predetermined sign (e.g., "+" or "−"). As a result of the application of the voltages, the directors of the LC molecules corresponding to the non-selected electrodes may also be rotated for certain angles along their respective initial rotation direction (as indicated by the initial alignment direction shown in FIG. 4A and FIG. 4B). Accordingly, the azimuthal angle of the LC molecules corresponding to the non-selected electrodes may have the same predetermined sign (e.g., "+" or "−"). In a third step, FFS voltages may be applied to all of the electrodes in the first substate 205a and the second substate 205b to tune the LC directors to align in predetermined directions to form a predetermined lens pattern. In some embodiments, the application of the FFS voltages may take 10 ms to 40 ms. The application of the FFS voltages may be adjusted (e.g., the magnitude, distribution, and duration may be adjusted), such that the efficiency of the lens 200 may reach a predetermined efficiency (e.g., 90%). In some embodiments, the total response or switching time may be about 65 ms for reaching a predetermined efficiency of 90%.

In some embodiments, the present disclosure provides a device. The device includes a first Pancharatnam-Berry phase ("PBP") lens, and a second PBP lens stacked with the first PBP lens. Each of the first PBP lens and the second PBP lens includes a liquid crystal ("LC") layer. Each side of the LC layer is provided with a continuous electrode and a plurality of patterned electrodes. The patterned electrodes in the first PBP lens are arranged non-parallel to the patterned electrodes in the second PBP lens.

In some embodiments, in each of the first PBP lens and second PBP lens, at each side of the LC layer, an electrically insulating layer is disposed between the continuous electrode and the plurality of patterned electrodes.

In some embodiments, each of the first PBP lens and second PBP lens includes two alignment structures disposed at opposite sides of the LC layer to provide two alignment directions, the two alignment directions provided by the alignment structures included in the first PBP lens are symmetric with respect to a first predetermined in-plane direction, the two alignment directions provided by the alignment structures included in the second PBP lens are symmetric with respect to a second predetermined in-plane direction, and the first predetermined in-plane direction is orthogonal to the second predetermined in-plane direction.

In some embodiments, in each of the first PBP lens and second PBP lens, the two alignment directions are homogeneous alignment directions. In some embodiments, in each of the first PBP lens and the second PBP lens operating at a voltage-off state, LC molecules in the LC layer are aligned in the homogeneous alignment directions.

In some embodiments, the patterned electrodes disposed at each side of the LC layer in the first lens include first stripe-shaped electrodes each extending in the second predetermined in-plane direction, and wherein the first stripe-shaped electrodes are arranged in parallel in the first predetermined in-plane direction, and the patterned electrodes disposed at each side of the LC layer in the second lens include second stripe-shaped electrodes extending in the first predetermined in-plane direction, and wherein the second stripe-shaped electrodes are arranged in parallel in the second predetermined in-plane direction.

In some embodiments, the first PBP lens is configured to function as a first cylindrical lens to focus a circularly polarized light having a first handedness into a first line focus that extends in the second predetermined in-plane direction, the second PBP lens is configured to function as a second cylindrical lens to focus a circularly polarized light having a second handedness into a second line focus that extends in the first predetermined in-plane direction, and the second handedness is opposite to the first handedness.

In some embodiments, the first PBP lens is configured to provide a first optical power to the circularly polarized light having the first handedness, the second PBP lens is configured to provide a second optical power to the circularly polarized light having the second handedness, and the first optical power and the second optical power have substantially the same absolute value.

In some embodiments, the first line focus is shiftable in the first predetermined in-plane direction, and the second line focus is shiftable in the second predetermined in-plane direction.

In some embodiments, a stack formed by the first PBP lens and the second PBP lens is configured to function as a spherical lens to focus a circularly polarized light into a beam spot. In some embodiments, an optical center of the spherical lens is shiftable in at least one of the first predetermined in-plane direction or the second predetermined in-plane direction. In some embodiments, an optical power of the spherical lens is adjustable. In some embodiments, the spherical lens is configured to provide a zero optical power at a voltage-off state, and provide a positive optical or negative optical power at a voltage-on state.

In some embodiments, magnitudes of voltages applied to the continuous electrode and the plurality of patterned electrodes disposed at each side of the LC layer in each of the first PBP lens and the second PBP lens are less than or equal to 10V.

In some embodiments, the device further includes one or more power sources electrically connected with the continuous electrode and the plurality of patterned electrodes disposed at each side of the LC layer in each of the first PBP lens and the second PBP lens. The one or more power sources are configured to apply voltages to the continuous electrode and the plurality of patterned electrodes disposed at each side of the LC layer to generate an in-plane electric field in the LC layer. In some embodiments, LC molecules included in the LC layer in each of the first PBP lens and the second PBP lens are in-plane switchable by the in-plane electric field to switch the first PBP lens or the second PBP lens between different operation states to provide different optical powers.

In some embodiments, the each of the first PBP lens and the second PBP lens is configured to provide a zero optical power at a voltage-off state, and provide a positive or negative optical power at a voltage-on state.

In some embodiments, for each of the first PBP lens and the second PBP lens operating at a voltage-on state: an in-plane electric field is generated in the LC layer to reorient directors of LC molecules to exhibit in-plane rotations in two opposite in-plane directions from a lens pattern center to opposite lens peripheries, and the in-plane rotations in the two opposite in-plane directions from the lens pattern center to the opposite lens peripheries have the same rotation direction.

In some embodiments, for each of the first PBP lens and the second PBP lens operating at the voltage-on state: voltage differences between the continuous electrode and the patterned electrodes disposed at a first side of the LC layer follow a spatial profile, the same spatial profile being followed by voltage differences between the continuous electrode and the corresponding patterned electrodes disposed at a second side of the LC layer. In some embodiments, the patterned electrodes included in each of the first PBP lens and the second PBP lens include stripe-shaped electrodes.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
    a first Pancharatnam-Berry phase ("PBP") lens; and
    a second PBP lens stacked with the first PBP lens,
    wherein each of the first PBP lens and the second PBP lens includes a liquid crystal ("LC") layer,
    wherein each side of the LC layer is provided with a continuous electrode and a plurality of patterned electrodes, and
    wherein the patterned electrodes in the first PBP lens are arranged non-parallel to the patterned electrodes in the second PBP lens.

2. The device of claim 1, wherein in each of the first PBP lens and second PBP lens, at each side of the LC layer, an electrically insulating layer is disposed between the continuous electrode and the plurality of patterned electrodes.

3. The device of claim 1, wherein:
    each of the first PBP lens and second PBP lens includes two alignment structures disposed at opposite sides of the LC layer to provide two alignment directions,
    the two alignment directions provided by the alignment structures included in the first PBP lens are symmetric with respect to a first predetermined in-plane direction,
    the two alignment directions provided by the alignment structures included in the second PBP lens are symmetric with respect to a second predetermined in-plane direction, and
    the first predetermined in-plane direction is orthogonal to the second predetermined in-plane direction.

4. The device of claim 3, wherein in each of the first PBP lens and second PBP lens, the two alignment directions are homogeneous alignment directions.

5. The device of claim 4, wherein in each of the first PBP lens and the second PBP lens operating at a voltage-off state, LC molecules in the LC layer are aligned in the homogeneous alignment directions.

6. The device of claim 3, wherein:
    the patterned electrodes disposed at each side of the LC layer in the first lens include first stripe-shaped electrodes each extending in the second predetermined in-plane direction, and wherein the first stripe-shaped electrodes are arranged in parallel in the first predetermined in-plane direction, and
    the patterned electrodes disposed at each side of the LC layer in the second lens include second stripe-shaped electrodes extending in the first predetermined in-plane direction, and wherein the second stripe-shaped electrodes are arranged in parallel in the second predetermined in-plane direction.

7. The device of claim 6, wherein:
    the first PBP lens is configured to function as a first cylindrical lens to focus a circularly polarized light having a first handedness into a first line focus that extends in the second predetermined in-plane direction,
    the second PBP lens is configured to function as a second cylindrical lens to focus a circularly polarized light having a second handedness into a second line focus that extends in the first predetermined in-plane direction, and the second handedness is opposite to the first handedness.

8. The device of claim 7, wherein:

the first PBP lens is configured to provide a first optical power to the circularly polarized light having the first handedness, the second PBP lens is configured to provide a second optical power to the circularly polarized light having the second handedness, and the first optical power and the second optical power have substantially the same absolute value.

9. The device of claim 7, wherein:

the first line focus is shiftable in the first predetermined in-plane direction, and the second line focus is shiftable in the second predetermined in-plane direction.

10. The device of claim 7, wherein a stack formed by the first PBP lens and the second PBP lens is configured to function as a spherical lens to focus a circularly polarized light into a beam spot.

11. The device of claim 10, wherein an optical center of the spherical lens is shiftable in at least one of the first predetermined in-plane direction or the second predetermined in-plane direction.

12. The device of claim 10, wherein an optical power of the spherical lens is adjustable.

13. The device of claim 10, wherein the spherical lens is configured to provide a zero optical power at a voltage-off state, and provide a positive optical or negative optical power at a voltage-on state.

14. The device of claim 1, wherein magnitudes of voltages applied to the continuous electrode and the plurality of patterned electrodes disposed at each side of the LC layer in each of the first PBP lens and the second PBP lens are less than or equal to 10V.

15. The device of claim 1, further comprising one or more power sources electrically connected with the continuous electrode and the plurality of patterned electrodes disposed at each side of the LC layer in each of the first PBP lens and the second PBP lens, wherein the one or more power sources are configured to apply voltages to the continuous electrode and the plurality of patterned electrodes disposed at each side of the LC layer to generate an in-plane electric field in the LC layer.

16. The device of claim 15, wherein LC molecules included in the LC layer in each of the first PBP lens and the second PBP lens are in-plane switchable by the in-plane electric field to switch the first PBP lens or the second PBP lens between different operation states to provide different optical powers.

17. The device of claim 1, wherein the each of the first PBP lens and the second PBP lens is configured to provide a zero optical power at a voltage-off state, and provide a positive or negative optical power at a voltage-on state.

18. The device of claim 1, wherein for each of the first PBP lens and the second PBP lens operating at a voltage-on state:

an in-plane electric field is generated in the LC layer to reorient directors of LC molecules to exhibit in-plane rotations in two opposite in-plane directions from a lens pattern center to opposite lens peripheries, and the in-plane rotations in the two opposite in-plane directions from the lens pattern center to the opposite lens peripheries have the same rotation direction.

19. The device of claim 1, wherein for each of the first PBP lens and the second PBP lens operating at the voltage-on state:

voltage differences between the continuous electrode and the patterned electrodes disposed at a first side of the LC layer follow a spatial profile, the same spatial profile being followed by voltage differences between the continuous electrode and the corresponding patterned electrodes disposed at a second side of the LC layer.

20. The device of claim 1, wherein the patterned electrodes included in each of the first PBP lens and the second PBP lens include stripe-shaped electrodes.

\* \* \* \* \*